US012166858B2

(12) United States Patent
Komandur et al.

(10) Patent No.: US 12,166,858 B2
(45) Date of Patent: Dec. 10, 2024

(54) SYSTEM AND METHOD FOR STORING CONTRACT DATA STRUCTURES ON PERMISSIONED DISTRIBUTED LEDGERS

(71) Applicant: ROYAL BANK OF CANADA, Toronto (CA)

(72) Inventors: Venkatadri Kaushik Komandur, Toronto (CA); Goran Zugic, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 134 days.

(21) Appl. No.: 16/684,351

(22) Filed: Nov. 14, 2019

(65) Prior Publication Data

US 2020/0177373 A1   Jun. 4, 2020

Related U.S. Application Data

(60) Provisional application No. 62/767,194, filed on Nov. 14, 2018.

(51) Int. Cl.
*H04L 9/06* (2006.01)
*H04L 9/08* (2006.01)
*H04L 9/00* (2022.01)

(52) U.S. Cl.
CPC .......... *H04L 9/0643* (2013.01); *H04L 9/0816* (2013.01); *H04L 9/0861* (2013.01); *H04L 9/0894* (2013.01); *H04L 9/50* (2022.05)

(58) Field of Classification Search
CPC ... H04L 9/0643; H04L 9/0816; H04L 9/0894; H04L 9/0861; H04L 2209/38; H04L 9/3247; H04L 9/3239
See application file for complete search history.

(56) References Cited

U.S. PATENT DOCUMENTS

| | | | |
|---|---|---|---|
| 10,204,341 B2* | 2/2019 | Davis | G06F 16/24575 |
| 10,346,428 B2* | 7/2019 | Madhavan | G06F 16/273 |
| 10,445,698 B2* | 10/2019 | Hunn | G06Q 10/10 |
| 10,454,677 B1* | 10/2019 | Nagelberg | G06V 40/1365 |
| 10,797,885 B1* | 10/2020 | Griffin | H04L 9/3231 |
| 11,063,745 B1* | 7/2021 | Du | H04L 9/0825 |
| 11,257,073 B2* | 2/2022 | Padmanabhan | H04L 9/50 |
| 11,397,919 B1* | 7/2022 | Thiagrajan | G06F 21/105 |
| 2016/0063446 A1* | 3/2016 | Shaaban | G06Q 30/04 705/32 |
| 2016/0292680 A1* | 10/2016 | Wilson, Jr. | G06Q 20/40 |
| 2017/0241546 A1* | 8/2017 | Sasahara | F16H 63/3026 |
| 2017/0293669 A1* | 10/2017 | Madhavan | G06F 16/2365 |
| 2017/0301047 A1* | 10/2017 | Brown | G06Q 20/382 |

(Continued)

*Primary Examiner* — Oleg Korsak

(74) *Attorney, Agent, or Firm* — Norton Rose Fulbright Canada LLP

(57) ABSTRACT

A computer implemented method for maintaining a synchronized distributed ledger data structure across a plurality of computing nodes each configured to enforce a synchronization protocol for coordinating updates of the synchronized distributed ledger data structure to establish an inter-group reconciliation mechanism across one or more trusted entities having immutable transaction records stored in the form of blockchain data structures recording approvals from one or more parties corresponding to the plurality of computing nodes. In some aspects, regulator nodes are contemplated.

15 Claims, 19 Drawing Sheets

(56) References Cited

U.S. PATENT DOCUMENTS

| | | | | |
|---|---|---|---|---|
| 2017/0344987 | A1* | 11/2017 | Davis | G06Q 20/10 |
| 2018/0005186 | A1* | 1/2018 | Hunn | G06F 16/93 |
| 2018/0062831 | A1* | 3/2018 | Zhang | H04L 9/3236 |
| 2018/0089758 | A1* | 3/2018 | Stradling | G06F 12/1408 |
| 2018/0225448 | A1* | 8/2018 | Russinovich | G06F 21/57 |
| 2018/0225661 | A1* | 8/2018 | Russinovich | G06Q 20/3829 |
| 2018/0285838 | A1* | 10/2018 | Franaszek | G06Q 20/42 |
| 2019/0057362 | A1* | 2/2019 | Wright | H04L 9/3239 |
| 2019/0066065 | A1* | 2/2019 | Wright | G06Q 20/389 |
| 2019/0068365 | A1* | 2/2019 | Wright | G06Q 20/4015 |
| 2019/0123889 | A1* | 4/2019 | Schmidt-Karaca | H04L 9/0618 |
| 2019/0123895 | A1* | 4/2019 | Blake | H04L 63/062 |
| 2019/0156336 | A1* | 5/2019 | Kasthuri | G06Q 20/065 |
| 2019/0188787 | A1* | 6/2019 | Besanson Tuma | H04L 9/0637 |
| 2019/0236598 | A1* | 8/2019 | Padmanabhan | G06Q 20/389 |
| 2019/0278852 | A1* | 9/2019 | Jayachandran | H04L 9/0643 |
| 2019/0281028 | A1* | 9/2019 | Gillan | H04L 63/0861 |
| 2019/0305950 | A1* | 10/2019 | Treat | H04L 9/3239 |
| 2019/0373521 | A1* | 12/2019 | Crawford | H04L 9/3236 |
| 2020/0007314 | A1* | 1/2020 | Vouk | H04L 63/102 |
| 2020/0043115 | A1* | 2/2020 | Nelson | H04L 9/3247 |
| 2020/0092085 | A1* | 3/2020 | Baek | H04L 9/3265 |
| 2020/0097950 | A1* | 3/2020 | Thompson | H04L 9/3239 |
| 2020/0112545 | A1* | 4/2020 | Smith | H04L 63/04 |
| 2020/0151686 | A1* | 5/2020 | Komandur | G06F 16/2315 |
| 2020/0151715 | A1* | 5/2020 | Sato | G06Q 20/389 |
| 2020/0151817 | A1* | 5/2020 | Mahfouz | G06Q 20/3674 |
| 2020/0184547 | A1* | 6/2020 | Andon | G06Q 30/0209 |
| 2020/0250676 | A1* | 8/2020 | Sierra | H04L 9/302 |
| 2020/0273048 | A1* | 8/2020 | Andon | G06Q 10/02 |
| 2020/0313884 | A1* | 10/2020 | Trevethan | G06Q 20/3829 |
| 2020/0379979 | A1* | 12/2020 | Thekadath | H04L 29/08 |

* cited by examiner

| | $E_{QS}$ | $E_{00}$ | $E_{01}$ | $E_{02}$ | $E_{03}$ | $E_{04}$ | $E_{05}$ | $E_{06}$ | $E_{07}$ | $E_{08}$ | $E_{09}$ | $E_{10}$ | $E_{11}$ | $E_{12}$ | $E_{13}$ |
|---|---|---|---|---|---|---|---|---|---|---|---|---|---|---|---|
| $S_{10}$ | | x | x | x | x | x | x | x | x | x | x | x | x | x | x |
| $S_9$ | | x | x | x | x | x | $S_9$ | x | x | x | x | x | x | x | x |
| $S_8$ | | x | x | x | x | x | x | x | x | x | x | x | x | x | x |
| $S_7$ | | x | x | x | x | x | x | x | x | x | x | x | x | x | x |
| $S_6$ | | x | x | x | x | x | x | x | x | x | x | x | x | x | x |
| $S_5$ | | x | x | x | x | x | x | $S_2$ | x | x | x | x | $S_8$ | $S_5$ | $S_5$ |
| $S_4$ | | x | x | x | x | x | $S_2$ | x | $S_6$ | $S_3$ | $S_9$ | x | x | $S_4$ | $S_2$ |
| $S_3$ | | x | x | x | x | x | x | x | x | x | x | x | x | x | x |
| $S_2$ | | x | x | x | $S_4$ | $S_5$ | x | x | x | x | x | $S_8$ | x | $S_2$ | $S_2$ |
| $S_1$ | | x | x | $S_2$ | x | x | x | x | x | x | x | x | x | $S_1$ | $S_1$ |
| $S_0$ | | $S_0$ | $S_1$ | x | x | x | x | x | x | x | x | x | x | x | x |
| — | | $S_0$ | $S_1$ | x | x | x | x | x | x | x | x | x | x | x | x |

```
Agreement {
    id: String
    type: String
    description: String
    creationDate: Date
    localBUName: String
    ...
    foreignBURechargeDetails: Array=Document
    foreignBURechargeDetail[
        foreignBUName: String
        foreignBURecharge: Array=Document
        foreignBURecharge: {
            foreignBUAmount: Double
            foreignBUApproverId: String
            ...
        }
    }
    supportingDocuments: Array=Document
    supportingDocument {
        uri: String
        attachmentDate: Date
        ...
    }
    statuses: Array=Document
    status {
        creationDate: Date
        description: String
        initiator: String
        ...
    }
}
```

Agreement Object Data Model

FIG. 9

SYSTEM AND METHOD FOR STORING CONTRACT DATA STRUCTURES ON PERMISSIONED DISTRIBUTED LEDGERS

CROSS-REFERENCE

This application is a non-provisional of, and claims all benefit, including priority to, U.S. Application No. 62/767,194, entitled SYSTEM AND METHOD FOR STORING CONTRACT DATA STRUCTURES ON PERMISSIONED DISTRIBUTED LEDGERS, filed on 14 Nov. 2018, incorporated herein by reference in its entirety.

FIELD

Embodiments of the present disclosure generally relate to the field of electronic contract data structures and more specifically, embodiments relate to devices, systems and methods for improved electronic reconciliation of contracts on permissioned distributed ledgers.

INTRODUCTION

Accounts payable can be established between two or more business units. A typical example of when this business process is used is the following: A business unit in New York (NY) enters into an agreement with a third party computer software company for licenses on behalf of a business unit in London.

The NY business unit then invoices the London business unit internally to recover costs for the agreement (these invoices may be one-time or may be for periodic payments such as subscriptions). The London business unit remits amounts to the NY business unit to cover local NY costs.

This accounts payable process is cumbersome to implement, and prone to issues whereby the parties may lose track of transactions and remits.

SUMMARY

A distributed ledger-based system is described that is adapted to manage a reconciliation-free, contract-based workflow between multiple parties who do not trust each other. A blockchain-based protocol for contract creation, agreeance, and performance, adapted to handle both processes that on a path to execution and includes paths where the execution of a multi-party contract can fail. The specific approach is adapted such that contract performance can be achieved successfully between untrusting parties.

The distributed ledger-based system is provided as a computational approach and corresponding systems for implementing electronic reconciliation of contracts on permissioned distributed ledgers. Distributed ledgers are utilized to store and track status transitions of an agreement at various points of time, using a state machine that models the contract statuses and possible states. For example, a state change can include 11 possible states, where a last state is a final/accepting state, and a number of intermediate states are possible. At various events and states, there may be various invocations of chaincode and updates representing events occurring in relation to the agreement. These state changes are reflected in a blockchain data structure stored on a distributed ledger mechanism distributed across various computing nodes.

As described in various embodiments, a computer implemented method for maintaining a synchronized distributed ledger data structure across a plurality of computing nodes each configured to enforce a synchronization protocol for coordinating updates of the synchronized distributed ledger data structure is provided. Each computing node stores a synchronized copy of the distributed ledger data structure, and updates to the distributed ledger data structure are established first at a node and distributed across all of the computing nodes, for example, through networked communications and signals thereof.

A technical challenge that arises with state-machine implementations on blockchain data structures arise due to the structural complexity of message update and transaction recordals on distributed ledgers. Each update can be considered a transaction to be recorded on the blockchain and propagated across the distributed ledgers such that the records are updated with the transactions. These updates can yield large mounts of individual transactions, and accordingly, in further embodiments, additional improvements to specific blockchain implementations to improve transaction scalability by increasing the number of possible transactions per second. These improvements include specific tuning steps that may be utilized for improving transaction bandwidth.

Each computing node is associated with a separate business unit or entity (e.g., NY operates a computing node, London operates another computing node). Computing nodes may include one or a plurality of computer servers and devices, and may include failover servers and backup servers.

The synchronized distributed ledger data structure is configured to store one or more blockchain objects, which are cross-linked hashed objects storing information elements representing specific transactions between parties. The blockchain is maintained as a "single source of truth" that can be referenced by the parties.

When an input set of data fields is received at a first node (e.g., through a user interface), the input set of data fields is processed as the fields represent parameters of an agreement between a plurality of parties. For example, NY would like to establish an agreement with London in respect of sharing the cost of an underlying services contract with a hundred licenses (NY only needs fifty, so it wishes to share fifty with London and the cost should later be reconciled between the offices). In this case, NY could serve as the first node, and the input set of data fields can be received in NY.

The first node then instantiates an agreement represented in the blockchain data structure incorporating at least the input set of data fields, a series of one or more required approval signals, each required approval signal corresponding to a hidden unique primary key.

As the network is a trusted network, blocks storing, among others, transaction data, approvals, and sets of input fields can simply be added to the distributed ledger without proof of work or proof of stake protocols.

The set of data elements representing the initial fields of the agreement, when generated, includes a hidden unique primary key (e.g., a seed) that can be sequentially or pseudo-randomly generated. The hidden unique primary key can be used with a one-way hash to expose information regarding the initial agreement, and in some embodiments, the hidden unique primary key is never accessible by any individual human.

The computing nodes may interact with the blockchain by providing approvals (e.g., if a corresponding approval is required), through providing an approval signal signed using a private key corresponding to a second party of the plurality of parties.

When the approval signal is provided, the blockchain data structure is updated representative of a state transition indicative of an approval by the second party of the agreement represented by the hidden unique primary key.

The blockchain data structure can be configured to accept the insertion of the new state transition if and only if there exists at least one outstanding required approval of the series of the one or more required approval signals. For example, insertion of an approval cannot occur once the agreement is fully approved, and further approvals are rejected and not recorded to the blockchain.

When all the approvals are obtained, the blockchain may be rendered immutable yet accessible, for example, through a consensus mechanism that does not allow further block transactions on the blockchain data structure.

In another aspect, responsive to receiving, at the second computing node of the plurality of computing nodes, a disapproval signal signed using the private key corresponding to a second party of the plurality of parties and including a new set of input data fields, a separate agreement is instantiated.

In another aspect, the synchronized distributed ledger data structure maintains one or more cryptographically immutable records of transactions established between business entities associated with a corresponding node of the plurality of computing nodes, each node potentially representing a different business unit.

In another aspect, each node of the plurality of computing nodes is a trusted computing device.

In another aspect, each node of the plurality of computing nodes includes at least two trusted computing devices: a first computing device configured for actively conducting operations on the distributed ledger data structure, and a second computing device configured to store a redundant copy of the distributed ledger data structure and to switch over to conducting the operations on the distributed ledger data structure responsive to an event of systems failure of the first computing device.

In another aspect, the hidden unique primary key is a seed of a hash chain object stored in each successive block of the blockchain data structure object, the hash chain object including successively applied cryptographic hash functions. The original key is used as a seed for pseudo-randomness.

In another aspect, the successively applied cryptographic hash functions, stored in block headers, in concert, enable verification of the blockchain data structure object by parsing only a subset of the blocks of the blockchain data structure (e.g., verification through a Merkle tree).

In another aspect, the method further includes periodically processing the synchronized distributed ledger data structure to conduct a financial reconciliation process between the plurality of parties. Accordingly, the financial reconciliation process provides for automatic processing of transactions.

In another aspect, the financial reconciliation includes controlling transactions of funds between the plurality of parties based on the input set of data fields stored on the blockchain data structure.

In another aspect, the method further includes controlling a display to render a graphical user interface including visual interface elements for receiving the input set of data fields.

In another aspect, the plurality of computing nodes includes at least a first group of computing nodes that are configured for the inserting of the information into the distributed ledger data structure and the receiving of the approval signal or a disapproval signal, and a second group of computing nodes that are configured only for receiving of the approval signal or the disapproval signal. The different types of node allow for node differentiation, whereby some nodes can make blocks, others can only approve.

In another aspect, the second group of computing nodes are associated with regulator entities.

In another aspect, the second group of computing nodes are configured to automatically process the blockchain data structure to conduct an assessment of the input set of data fields in accordance with a set of business rules, and based at least on the assessment, generate either the approval signal or the disapproval signal.

In another aspect, the set of business rules includes automatic generation of the approval signal if the input set of data fields, in concert, represent a transaction having a value below or equal to a pre-defined threshold.

In another aspect, the set of business rules includes an assessment of whether the input set of data fields are in violation of arm's length pricing guidelines, and the second group of computing nodes are configured for interconnection with one or more data storage devices maintaining reference data records of comparable arm's length transactions.

In another aspect, the set of business rules includes automatic generation of the approval signal if the assessment indicates that the transaction is within a pre-defined threshold value range established through traversing the reference data records.

In another aspect, the set of business rules includes automatic generation of the disapproval signal if the assessment indicates that the transaction is beyond a pre-defined threshold value range established through traversing the reference data records.

The implementation may include specific approaches to tuning of the underlying architecture to improve transactions per second such that the blockchain can be scaled to improve performance given a high volume of transactions generated in implementing the state machines utilized in providing the contract platform mechanism interacted with by the various parties to the contract.

These tuning approaches include, in an embodiment, setting a validator pool size to establish an upper bound of a number of go-routines being spawned to reduce an overall number of OS threads required.

In another aspect, non-endorser peers are set to conduct endorsement verification and transaction commits such that they do not need to execute chaincode or endorse transactions.

In another aspect, the B-tree chunk sizes are adapted to use more memory to increase speed.

In another aspect, documents are stored on the blockchain data structure using monotonic identifiers to reduce amount of rewriting required of intermediate nodes.

In another aspect, a block size limitation is utilized based on a number of blocks created and a fill ratio.

In another aspect, a block cut time is dynamically established based on load levels.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 9 is an example agreement data object provided in JSON format, according to some embodiments.

DETAILED DESCRIPTION

Figure 1A:
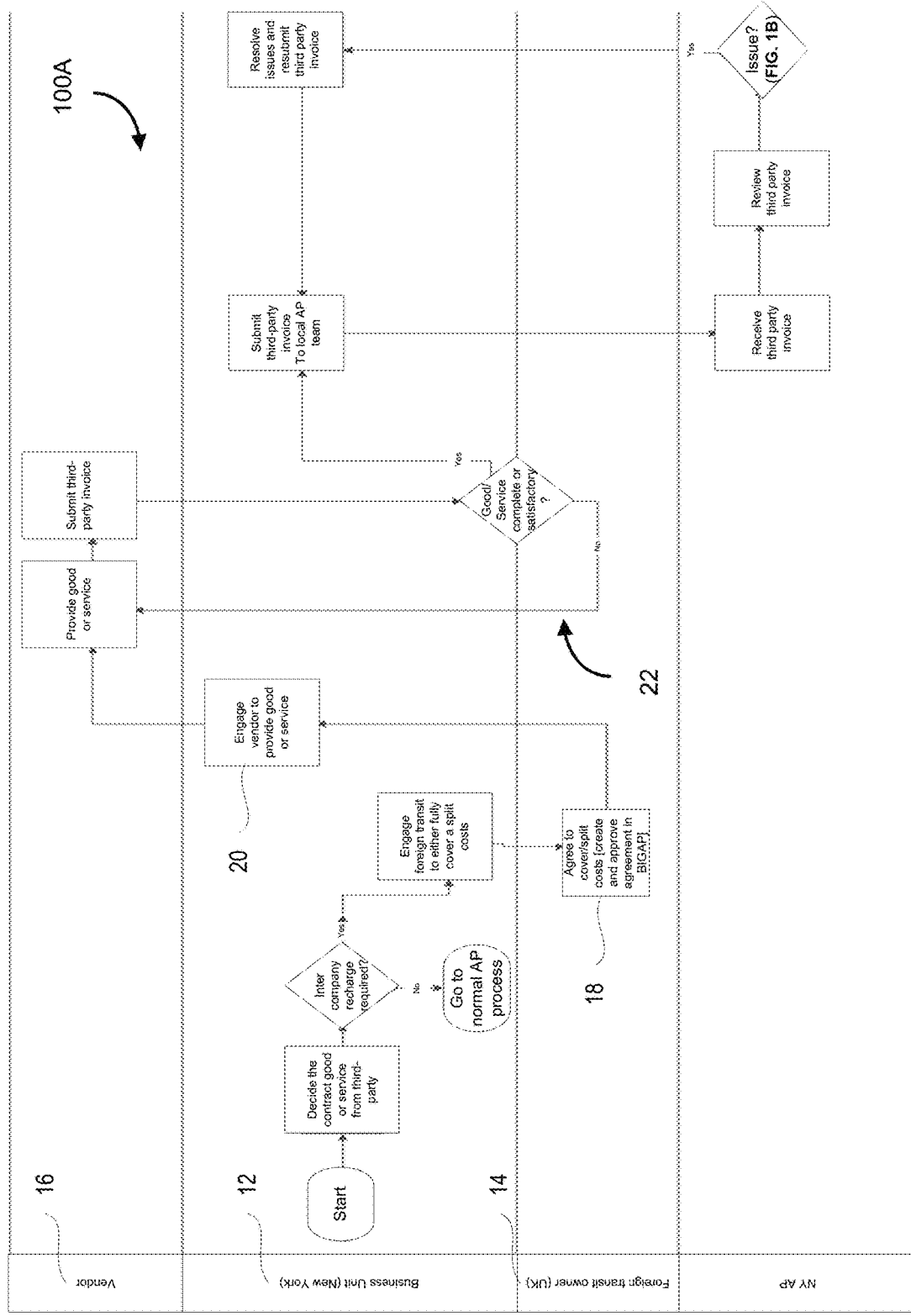
FIG. 1A, continued on FIG. 1B, shows an example process diagram of a process for an intragroup payment process utilizing a blockchain data structure backend on a set of distributed ledgers stored on corresponding computing nodes, according to some embodiments.

A computer implemented method for maintaining a synchronized distributed ledger data structure across a plurality of computing nodes each configured to enforce a synchronization protocol for coordinating updates of the synchronized distributed ledger data structure to establish an intergroup reconciliation mechanism across one or more trusted entities having immutable transaction records stored in the form of blockchain data structures recording approvals from one or more parties corresponding to the plurality of computing nodes. In some aspects, regulator nodes are contemplated.

As described in some embodiments, Hyperledger™ Fabric Blockchain technology can be utilized for a base technology for implementation. The system is provided as there are pain points for reconciling internal agreements that can be addressed elegantly through technological solutions, including blockchain based records. For example, there can be disagreements, a lack of recorded evidence, etc. As described in some embodiments below, in some cases, a regulator node can be introduced that can further provide validation of internal agreements prior to their approval and provisioning on the blockchain data structure and distributed ledger, for example, to validate compliance with transfer pricing rules, etc.

A secure audit trail can thus be generated that may aid in quickly and effectively computing compliance through a traversal of associated blockchain data structures, such that automated compliance and auditing of records is possible, even without explicit cooperation of the entities which are connected to the various nodes.

For example, a business unit in New York may be entering into a bulk agreement with a software provider for installations of office software, and may achieve a discount by having a larger number of installations than available in New York, sharing the installations with a London and a Singapore office. The distributed ledger can be maintained with immutable records such that there is no disagreement in respect of amounts to be invoiced, aiding in a financial reconciliation process as between the different offices. Each office can be associated with a particular node or group of computing devices representing a node, among others, such that an automatic reconciliation process may periodically operate to balance costs as between the offices.

In contrast to non-blockchain approaches where the business units enters into agreements without recorded/explicit approval, there are less opportunities for disagreement in respect of the exact amounts to be invoiced (the NY business unit may have some kind of percentage allocation or other fractional allocation method that the London unit may consider unfair). For example, in other solutions, the two business units may disagree on the transits that will be involved in the movement of funds, or they may disagree on other terms of the "internal" agreement between them.

As described herein, a potential solution is to eliminate the root causes for reconciliation by designing a new business process that can take advantage of blockchain technology, providing a single source of truth with immutability and non-repudiation built in (blockchain ledger with immutable transactions and all messages being cryptographically signed), wherein no single business unit controls the source of truth (as the ledger is peer-to-peer) and a consensus process is established for internal agreements using smart agreement mechanisms.

Figure 1B:
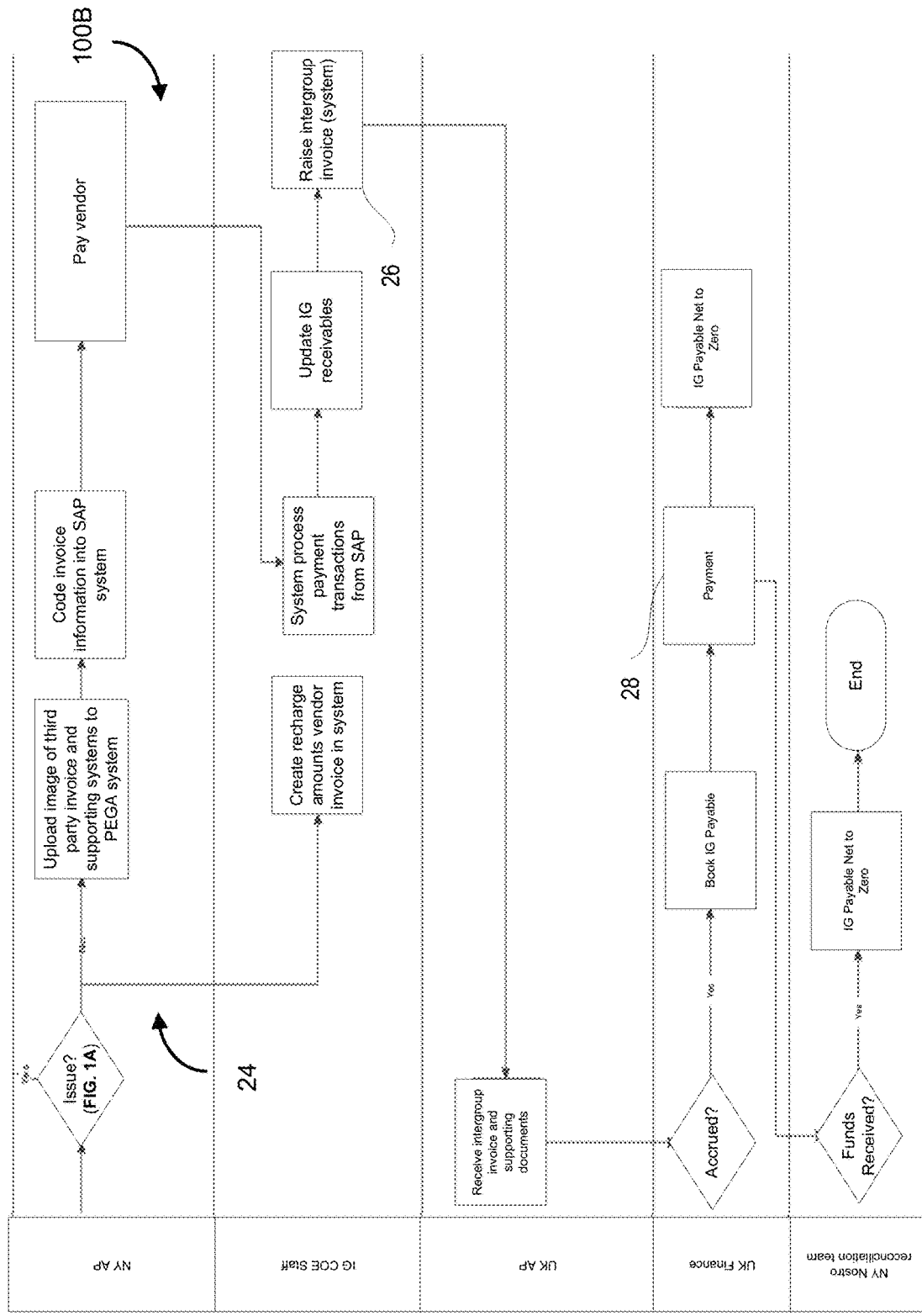
FIG. 1C is a block schematic diagram of an example system for conducting reconciliations, according to some embodiments, providing an improved computing system for implementing electronic reconciliation of contracts on permissioned distributed ledgers.
FIG. 1D and FIG. 1E are a lookup table showing an alternate representation of the state machine of FIG. 1C, according to some embodiments.

FIG. 1A, continued on FIG. 1B, shows an example process diagram 100A (continued on 100B) of a process for an intragroup payment process utilizing a blockchain data structure backend on a set of distributed ledgers stored on corresponding computing nodes, according to some embodiments.

In this example, an example intragroup payment is contemplated between a the NY business unit 12 and the London (UK unit) 14, for goods or services provided by the vendor 16. The process is adapted to split the payments required between the business units 12 and 14, which enter an agreement to fully cover or split costs in 18, which is stored in a blockchain based accounts payable system (BIGAP). The NY business unit in this case engages the vendor in 20, and handles invoicing with the vendor throughout 22, along with payments throughout 24.

An intergroup invoice is raised in 26, which is provided to the UK accounts payable team along with any supporting documentation, and payment is made from the UK finance team to the NY Nostro reconciliation team in 28.

Figure 1C:
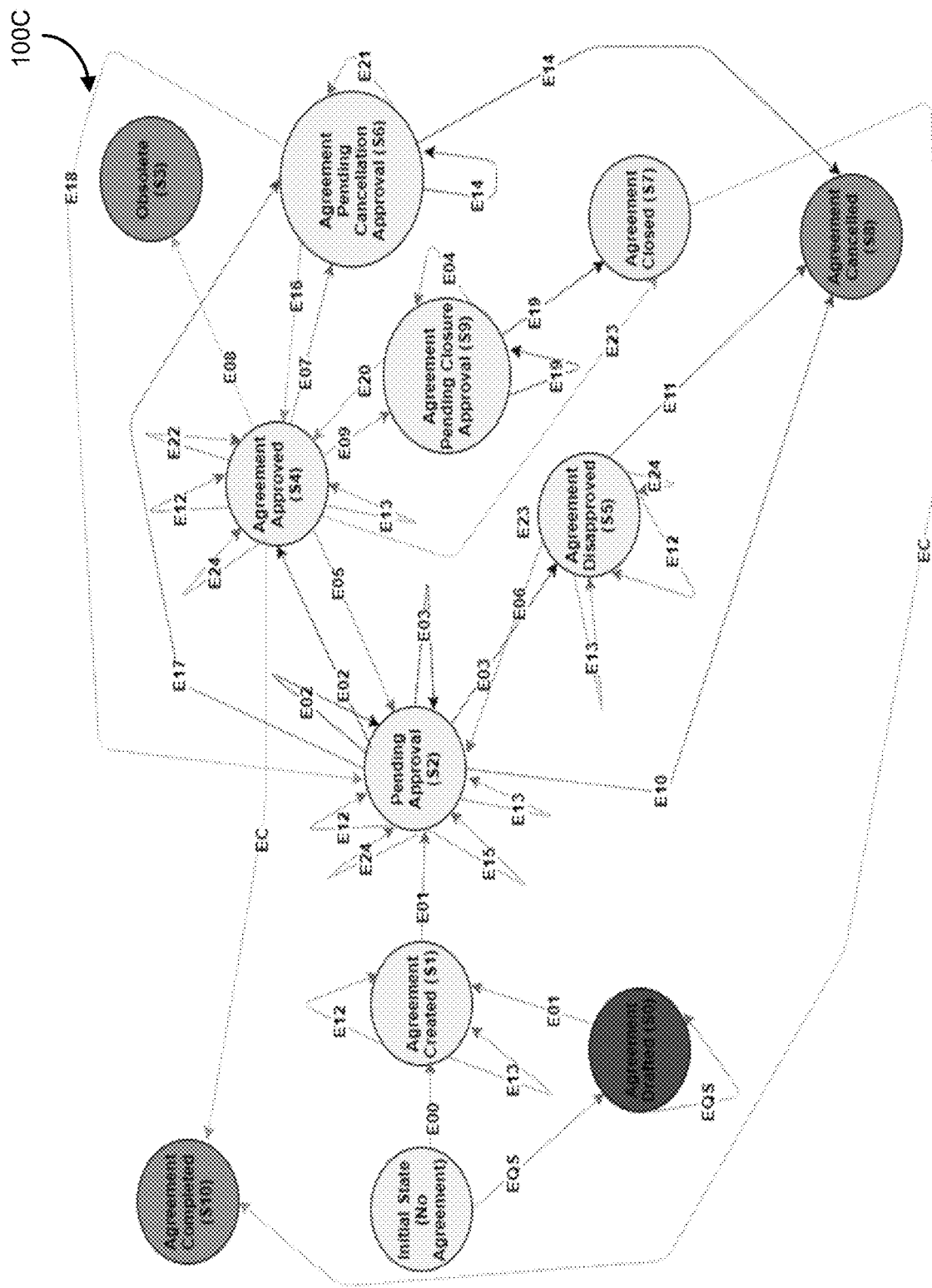

FIG. 1C is an example state machine diagram showing a mechanism for tracking the intergroup payments, according to some embodiments. In the diagram 100C, the agreement state machine used to track the status transition of an agreement within system at any point of time.

The state machine will consists of input alphabets (triggering events) to the state machine and possible input states which will determine the next state for the agreement at any point of time.

The state machine for the agreement object comprises of 11 possible states, out of which 'I' is the initial state and S10 is the final/accepting state. {S0, S1, S2, S3, S4, S5, S6, S7, S8, S9, S10} are possible intermediary states. {E00, E01, E02, E03, E04, E05, E06, E07, E08, E09, E10, E11, E12, E13, E14, E15, E16, E17, E18, E19, E20, E21, E22, E23, E24, EC} are possible inputs to the agreement state machine (coming either from node or UI).
1. Possible States: {I, 'S0', 'S1', 'S2', 'S3', 'S4', 'S5', 'S6', 'S7', 'S8', 'S9', 'S10'}
2. A (Input Alphabets): {EQS, E00, E01, E02, E03, E04, E05, E06, E07, E08, E09, E10, E11, E12, E13, E14, E15, E16, E17, E18, E19, E20, E21, E22, E23, E24, EC}
3. S0 (Start State): I
4. F (Final State): S10

The system will always starts with the Initial State 'I' (No agreement created yet) and the agreement is considered as a complete agreement (EC) when IG Invoices are actually paid.

The state machine may have the following states:

| Symbol | Description |
| --- | --- |
| I | Initial State - No agreement created yet |
| $S_0$ | Agreement Drafted (Quick Save) |
| $S_1$ | Agreement Created |
| $S_2$ | Pending Approval |
| $S_3$ | Obsolete |
| $S_4$ (Internal Event) | Agreement Approved (Overall Approval) |
| $S_5$ (Internal Event) | Agreement disapproved (Overall Disapproval) |
| $S_6$ | Agreement Pending Cancellation Approval |
| $S_7$ | Closed |
| $S_8$ | Agreement Cancelled |
| $S_9$ | Agreement Pending Closure Approval |
| $S_{10}$ | Agreement Complete |

Referring to FIG. 1C, the following events can occur:

| Symbol | Description |
| --- | --- |
| $E_{QS}$ | User creates an agreement draft (quick save) |
| $E_{00}$ | User submits agreement details. |
| $E_{01}$ | Email notification successfully sent to all foreign BU users |
| $E_{02}$ Semi-internal Event | All foreign BU approvers approved the agreement |
| $E_{03}$ Semi-internal Event | All or any foreign BU approver(s) disapproved the agreement |
| $E_{04}$ | Chaincode will receive a rejection event for agreement closure from node side. Internally (E20), chaincode will decide previous flags and status after rejection. |
| $E_{05}$ | An update to an already approved agreement (New agreement - Pending Approval) |
| $E_{06}$ | An update to an already disapproved agreement |
| $E_{07}$ | User cancels an Approved Agreement (No vendor invoices attached). |
| $E_{08}$ Internal Event | An update to an already approved agreement (old agreement - obsolete) |
| $E_{09}$ | User closes an approved agreement. Agreement moved to Agreement Pending Closure Approval status (for Foreign BU approvers' approvals). |
| $E_{10}$ | Agreement cancelled by user (from Pending Approval Status without approvals from any of the approvers) |
| $E_{11}$ | Agreement cancelled by user (from Disapproved by Foreign BU Status) |
| $E_{12}$ | User attaches supporting documents to an agreement. |
| $E_{13}$ | User removes supporting documents to an agreement. |
| $E_{14}$ Semi-internal Event | User approves the agreement cancellation. If all users agreed for the cancellation, agreement will be cancelled. |
| $E_{15}$ | User updates the agreement in "AgreementPendingApproval" Status. Approver Flag will be marked as "Y". |
| $E_{16}$ Internal Event | Internal Event - Chaincode will determine the previous state and flags - Agreement will move back to its previous status - Agreement Approved. |
| $E_{17}$ | User cancels the agreement in pending approval status but with approvals from some of the approvers. |
| $E_{18}$ Internal Event | Internal Event - Chaincode will determine the previous state and flags - Agreement will move back to its previous status - Agreement Pending Approval. |
| $E_{19}$ Semi-internal Event | User approves the agreement closure. If all users agreed for the closure, agreement will be closed. |
| $E_{20}$ Internal Event | If any user rejects the agreement closure - Agreement will move back to its previous status - Approved Agreement with approval flags back to "Y". |
| $E_{21}$ | Chaincode will receive a rejection event for agreement cancellation (from agreement initiator) from node side. Internally, chaincode will decide previous flags and status after rejection. |
| $E_{22}$ Internal Event | Update approved agreement without any validations and flag/status change. |
| $E_{23}$ Internal Event | Internal system call - If an agreement is approved and no vendor invoices are attached to the agreement or if agreement is approved and vendor invoices are attached to that agreement and vendor paid flag is "Y", agreement can be directly moved to "Agreement Closed" directly. |
| $E_{24}$ | Update the agreement owner ID. Old agreement will be cloned as a new agreement and previous agreement will be marked as an obsolete agreement. Status's description of the cloned agreement will be updated along with the previous reference ID pointing to the original agreement. |
| $E_C$ Internal Event | "Funds received by Local BU and IG Receivables credited". Agreement is completed |

When funds are received by local BU and IG receivables are credited, the agreement is marked as "Completed". The transitions E02, E03, and E04 are not transitioned to the next status until approval is received from all foreign BU approvers. EC will be invoked when "Funds Received by Local BU and IG Receivables Credited".

Figure 1E:
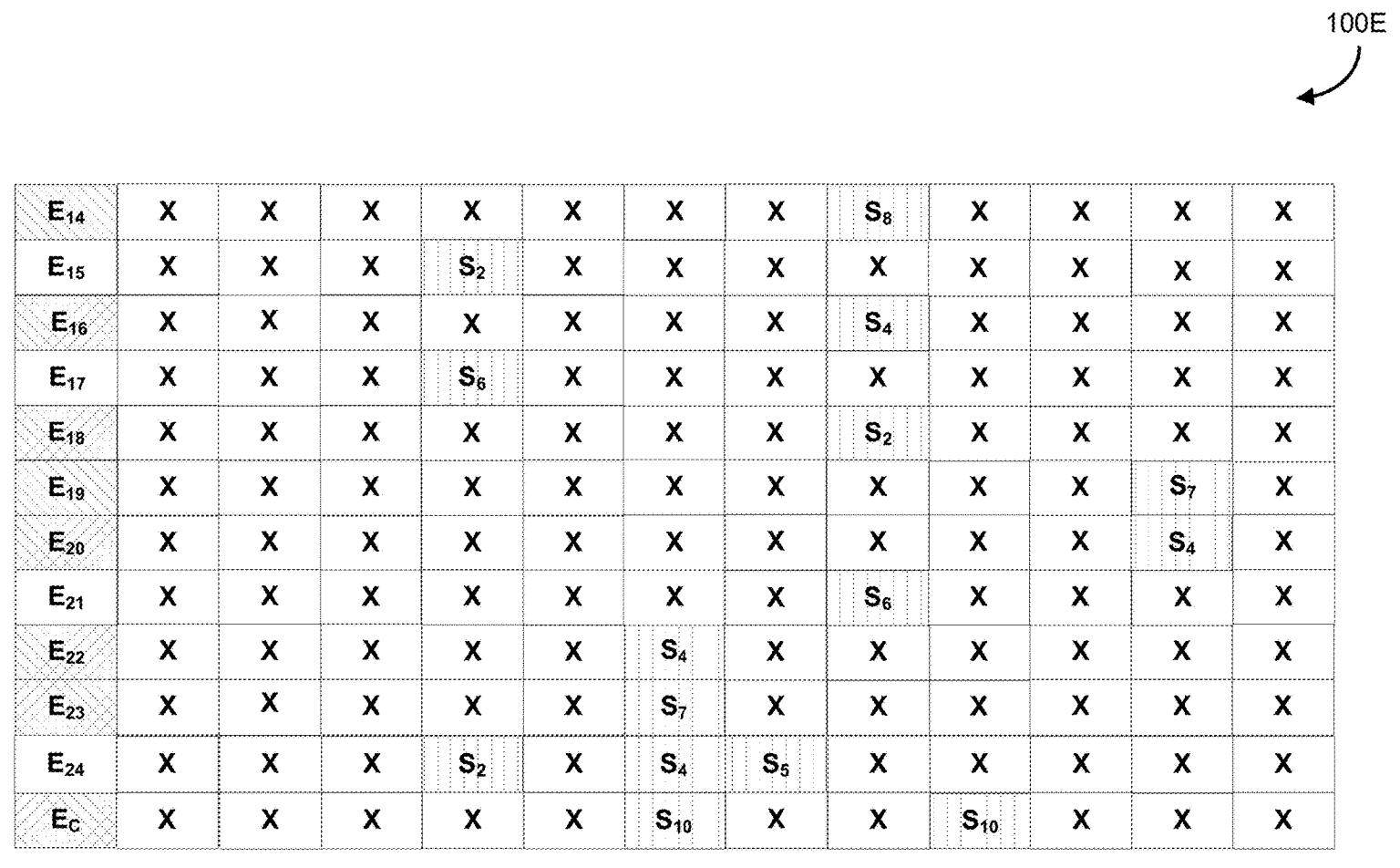

FIG. 1D and FIG. 1E are a lookup table showing an alternate representation of the state machine of FIG. 1C, according to some embodiments. In the lookup table 100D (extended to 100E), several dead states are shown (S3, S7, S8, S10).

A specific technical challenge arising with the implementation of the state machine is how to provide a technical infrastructure that is able to store the state transitions in a difficult to repudiate and transparent manner as between parties that may not trust one another.

In various embodiments described herein, a blockchain-based system having specific technical improvements is provided, the specific technical improvements aiding in reducing the potential for repudiation between the parties while providing a transparent mechanism that can be interfaced by the various parties to cause state transitions, for example, by providing approvals, providing supporting documentation, among others.

As noted in further embodiments, in some aspects, specific tuning and transaction speed enhancements are described that aid in scalability, which is particularly important where the system is required to serve a large volume of agreement objects (e.g., for a multi-national financial institution having a large number of intragroup contracts). As the state machines are computationally expensive to implement from a block transaction perspective, improving transaction throughput is useful in these scenarios.

Figure 2A:
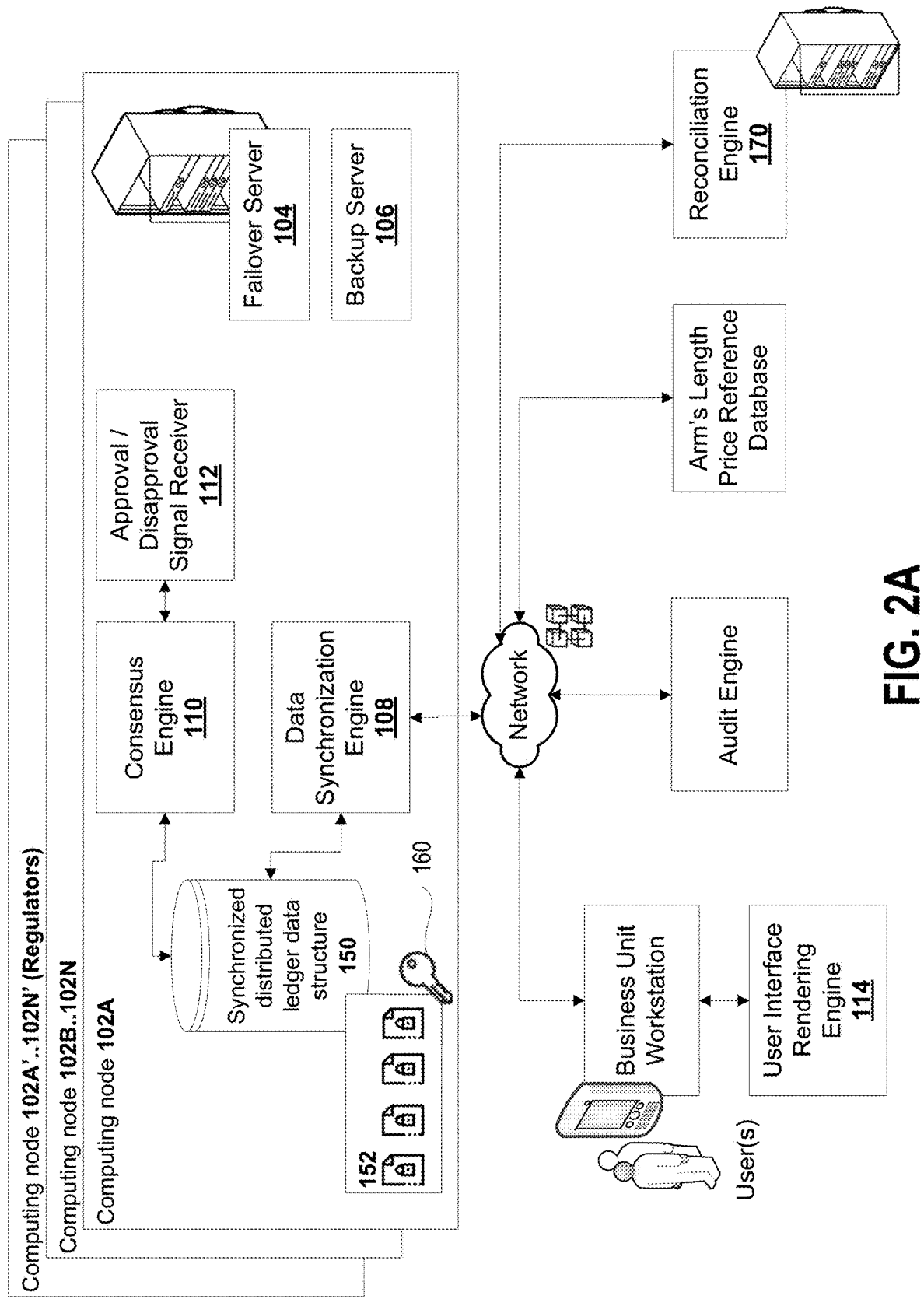
FIG. 2A is a block schematic diagram of an example system for conducting reconciliations, according to some embodiments, providing an improved computing system for implementing electronic reconciliation of contracts on permissioned distributed ledgers.

FIG. 2A is a block schematic diagram of an example system for conducting reconciliations, according to some embodiments, providing an improved computing system for implementing electronic reconciliation of contracts on permissioned distributed ledgers.

A synchronized distributed ledger data structure 150 is maintained across a plurality of computing nodes 102A . . . 102N, each configured to enforce a synchronization protocol for coordinating updates of the synchronized distributed ledger data structure, for example, adding blocks to a blockchain stored on the synchronized distributed ledger data structure 150.

Each computing node 102A . . . 102N stores a synchronized copy of the distributed ledger data structure 150, and updates to the distributed ledger data structure are established first at a node 102A and distributed across all of the computing nodes 102B . . . 102N, for example, through networked communications across a network and signals thereof.

Each computing node 102A . . . 102N is associated with a separate business unit or entity (e.g., NY operates a computing node 102A, London operates another computing node 102B). Computing nodes 102A . . . 102N may include one or a plurality of computer servers and devices, and may include failover servers 104 and backup servers 106.

The synchronized distributed ledger data structure 150 is configured to store one or more blockchain objects 152, which include cross-linked hashed data objects representing specific transactions between parties, and steps taken thereof to approve/disapprove the transactions. In some embodiments, where counteroffers are made, a new agreement is established as opposed to modifying an existing agreement. A data synchronization engine 108 is configured to, along with a consensus engine 110, maintain the data structure and the distributed ledger data structure synchronized in accordance with specific consensus rules as described in various embodiments herein. The approval/disapproval signal receiver 112 is configured to encapsulate new blocks to be added to the blockchain data structure 150 in relation to specific blockchain objects, such as blockchain object 152.

A user interface rendering engine 114 is configured to generate user interfaces for users to be able to generate new agreements, conduct interactions with the backend, or provide approvals/disapprovals (e.g., through graphical user interface objects and interactive controls).

When an input set of data fields is received at a first node (e.g., through a user interface), the input set of data fields is processed as the fields represent parameters of an agreement between a plurality of parties. For example, NY would like to establish an agreement with London in respect of sharing the cost of an underlying services contract with a hundred licenses (NY only needs fifty, so it wishes to share fifty with London and the cost should later be reconciled between the offices). In this case, NY could serve as the first node, and the input set of data fields can be received in NY.

The first node 102A then instantiates a blockchain data structure object 152 incorporating at least the input set of data fields, a series of one or more required approval signals, each required approval signal corresponding to a hidden unique primary key. A transaction is recorded to the blockchain data structure object 152 representing the UI inputs, the object representing a draft agreement requiring consensus.

The transaction record can be propagated, along with other updates to blockchain data structure object 152, across the distributed ledgers, such that through periodic or other synchronization, such that the agreement information is accessible on every distributed ledger. As the network is a trusted network, a block can simply be added to the distributed ledger 150 without proof of work or proof of stake protocols.

A stored record for an agreement can include a hidden unique primary key 160 (e.g., a seed) that can be sequentially or pseudo-randomly for association with the agreement information. The hidden unique primary key 160 can be used with a one-way hash to expose information regarding the agreement, and in some embodiments, the hidden unique primary key 160 is never accessible by any individual human.

The computing nodes 102A . . . 102N may interact with blockchain data structure object 152 by providing approvals (e.g., if a corresponding approval is required), through providing an approval signal signed using a private key corresponding to a second party of the plurality of parties.

When the approval signal is provided, a modification is transmitted to the blockchain data structure object 152 representative of a state transition indicative of an approval by the second party of the agreement represented by the hidden unique primary key. Each approval may be represented in an instruction stored in additional blocks appended to blockchain data structure object 152.

The synchronization protocol of the blockchain data structure 152 is configured to accept the state transition if and only if there exists at least one outstanding required approval of the series of the one or more required approval signals. For example, insertion of an approval cannot occur once the agreement is fully approved, and further approvals are rejected and not added to the blockchain data structure object 152.

When all the approvals are obtained, the blockchain data structure object 152 may be rendered immutable yet accessible, for example, through a consensus mechanism that does not allow further transactions in relation to an agreement.

In a variant embodiment, the computing nodes may also be configured for generating and providing disapproval signals. The disapproval signals may represent modifications to the terms or simply rejection of the terms. In this case, when a disapproval signal is encapsulated in a block added to blockchain data structure 152, the agreement on blockchain data structure object 152 may, in some embodiments, rendered unmodifiable and flagged as disapproved.

If the disapproval signal, signed using the private key corresponding to a second party of the plurality of parties, includes a new set of input data fields, a separate agreement may be instantiated on blockchain data structure object 152, representing a new agreement. Accordingly, a new chain can be generated if a counter-proposal for agreement is provided.

The hidden unique primary key 160, in some embodiments, can be used as a pseudorandom seed common to transactions relating to a specific agreement.

In an aspect, hash functions generated based on the pseudorandom seed, stored in block headers, in concert, enable verification of the blockchain data structure object by parsing only a subset of the blocks of the blockchain data structure (e.g., verification through a Merkle tree).

The synchronized distributed ledger data structure, in some embodiments, is periodically processed by a reconciliation engine 170 to conduct a financial reconciliation process between the plurality of parties. Accordingly, the financial reconciliation process provides for automatic processing of transactions (e.g., funds disbursements, general ledger updates).

In another aspect, the financial reconciliation engine 170 is configured for controlling transactions of funds between the plurality of parties based on the input set of data fields stored on the blockchain data structure 150.

In another aspect, the method further includes controlling a display 172 to render a graphical user interface including visual interface elements for receiving the input set of data fields.

In another aspect, the plurality of computing nodes includes at least a first group of computing nodes 102A . . . 102N that are configured for the operations relating to the blockchain data structure into the distributed ledger data structure and the receiving of the approval signal or a disapproval signal, and a second group of computing nodes 102A' . . . 102N' that are configured only for receiving of the approval signal or the disapproval signal. The different types of node allow for node differentiation, whereby some nodes can make blocks, others can only approve.

In another aspect, the second group of computing nodes 102A' . . . 102N' are associated with regulator entities, and the second group of computing nodes 102A' . . . 102N' can, in some preferred embodiments, be configured to automatically process the blockchain data structure to conduct an assessment of the input set of data fields in accordance with a set of business rules, and based at least on the assessment, generate either the approval signal or the disapproval signal.

Transactions can be checked against transaction thresholds, and, for example, to ensure that an arm's length value of a transaction is maintained. In another aspect, the set of business rules includes automatic generation of the approval signal if the input set of data fields, in concert, represent a transaction having a value below or equal to a pre-defined threshold.

In another aspect, the set of business rules includes an assessment of whether the input set of data fields are in violation of arm's length pricing guidelines, and the second group of computing nodes are configured for interconnection with one or more data storage devices maintaining reference data records of comparable arm's length transactions. In another aspect, the set of business rules includes automatic generation of the approval signal if the assessment indicates that the transaction is within a pre-defined threshold value range established through traversing the reference data records. In another aspect, the set of business rules includes automatic generation of the disapproval signal if the assessment indicates that the transaction is beyond a pre-defined threshold value range established through traversing the reference data records.

Figure 2B:
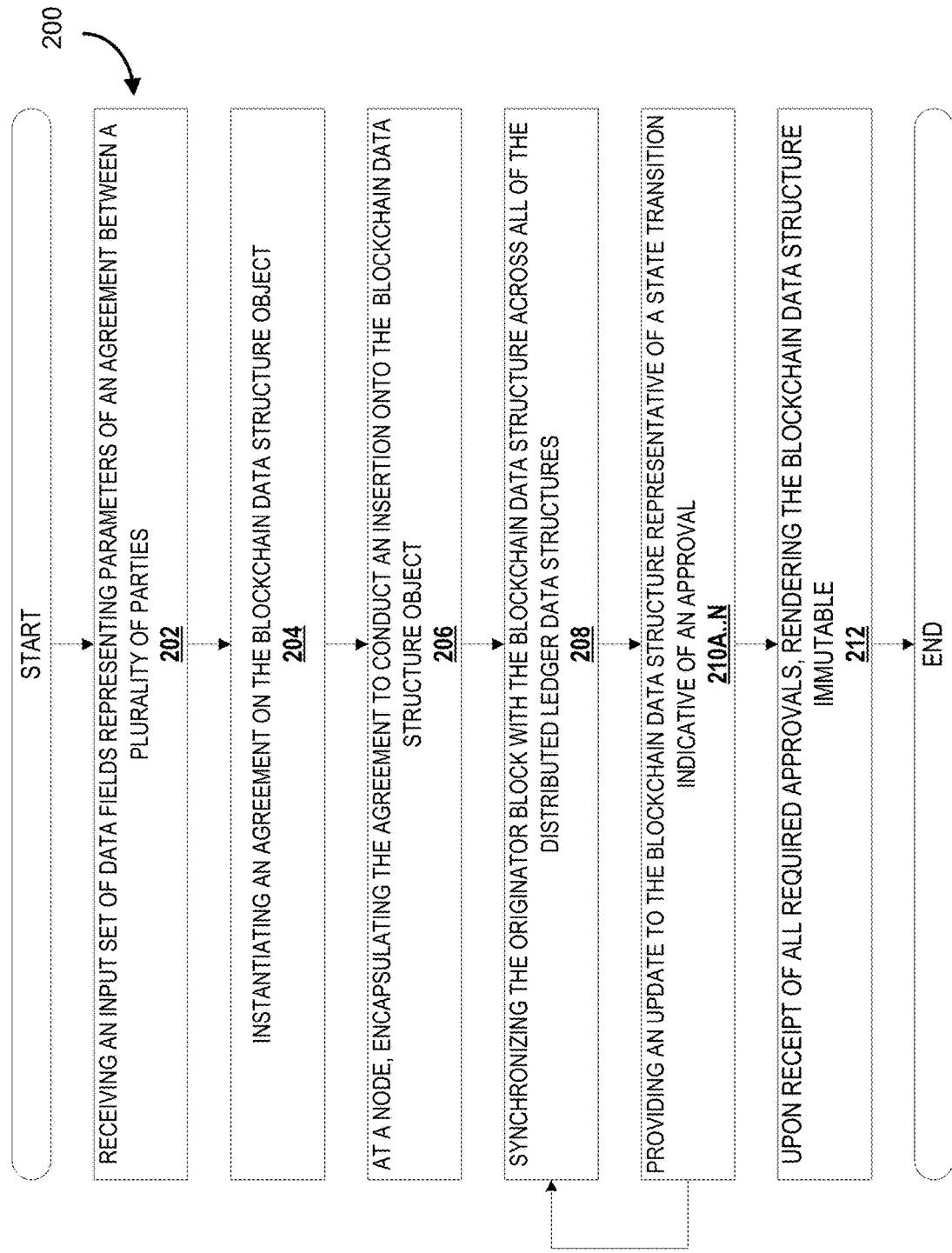
FIG. 2B is a method diagram of an example method for storing contract data structures on permissioned distributed ledgers, according to some embodiments.

FIG. 2B is a method diagram of an example method for storing contract data structures on permissioned distributed ledgers, according to some embodiments.

In FIG. 2B, method 200 includes, at 202, receiving an input set of data fields representing parameters of an agreement between a plurality of parties, at 204, instantiating an agreement object on a blockchain data structure object incorporating at least the input set of data fields, a series of one or more required approval signals, each required approval signal corresponding to a hidden unique primary key, and at 206, inserting the agreement information in the form of a data object on the blockchain data structure, and updating the distributed ledger data structure of a first node of the plurality of computing nodes, the first node associated with a first party of the plurality of parties.

At 208, the agreement object is synchronized with corresponding blockchain data structures across all of the distributed ledger data structures of the plurality of computing nodes.

At 210A . . . N, new information is inserted to the blockchain data structure representative of a state transition indicative of an approval by the second party of the agreement represented by the hidden unique primary key. The new information can be inserted, by way of transactions records appended to the blockchain data structure.

This step may be conducted multiple times as each approval is provided, and, for example, in some embodiments, the synchronization protocol is configured to accept the insertion of the new information if and only if there exists at least one outstanding required approval of the series of the one or more required approval signals. Accordingly, the blockchain data structure objects relating to the agreement can be rendered immutable at 212 when all of the required approvals are obtained.

Figure 3:
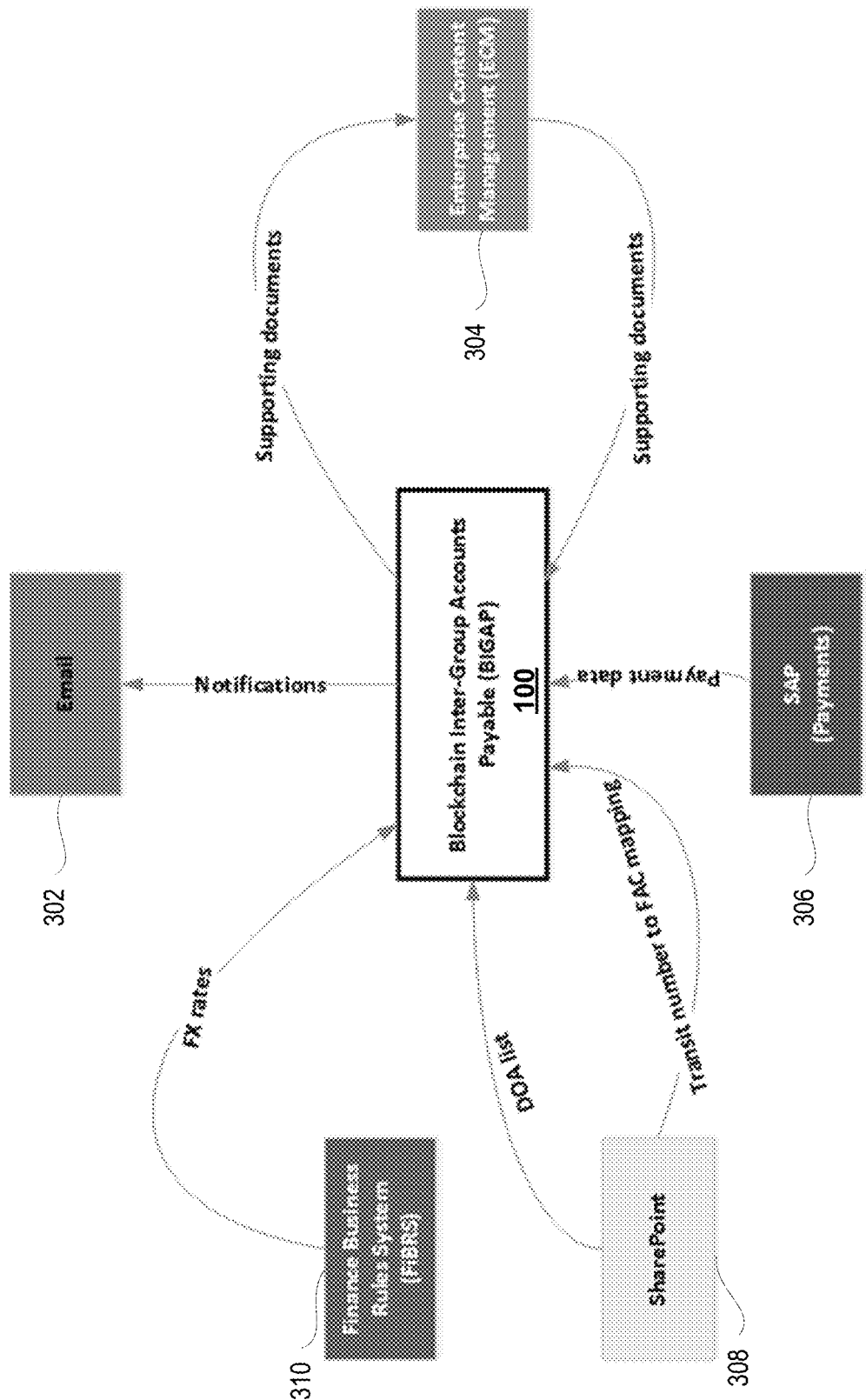
FIG. 3 is an example architecture diagram illustrating computing systems and other platforms that interact with the system, according to some embodiments.

FIG. 3 is an example architecture diagram illustrating computing systems and other platforms that interact with the system, according to some embodiments.

In FIG. 3, the various systems may interact with the distributed ledger maintained by the blockchain inter-group accounts payable system (system 100), which are utilized for conducting notifications (e.g., email) 302, storing documentation (e.g., enterprise content management) 304, conducting reconciliations (e.g., SAP™ or other enterprise resource planning platforms) 306, mapping financial information, such as transit numbers (e.g., using Microsoft Sharepoint™) 308, and retrieving reference data, such as financial exchange rates (e.g., through a financial business rules system such as FiBRS™) 310.

Figure 4:
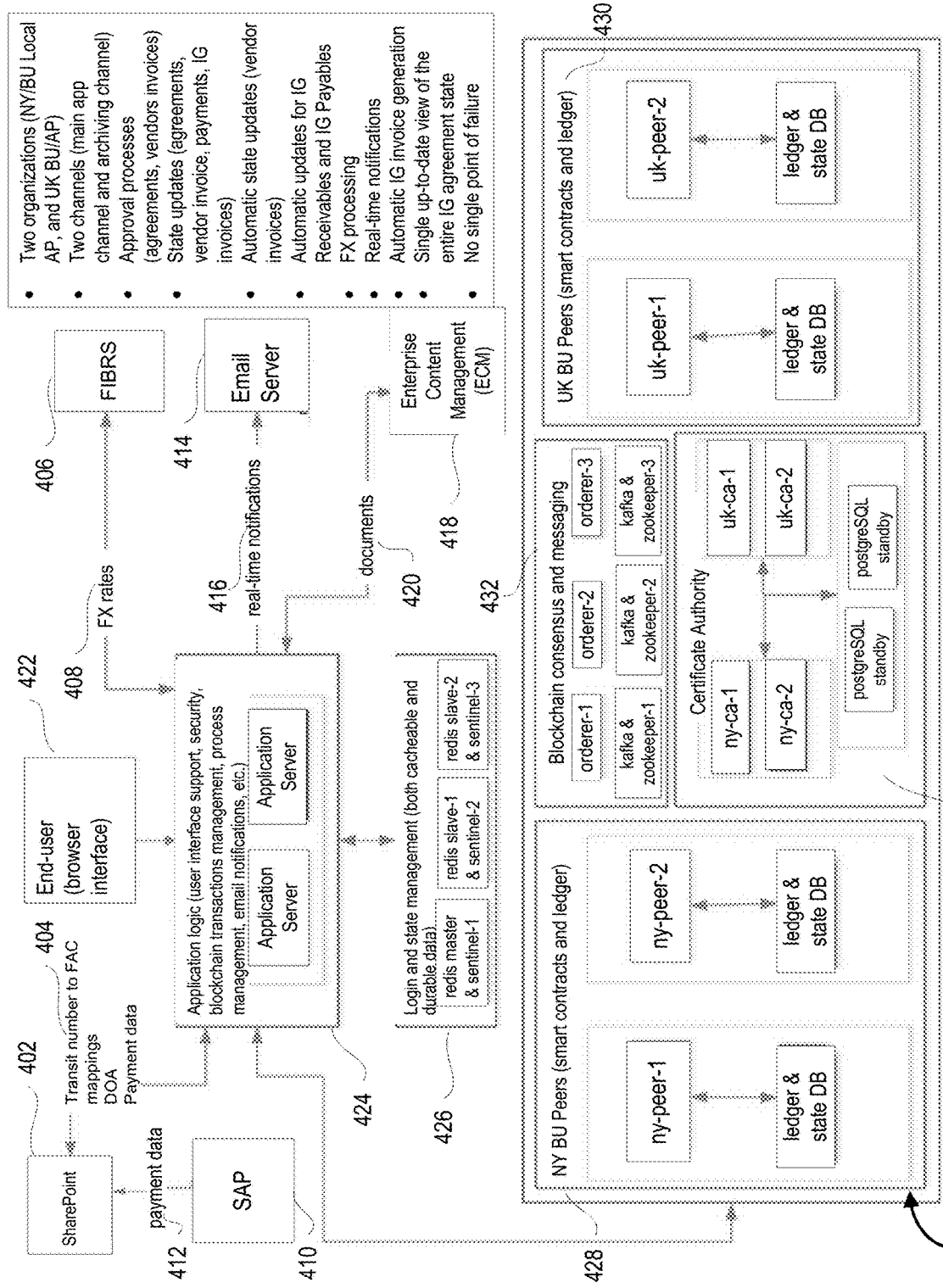
FIG. 4 is an example architecture diagram illustrating computing systems and other platforms that can be used to implement the system (referred to as BiGAP), according to some embodiments.

FIG. 4 is an example architecture diagram illustrating computing systems and other platforms that can be used to implement the system 400 (referred to as BIGAP), according to some embodiments.

SharePoint Server 402

SharePoint 402 is accessed by BIGAP to retrieve transit number to FAC mappings, Delegation of Authority (DOA) list, FX rates, and SAP payment data excel spreadsheet 404.

FiBRS 406

FiBRS 406 is accessed by BIGAP for retrieving the foreign exchange rate 408.

SAP 410

Data extracted from SAP 410 provides vendor information and payment data 412.

Email Server 414

Email server 414 in the architecture is used for delivering notifications (e.g., Agreement creation, Approval messages, etc.) 416 generated by BIGAP to users such as Agreement Initiators, Agreement Recipients, AP Initiator, AP Recipients, Enterprise Content Management 418

The Enterprise Content Management (ECM) platform 418 is used for retrieving/storing documents 420 that are accessed/created by the BIGAP solution.

BIGAP User Interface 422

BIGAP User interface 422 can be an Angular front end allowing Agreement Initiators, Agreement recipients, Account Payable (AP) initiators and AP recipients to access the capabilities provided by the application, BIGAP Application Servers 424

BIGAP application servers 424 can be Node JS servers providing the following capabilities:

- Provides the primary interface to the Blockchain network (and underlying distributed ledger) through the invocation of user defined and system chain codes using the Hyperledger Fabric provided Node SDK;
- Delivers a set of APIs for front end UI (to support UI capabilities);
- Supports the authentication and authorization of user through integration with Corporate LDAP server and user attributes (e.g. group membership) available in the LDAP; and
- Encapsulates the integration with external systems such as Sharepoint, SAP, FIBRS, Email server and handles relevant protocol and data transformations prior to the invocation of chain codes The component can be deployed in a (minimum) 2 node cluster to provide high availability.

Redis & Sentinel 426

Redis can be used as the in-memory database cache server. Temporary state information such as JSON Web Tokens (JWT), user-to-data locks as well information such as DOA list, transit number to FAC mapping is stored in Redis. There can be, for example, 3 instances of the Redis server with one server as the master and the remaining two servers operating in slave mode.

Each of the Redis server also has the Sentinel server running alongside it for monitoring/service discovery. Sentinel is used to manage the availability of the Redis servers and will elect another Redis instance as the new master if it has detected the existing master Redis instance is no longer available.

NY Business Unit (BU) Hyperledger Fabric Peers 428

NY BU 428 can, for example, host two Hyperledger Fabric peers—ny-peer1 and ny-peer2. Peer ny-peer2 provides redundancy incase ny-peer1 is unavailable. Fabric peers are entities that maintains the ledger (transaction log+world state) and runs chaincode containers to perform read/write operations with the ledger. CouchDB which is a key-value NoSQL database is used as the world state database UK BU Hyperledger Fabric Peers 430

UK BU 430 hosts two Hyperledger Fabric peers—uk-peer1 and uk-peer2. Peer uk-peer2 provides redundancy incase uk-peer1 is unavailable.

Orderers

The ordering service provides the mechanism for provisioning and managing channels and provides total order guarantees for transactions that are delivered to members (peers) of the channel. Its role is to order the transactions on a first-come-first-serve basis for all the channel's on the network.

As shown in the diagram in 432, the orderers used are crash fault tolerant Kafka-Zookeeper™ based orderers. There are three pairs of Kafka-Zookeepers servers providing higher availability for the ordering service. The min.insync.replicas configuration property in Kafka is set to 2.

This implies that data is considered committed when the data is written to 2 Kafka brokers. The defaultreplication. factor configuration property in Kafka is set to 3 which implies each channel will have its data replicated to 3 Kafka brokers. The orderer nodes can be configured to communicate with the Kafka cluster using SSL.

Fabric Certificate Authority 434

Fabric CA 434 is a Certificate Authority for the Hyperledger Fabric blockchain network. It provides features such as:

- Registration of identities, or connects to LDAP as the user registry. In case of MVP, these will connect to the Financial Institution corporate LDAP;
- Issuance of Enrollment Certificates (ECerts) for users, nodes (peers, orderers etc.); and
- Certificate renewal and revocation.

Figure 5:
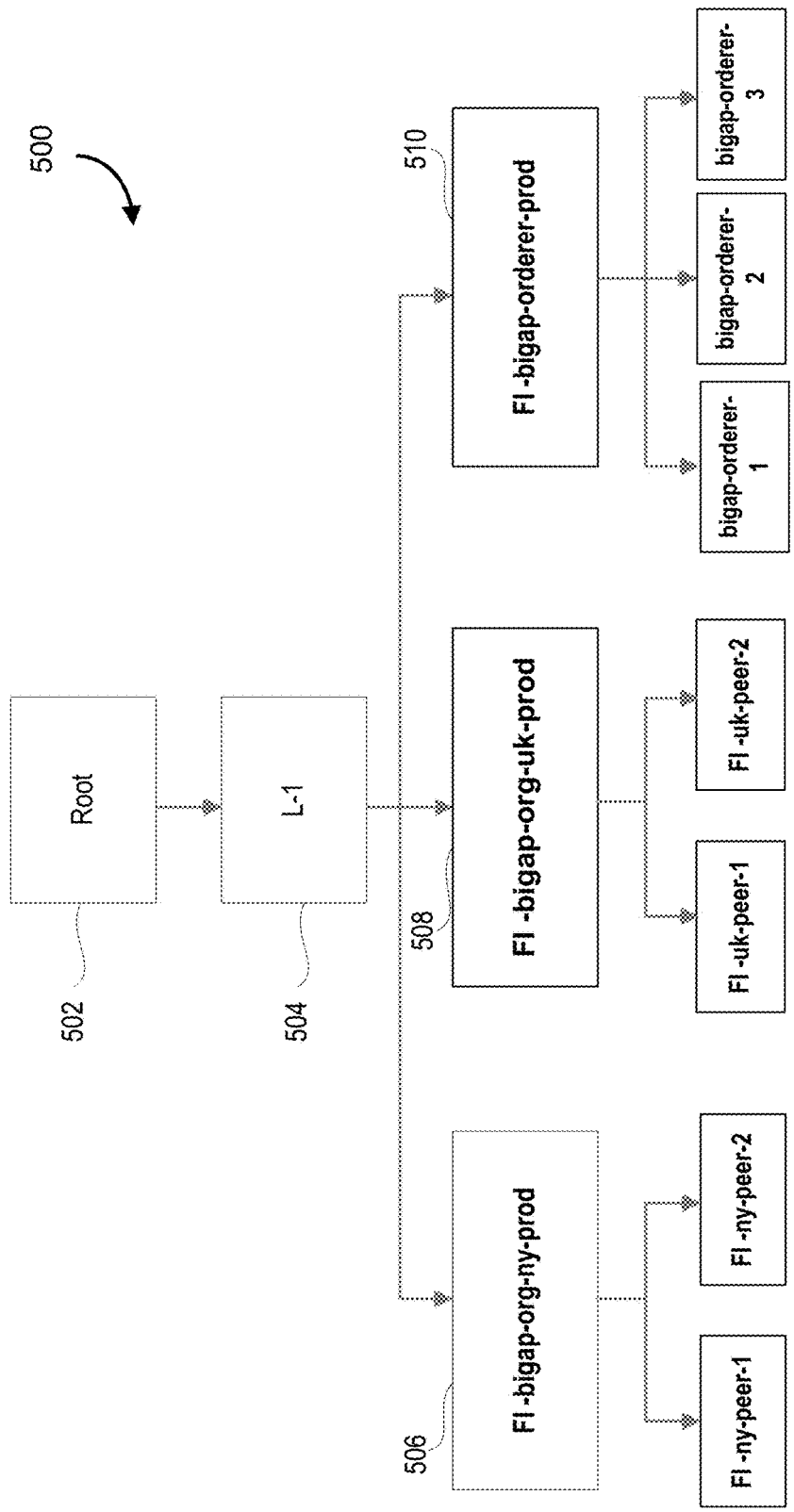
FIG. 5 is a certificate hierarchy diagram showing certificate management across nodes and computing devices, according to some embodiments.

As shown in the diagram, there is a cluster of Fabric CA instances (for high availability) per each organization in the network (New York Business Unit (ny-ca-1, nu-ca-2) and UK (London) Business Unit (uk-ca-1, uk-ca-2)) in the network. Details of provisioning the certificates for the identities in the network is described in other sections of this disclosure. The default database for Fabric CA 434 is SQLite and does not provide Fabric CA 434 to run in a cluster. For Fabric CA 434 to be highly enabled, the Postgre SQL database is used in an active/standby configuration FIG. 5 is a certificate hierarchy diagram showing certificate management across nodes and computing devices 500, according to some embodiments. These certificates are utilized to establish identity and confirm public/private keys, which are then utilized for interacting with the blockchain data structure and distributed ledgers.

In some embodiments, certificates are required to be provisioned for endorsers, orderers, Fabric CA (L2) intermediate CAs, node application, users etc. The certificate creation for nodes (endorser, orderer, Fabric CA L2) are used to be performed to bootstrap the network.

The certificates for the node application is also required to enable the application to persist IG objects onto the Blockchain ledger. However, in some embodiments user certificates are not created ahead of time, they are provisioned on demand (using respective organization's L2 Fabric CA) when the user logs into the application. Ongoing maintenance of these certificates (revocation, expiry, renewal etc.) can be performed for all of these types of certificates.

FIG. 5 illustrates the trust hierarchy of both L2 CAs, nodes deployed to both Financial Institution NY, Financial Institution UK organizations, orderer nodes etc. Root 502 refers to Financial Institution Root CA and L1 504 refers to Financial Institution Intermediate Level 1 CA.

The below section describes a non-limiting example for certificate issuance to establish identities of computing nodes within an organization. FI refers to Financial Institution.

The system can utilize three Level 2 CA (Fabric CA) referred to as FI-bigap-org-ny-prod 506, FI-bigap-org-uk-prod 508 and FI-bigap-orderer-prod 510. The certificates for these level 2 CAs are issued by L1 504. The Certificates issued by the Root CA 502 and L1 504 are based on RSA (2048 key size) and SHA 256. The FI-bigap-org-ny-prod Level 2 CA 506 issues certificates for peer nodes from FI-ny organization. The FI-bigap-org-uk-prod Level 2 CA 508 issues certificates for peer nodes from FI-uk organization. The FI-bigap-orderer-prod 510 issues certificates for the three orderer nodes. The certificates for users are issued by Fabric L2 CA (FI-bigap-org-ny-prod 506 or FI-bigap-org-uk-prod 508) depending upon which organization the user belongs to. A similar approach can be followed for non-production environments such as development (DEV), user acceptance testing (UAT), etc. Level 2 Fabric CA generates X.509 certificates and keys that use Elliptic Curve Digital Signature Algorithm Certificates and Keys—Locations and Management The placement and location of various certificates is described below.

System certificates and private keys can be stored in a separate "/bchain/bigap-certificates" folder that will be shared between VMs running system network nodes (peers, orderers etc.). As per the deployment topology, there may, for example, be five VMs deployed to primary and standby mainframe machines. The /bchain/bigap-cert folder has a complete copy of keys and certificates for all nodes, Fabric CA, users etc. The folder structure of /bchain/bigap-certificates is shown below.

```
/bchain/bigap-certificates/
        admin            (admin folder for certificates generation)
        tls/ (TLS certificates)
        crypto/           (organizations, peers, and orderers
certificates and keys)
                /ordererOrganizations
                /peerOrganizations
        fabric-ca-server/
                /FI-ny (Financial Institution-NY certificates and private
key)
                /FI-uk (Financial Institution-UK certificates and private
key)
        fabric-user-keys/ (end-user keys)
        fabric-user-certificates/ (end-user certificates)
```

Endorsers' certificates and keys can be stored in a keystore located in /bchain/bigap-certificates/crypto/peerOrganization.

Orderers' certificates and keys can be located in a keystore located in its local folder (/bchain/bigap-certificates/crypto/ordererOrganizations.

Fabric CA servers (NY and UK) can have their certificates and private keys stored in /bchain/bigap-certificates/fabric-ca-server folder.

Node.js servers can also have their own keystore (/bchain/bigap-certificates/fabric-user-keys and /bchain/bigap-certificates/fabric-user-certificates) that will contain certificates and private keys for all users that will be accessing the blockchain via the BIGAP application running on the servers.

The/admin folder can be used to store created certificates and CSRs for all nodes, users, etc. This folder provides a working area for administrator (when generating the certificates), the generated certificates are moved and placed in respective folders describe earlier.

All keystore folders are under single file system folder (/bchain/bigap-certificates) and respective sub folders as described above. The single folder provides a separation of the management, setup, and access control for the keystore related folders from all other application folders.

The following access control will be implemented for above listed keystores:

Restrict access to all sub-folders under /bchain/bigap-certificates only to the BIGAP application user that is a Linux user. No other users will have that access.

In some embodiments, the implementation includes the usage of Level 2 Intermediate CAs with PostgreSQL database, and users' ECerts will also be stored in the PostgreSQL database.

An example certificate creation process for L2 certificates is further described below.

Certificate Creation Requests for L2 CA and Nodes (Endorser, Orderer)

The current Financial Institution naming convention for the subordinate CA certificates L2 is explained below.

Common Name: Purpose or usage-environment-server name or location of the CA.

Application: application acronym (BIGAP)

Purpose or usage: specify the certificate's purpose (ORG or ORDERER)

Environment: PROD, DR, UAT, QA, DEV

For instance: Financial Institution-BIGAP-ORG-NY-PROD

Other Attributes:

O=Financial Institution X

C=CA

For example, this is how one could create a CSR for an L2 certificate for Financial Institution Canada organization:

```
$ openssl ecparam -out Financial Institution-BIGAP-ORG-NY-PROD.key -name
prime256v1 -genkey -noout
$ openssl req -new -key Financial Institution-BIGAP-ORG-NY-PROD.key -out
Financial Institution-BIGAP-ORG-NY-PROD.csr
You are about to be asked to enter information that will be incorporated
into your certificate request.
What you are about to enter is what is called a Distinguished Name or a DN.
There are quite a few fields but you can leave some blank
For some fields there will be a default value,
If you enter '.', the field will be left blank.
-----
Country Name (2 letter code) [XX]:CA
State or Province Name (full name) [ ]:
Locality Name (eg, city) [Default City]:.
Organization Name (eg, company) [Default Company Ltd]:Financial Institution X
Organizational Unit Name (eg, section) [ ]:
Common Name (eg, your name or your server's hostname) [ ]:Financial Institution-
BIGAP-ORG-NY-PROD
Email Address [ ]:
Please enter the following 'extra' attributes
to be sent with your certificate request
A challenge password [ ]:
An optional company name [ ]:
$
```

As described earlier, in this example, there can be three L2 Certificates and thus the total number of CSRs to create is three:

| | |
|---|---|
| Financial Institution-BIGAP-ORG-NY-PROD | (created above; Financial Institution NY) |
| Financial Institution- BIGAP-ORG-UK-PROD | (Financial Institution UK) |
| Financial Institution- BIGAP-ORDERER-PROD | (Orderer) |

After the CSRs creation there are three pairs of (CSR, private key):
    Financial Institution-BIGAP-ORG-NY-PROD.csr, Financial Institution-BIGAP-ORG-NY-PROD.key
    Financial Institution-BIGAP-ORG-UK-PROD.csr, Financial Institution-BIGAP-ORG-UK-PROD.key
    Financial Institution-BIGAP-ORDERER-PROD.csr, Financial Institution-BIGAP-ORDERER-PROD.key Peers Certificates and Keys Creation
    Example commands are shown below.
Generate Private Keys for Peers
    cd/bigap-certificates/admin/peers-ords
    openssl ecparam -out FI-uk-peer-1-key.pem -name prime256v1 -genkey -noout
    openssl ecparam -out FI-uk-peer-2-key.pem -name prime256v1 -genkey -noout
    openssl ecparam -out FI-ny-peer-1-key.pem -name prime256v1 -genkey -noout
    openssl ecparam -out FI-ny-peer-2-key.pem -name prime256v1 -genkey -noout
Generate CSRs for Peers
    openssl req -new -key FI-uk-peer-1-key.pem -out FI-uk-peer-1.csr -subj "/C=CA/ST=Ontario/L=Toronto/O=Financial Institution X/CN=FI-uk-peer-1"
    openssl req -new -key FI-uk-peer-2-key.pem -out FI-uk-peer-2.csr -subj "/C=CA/ST=Ontario/L=Toronto/O=Financial Institution X/CN=FI-uk-peer-2"
    openssl req -new -key FI-ny-peer-1-key.pem -out FI-ny-peer-1.csr -subj "/C=CA/ST=Ontario/L=Toronto/O=Financial Institution X/CN=FI-ny-peer-1"
    openssl req -new -key FI-ny-peer-2-key.pem -out FI-ny-peer-2.csr -subj "/C=CA/ST=Ontario/L=Toronto/O=Financial Institution X/CN=FI-ny-peer-2"
Generate Certificates for Peers
    openssl ca -batch -in FI-ny-peer-1.csr -out FI-ny-peer-1.pem -days 1095 -md sha256 -config openssl.cnf -keyfile ../org-ord/Financial Institution-BIGAP-ORG-NY-PROD.key -cert ../org-ord/Financial Institution-BIGAP-ORG-NY-PROD.cer -extensions usr_cert
    openssl ca -batch -in FI-ny-peer-2.csr -out FI-ny-peer-2.pem -days 1095 -md sha256 -config openssl.cnf-keyfile ../org-ord/Financial Institution-BIGAP-ORG-NY-PROD.key -cert ../org-ord/Financial Institution-BIGAP-ORG-NY-PROD.cer -extensions usr_cert
    openssl ca -batch -in FI-uk-peer-1.csr -out FI-uk-peer-1.pem -days 1095 -md sha256 -config openssl.cnf-keyfile ../org-ord/Financial Institution-BIGAP-ORG-UK-PROD.key -cert ../org-ord/Financial Institution-BIGAP-ORG-UK-PROD.cer -extensions usr_cert
    openssl ca -batch -in FI-uk-peer-2.csr -out FI-uk-peer-2.pem -days 1095 -md sha256 -config openssl.cnf-keyfile ../org-ord/Financial Institution-BIGAP-ORG-UK-PROD.key -cert ../org-ord/Financial Institution-BIGAP-ORG-UK-PROD.cer -extensions usr_cert
Generate Private Keys for Orderers
    openssl ecparam -out bigap-orderer-1-key.pem -name prime256v1 -genkey -noout
    openssl ecparam -out bigap-orderer-2-key.pem -name prime256v1 -genkey -noout
    openssl ecparam -out bigap-orderer-3-key.pem -name prime256v1 -genkey -noout
Generate CSRs for Orderers
    openssl req -new -key bigap-orderer-1-key.pem -out bigap-orderer-1.csr -subj "/C=CA/ST=Ontario/L=Toronto/O=Financial Institution X/CN=bigap-orderer-1"
    openssl req -new -key bigap-orderer-2-key.pem -out bigap-orderer-1.csr -subj "/C=CA/ST=Ontario/L=Toronto/O=Financial Institution X/CN=bigap-orderer-2"
    openssl req -new -key bigap-orderer-3-key.pem -out bigap-orderer-1.csr -subj "/C=CA/ST=Ontario/L=Toronto/O=Financial Institution X/CN=bigap-orderer-3"
Generate Certificates for Orderers
    openssl ca -batch -in bigap-orderer-1.csr -out bigap-orderer-1.pem -days 1095 -md sha256 -config openssl.cnf -keyfile ../org-ord/Financial Institution-BIGAP-ORDERER-PROD.key -cert ../org-ord/Financial Institution-BIGAP-ORDERER-PROD.cer -extensions usr_cert
    openssl ca -batch -in bigap-orderer-2.csr -out bigap-orderer-2.pem -days 1095 -md sha256 -config openssl.cnf-keyfile ../org-ord/Financial Institution-BIGAP-ORDERER-PROD.key -cert ../org-ord/Financial Institution-BIGAP-ORDERER-PROD.cer -extensions usr_cert
    openssl ca -batch -in bigap-orderer-3.csr -out bigap-orderer-3.pem -days 1095 -md sha256 -config openssl.cnf -keyfile ../org-ord/Financial Institution-BIGAP-ORDERER-PROD.key -cert ../org-ord/Financial Institution-BIGAP-ORDERER-PROD.cer -extensions usr_cert Once the keys and certificates are generated the Membership Service Provider configuration for each peer, orderer needs to be configured as shown in the following example.

Peers MSP Configuration (Financial Institution NY example)
/bchain/bigap-certificates/crypto/peerOrganizations/FI-ny
    /msp
        /admincerts
            FI-org-prod-ny.pem (this is the FI-ny Level 2 Certificate)
            FI-ny peers certificates
            FI-ny admin certificate
        /cacerts
            root.pem (Financial Institution Root CA Certificate)
        /intermediatecerts
            I1.pem, FI-org-prod-ny.pem
            (Financial Institution L1 CA Certificate and FI-ny Level 2 Certificate)
        /signcerts

```
            FI-org-prod-ny.pem (this is the FI-ny Level 2 Certificate)
            FI-ny admin cert
            and other user cert operating via core admin tasks (etc., peers joining
a channel, deploy chaincode, etc.)
        /tlscacerts
            Financial Institution Root CA
    /peers
        /FI-ny-peer-1
            /admincerts
                FI-ny-peer-1.pem (Peer 1 cert issued by FI-ny Level 2 CA)
            /cacerts
                root.pem (Financial Institution Root CA Certificate)
            /intermediatecerts
                I1.pem, FI-org-prod-ny.pem
                (Financial Institution Level 1 CA Certificate and FI-ny Level 2
Certificate)
            /signcerts
                FI-ny-peer-1.pem (Peer 1 Cert issued by FI-ny-org Level 2 CA)
                FI-ny admin users' certificates
            /keystore
                FI-ny-peer-1-key.pem (private key)
                FI-ny admin user private key
        FI-ho-peer-2
            /admincerts
                FI-ny-peer-2.pem (Peer 2 Cert issued by FI-ny-org Level 2 CA)
            /cacerts
                root.pem
                (Financial Institution Root CA Certificate)
            /intermediatecerts
                I1.pem, FI-org-prod-ny.pem
                (Financial Institution Level 1 CA Certificate and FI-ny-org Level
2 Certificate)
            /signcerts
                FI-ny-peer-2.pem (Peer 2 Cert issued by FI-ny-org Level 2 CA)
                FI-ny admin users' certificates
            /keystore
                FI-ny-peer-2-key.pem (private key)
                FI-ny admin user private key
    /tlsca
        ca-cert.pem (Financial Institution Root CA)
    /users admin users folder
        /FIadm
            /admincerts
                FIadm user cert
            /cacerts
                FI-ny org cert
                Financial Institution CA root cert
                Financial Institution CA chain (L1 and root certificates)
            /keystore
                FIadm user's private key
            /signcerts
                FIadm user's sign cert
Orderers MSP Configuration
/bchain/bigap-certificates/crypto/ordererOrganizations/bigap-orderer/
    /msp
        /admincerts
            certificates of all orderers (e.g., bigap-orderer-1,bigap-orderer-2,bigap-
orderer-3)
        /cacerts
            root.pem
            (Financial Institution Root CA Certificate)
        /intermediatecerts
            I1.pem, bigap-orderer.pem
            (Financial Institution L1 CA Certificate and FI-orderer Level 2
        Certificate)
        /signcerts
            bigap-orderer.pern (FI-orderer Level 2 Certificate)
        /tlscacerts
            root.pem
            (Financial Institution Root CA Certificate)
    /orderers
        /bigap-orderer-1
            /admincerts
                bigap-orderer-1.pem
                    (Orderer 1 Cert issued by bigap-orderer Level 2 CA)
            /cacerts
                root.pem
                    (Financial Institution Root CA Certificate)
            /intermediatecerts
```

```
                I1.pem, FI-orderer.pem
                (Financial Institution Level 1 CA Certificate and bigap-orderer
Level 2 Certificate)
            /signcerts
                bigap-orderer-1.pem
                (Orderer 1 Cert issued by bigap-orderer Level 2 CA)
            /keystore
                bigap-orderer-1-key.pem
                (bigap-orderer-1 private key)
            /tlscacerts
                Financial Institution root CA cert
    /tlsca
        Financial Institution root CA cert
    /users     admin users' certificates
        /FIadmny
            /msp
                /admincerts
                    FIadm user cert
                /cacerts
                    FI-ho org cert
                    Financial Institution CA root cert
                    Financial Institution CA chain (L1 and root certificates)
                /keystore
                    FIadm user's private key
                /signcerts
                    FIadm user's sign cert
        /FIadmuk
            /msp
                /admincerts
                    FIadm user cert
                /cacerts
                    FI-uk org cert
                    Financial Institution CA root cert
                    Financial Institution CA chain (L1 and root certificates)
                /keystore
                    FIadm user's private key
                /signcerts
                    FIadm user's sign cert
    /... (other admin users)
```

Credential Management

In some embodiments, end user credentials can be managed in LDAP. The application uses such credentials to authenticate users and enforce role based access control for application functionality. The system requires additional credentials that are used by run-time components and ops/admin users. These credentials will be logged in a privileged access manager (e.g., HiPam™). An example list of such credentials is described below:

All Hyperledger Fabric components processes will execute under an app id. This is the only id with privileges to access key stores, etc.

Fabric CA PostgreSQL database server Linux user.

Example approaches to avoid double spending and locking the blockchain are described below. Other approaches are also contemplated.

Approach 1: Use Hyperledger Fabric's underlying Multiversion concurrency control (MVCC): Hyperledger Fabric uses MVCC to make sure there is no double spending or inconsistency in data. In a scenario where two users are simultaneously updating the data, request data that is first in the read-write set will be committed to the ledger and the second request will be rejected. This approach ensures data consistency but leads to poor user experience as the user who received the error, will have to resubmit the data.

Approach 2: Lock editable data using Redis in the Node layer: In this approach, data (e.g Agreement) that can be updated simultaneously by multiple users will be intercepted by the Node layer. The UUID of the agreement data along with the userId will be cached in Redis with a time-to-expire value before delivering to the UI. This way the second request for the same data will receive a lock error and will not be allowed to make updates until either the first user has completed editing the data and the cached key in Redis is cleared or the lock has expired. With this approach, the user will not receive an error after submitting the transaction. The disadvantage of this approach is that data is cached in Redis and there is an additional dependency on it. Another cons belongs to the fact that when the chaincode is accessed via interfaces that enables direct chaincode calls (e.g., CLI) the locking will not be provide.

Note that there is still a very small probability based on timing of the request messages that Redis might not be able to set the lock which will result in two users attempting to update the same data but on submission, Fabric's MVCC as described in approach 1 will allow only one of the user to update the data. The locking for Agreement updates will support UI interface. Also the global lock for creation and update of any object during the batch processing within the maintenance window will also be supported. Redis takes care of a lock expiration.

Approach 3: Add version information in the chaincode query response: In this approach, when the UI user requests data for updating or deleting, the chaincode will also return a version information. The version is incremented every time an object is updated. When the UI layer updates the data, the chaincode compares the version received in the request with the version currently in the ledger. If the version does not matches, an error will be generated by the chaincode and will be returned to the UI user. This approach ensures data consistency. If two users concurrently try to update the same version of an agreement but they save their updates at different time the last one who saves will receive an error since chaincode increments version value for each save.

With this approach, chaincode needs to implement lock expiration. At the same time this option would also replace CouchDB MVCC.

Approach 4: Lock editable data in the chaincode: In this approach, data locking is performed by the chaincode. With this approach, one can ensure data consistency but the lock can only be released if the user that locked the data is done performing the updates. There is no default time-to-live in this approach and needs custom coding to build this feature in the chaincode. This approach also requires that request messages that were initially blockchain queries (request for fetching data) will now be required to be blockchain transactions (to set the lock in the ledger) increasing transaction response time.

This option would also replace CouchDB MVCC that is the core CouchDB and Fabric concurrency mechanism.

For the solution, approach 2, in a preferred embodiment, is used as it provides better user experience, less custom coding and auto-release of the lock in case the user does not completes the transaction while still owning the lock.

Figure 6:
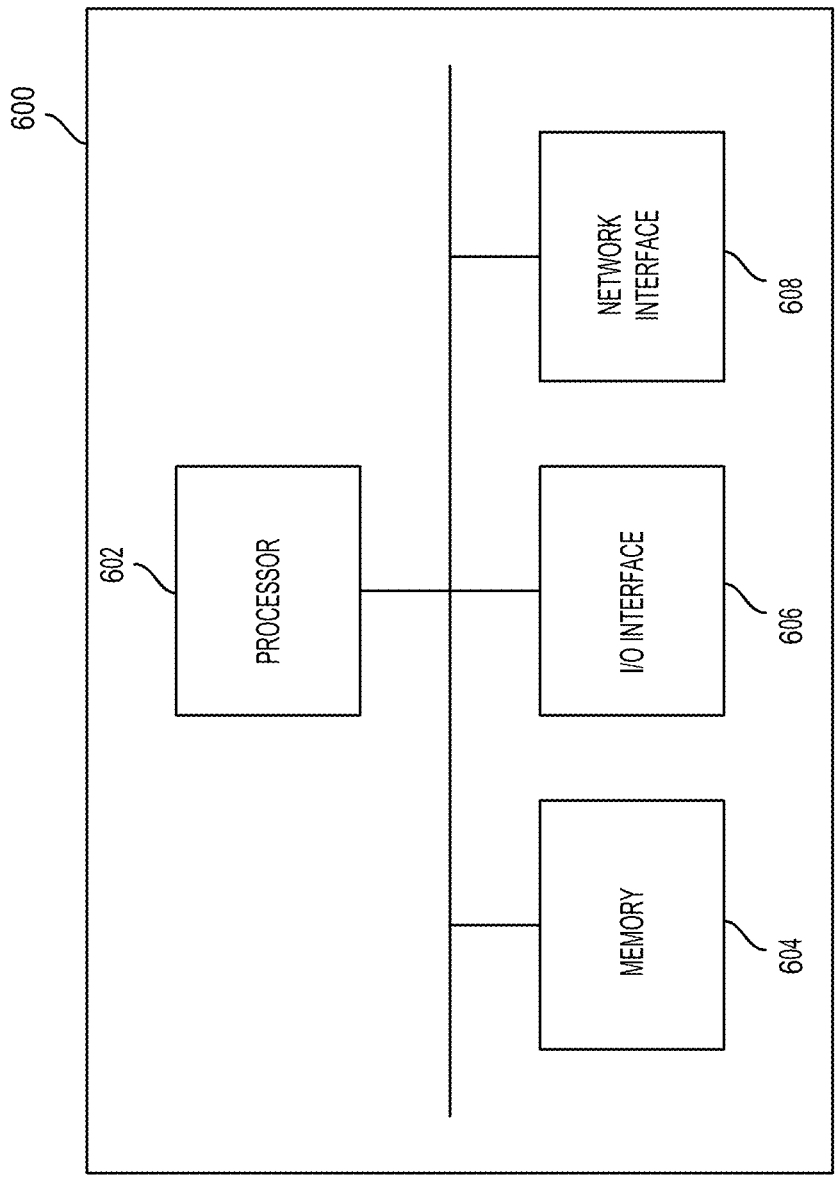
FIG. 6 is an example computing system, according to some embodiments.

FIG. 6 is an example computing system, according to some embodiments.

FIG. 6 is a schematic diagram of a computing device 600 such as a server. As depicted, the computing device includes at least one processor 602, memory 606, at least one I/O interface 606, and at least one network interface 608.

Processor 602 may be an Intel or AMD x86 or x64, PowerPC, ARM processor, or the like. Memory 604 may include a combination of computer memory that is located either internally or externally such as, for example, random-access memory (RAM), read-only memory (ROM), compact disc read-only memory (CDROM).

Each I/O interface 606 enables computing device 600 to interconnect with one or more input devices, such as a keyboard, mouse, camera, touch screen and a microphone, or with one or more output devices such as a display screen and a speaker. In some embodiments, the interface 606 are application programming interfaces configured to receive data sets, etc. representative of potential agreement data.

Each network interface 608 enables computing device 600 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others.

Figure 7:
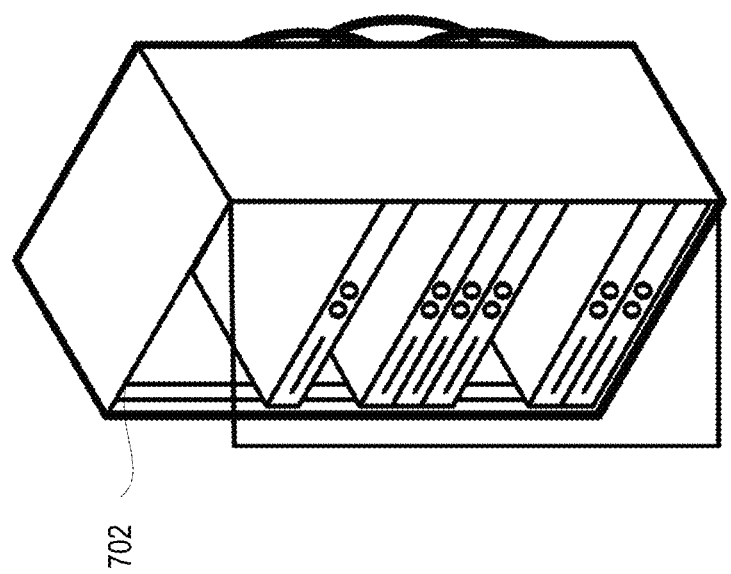
FIG. 7 is an example special purpose computing machine, according to some embodiments.

FIG. 7 is an illustration of a special purpose machine 702, according to some embodiments that may reside at data center. The special purpose machine 702, for example, incorporates the features of the system 100 and is provided in a portable computing mechanism that, for example, may be placed into a data center as a rack server or rack server component that interoperates and interconnects with other devices, for example, across a network or a message bus.

The special purpose machine 702, in some embodiments, is a computing node that is configured as one of the computing nodes 102A . . . 102N or computing nodes 102A' . . . 102N'.

Figure 8:
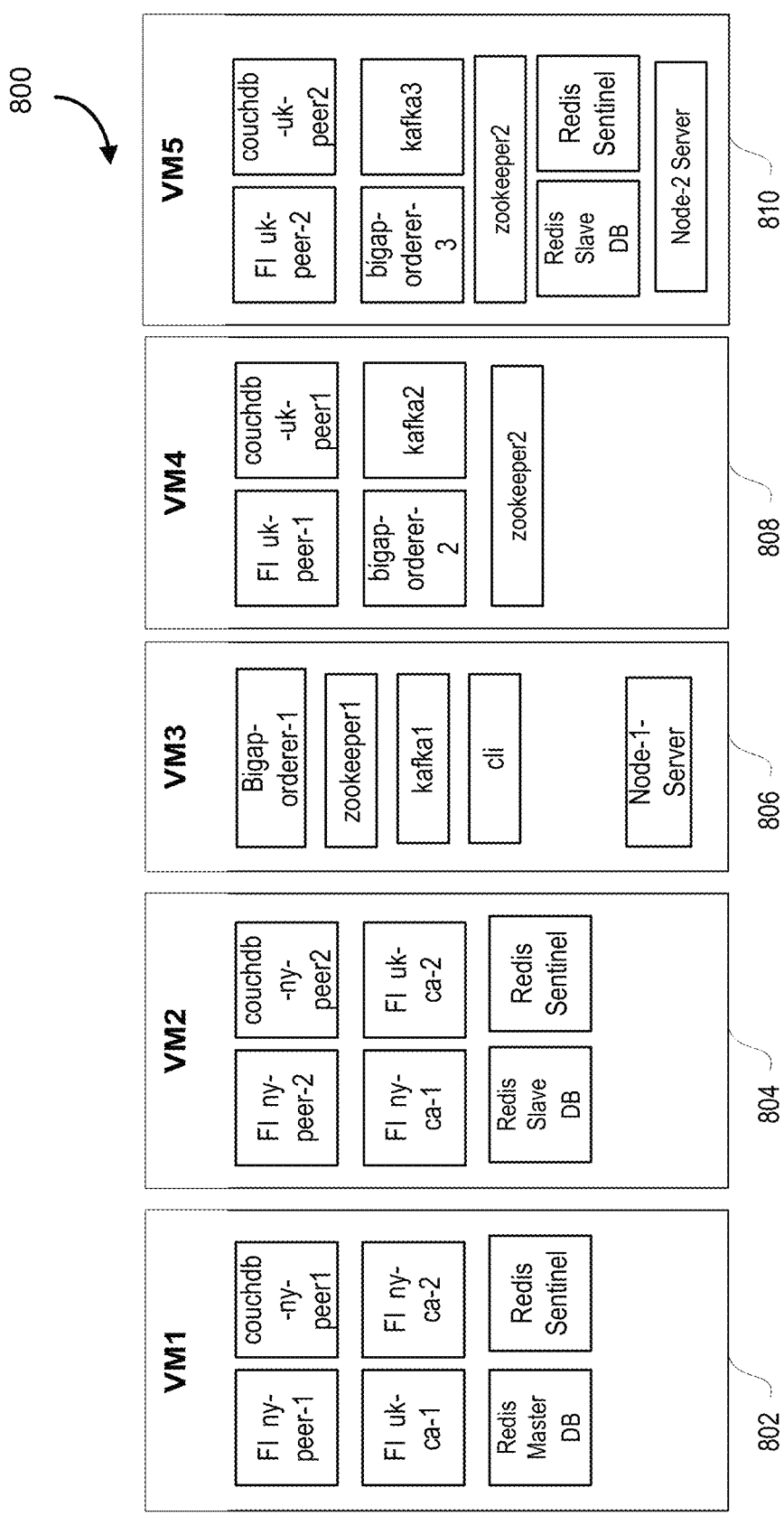
FIG. 8 is a block schematic showing several virtual machines with example components and modules, according to some embodiments.

FIG. 8 is a block schematic diagram 800 showing several virtual machines, 802, 804, 806, 808 and 810 with example components and modules, according to some embodiments. Different configurations are shown, as some virtual machines include orders, and other fault tolerance features to aid computing performance and resilience.

Blockchain Scalability

The following section describes tuning approaches that can be utilized to improve blockchain scalability, for example, to handle the increased transaction load encountered by the system 100. For example, Bitcoin can handle between 3.3 to 7 transactions per second (TPS). Applicants undertook testing and tuning approaches to improve TPS from 30 TPS, and to 300 TPS, and eventually to over 3000 TPS.

These process improvements were obtained through tuning and configuration of the specific components of the Hyperledger Fabric™ infrastructure and application components, and Applicants undertook more than 500 tests in order to come with an improved architecture for supporting the contract state machine described herein, including running loads with over 600 k concurrent transactions.

The methodology is applied to an enterprise blockchain-based application (leveraging Hyperledger Fabric) for performance tuning and optimization with the goal of bridging the gap between laboratory and production deployed system performance. Applicants then present extensive results and analysis of the performance testing for on-premise and cloud deployments without forking the Hyperledger Fabric™ source code and maintaining a reasonable infrastructure footprint.

Generally, performance improvement and optimization results for Hyperledger Fabric fall into two categories: (i) architecture redesign and (ii) recommendations for reducing bottlenecks. There are several proposals and implementations for improving the scalability and performance of the Hyperledger Fabric platform by re-architecting the system.

Performance bottlenecks of Hyperledger Fabric have been observed. Thakkar et al. provided guidelines for configuring parameters for optimizing performance, identified platform bottlenecks, and proposed optimizations such as MSP cache, parallel transaction validation, and bulk read/write [68]. In fact, these optimizations were incorporated in Hyperledger Fabric v1.1. Sukhwani observed the implications of block size on transaction throughput and latency [67].

Fundamentally, there are strong cases (e.g., [53]) for redesigning aspects of the Fabric architecture to reduce the impact of bottlenecks in the system. The optimization recommendations presented support and complement this body of performance work. Although redesigning some architectural aspects of Fabric may be required to achieve Visa-like throughput [53], an objective is to demonstrate the effectiveness of applying a methodology to scaling a blockchain application based on current non-forked versions of blockchain platforms. Additionally, Applicants propose performance optimizations such as a buffered channel for validation, asynchronous request handling, and approaches for distributing components on the underlying infrastructure.

Hyperledger Fabric is an open-source permissioned blockchain solution published under the Hyperledger Community [26]. A Fabric network is composed of three main components: peers, orderers, and membership services. Peers host the ledger and smart contracts (chaincode) and emit events to clients (e.g., successful commit). The current state of the blockchain is stored in a state database (stateDB) that the peer connects to (each peer has a state database).

Additionally, each peer has a local ledger file that contains the consensus-driven chained blocks of executed transactions (i.e., the blockchain). A peer's role in the network can be endorser (i.e., execute transactions against the smart contract) and/or committer (i.e., all peers are committers). Orderers are responsible for implementing a deterministic consensus protocol that performs transaction ordering so that all peers execute the same transactions in the same sequence. Lastly, membership services act as certificate authorities for the network and assign identities to network participants, providing a permissioned network. Separate from the blockchain network is a client, which in this case is a Node.js application server, that drives transactions to the network and receives events from network components.

Transaction Flow. There are three phases to transaction execution: (i) propose and endorse; (ii) order; (iii) validate and commit.

1. Clients first create and then propose a transaction to endorsing peers. The endorsing peers execute the transaction against their smart contract. This is just a simulated transaction execution, the ledger state is not updated at this point.
2. If the transaction execution is successful, the endorsing peers send a transaction endorsement message back to the client.
3. After receiving enough endorsements from peers (to match an endorsement policy), the client will send the endorsed transaction to the ordering service (i.e., a cluster of orderers).
4. The orderer deterministically orders the transactions it receives and creates a block of transactions. The block is then sent to all committing peers. The committing peers validate the transactions in the received block and commit the transactions to their local ledger file (and update their state database). Clients are notified by peers when the transaction has been committed.

The blockchain-based application Applicants performed testing on is deployed to Red Hat Enterprise Linux (release 7.6 Maipo) running on z/VM (FIG. 4). The z/VM operating system runs on the zSeries (z14) mainframe servers. Each architectural component of the application (or set of components) runs on one of these Linux VMs. Integrated Facility for Linux (IFLs), which is a dedicated Linux engine for exclusively processing Linux workloads [1], are enabled in the infrastructure.

Logical partitions (LPARs) provide the ability to share a single server among separate operating system images [1]. The IFL engines are assigned to LPARs and provide two layers of dynamic CPU mapping: physical IFL CPU cores to LPAR logical CPU cores and LPAR logical CPU cores to VM virtual CPU cores. In the environment, Applicants have two LPARs available support 5 to 13 VMs depending on the test configuration (the VMs are distributed across the LPARs). Each LPAR has up to 16 physical CPUs.

Leveraging the above infrastructure, Applicants deployed the application across VMs. The components of the Hyperledger Fabric blockchain platform were run in Docker containers (Docker Enterprise v17.06.2 and Docker Compose v1.20.0) and used version 1.4.1 images (all containers use the standard open-source Fabric images provided by Hyperledger; there was no source code forking). The application servers are implemented with Node.js v8.10.0 and use the Hyperledger Fabric Node.js Client SDK version 1.4.0 to interact with the blockchain network. The chaincode transaction logic is implemented in Go (v1.10.4).

The performance experiments were run by multiple JMeter machines (v5.0 with Java 1.8) pushing REST requests to the application servers, which were connected to the Hyperledger Fabric blockchain network. The client load is simulated by these JMeter machines.

The Node.js application servers connect to the peers and orderers of the blockchain network through the client SDK. All of the components in the test environment can be horizontally scaled out across VMs.

Since the orderer containers consume minimal CPU cores (<10%) and to keep a minimal infrastructure imprint, the Node.js application servers and the orderer containers share the same VM. Metrics are exposed from the orderers and peers, which Prometheus (v2.6.1) consumes and is visualized by Grafana (v6.2.0). All experiments were carried out using production quality code and features (e.g., user access control mechanisms, data caching, transaction logging and tracing, error handling).

The Hyperledger Fabric network leveraged a single application channel composed of 2 organizations. A channel defines a network of organizations and their respective peer nodes [51]. A typical network setup for the application is 2 peers per organization. During peer scaling experiments, the peers were scaled in one organization while the other organization had 2 peers.

Based on the application design, the first organization is considered the primary organization and selected for transaction endorsement, so scaling the peers in the second organization would not affect the endorsement procedure. An endorsement policy defines the set of organizations required to endorse a transaction for it to be considered valid. Although the application uses one organization to endorse transactions, the endorsement policy is set as any organization member can endorse a transaction (i.e., OR (org1.members, org2.members)) [11]. Unless otherwise stated, the ordering service was composed of 3 Raft ordering nodes.

The core functionality of the system is to manage the lifecycle of the agreement data objects. An agreement data object is a JSON object composed of four parts: flat attributes and three arrays of embedded objects. An example agreement data object is shown in FIG. 9.

Although the agreement object is implemented in JSON, Applicants illustrate the attribute types here for completeness. Lines 2-7 are flat attributes composed of string, double, and date types, whereas lines 8-30 are arrays of embedded objects. Fundamentally, the agreement is between a local and foreign business unit, where all details of the agreement are formalized and approved in the data model. The data object can dynamically grow depending on the number of foreign business units. Additional agreement information is captured in the supporting documents on line 18, however, in the testing Applicants omit any supporting documents. Lastly, an agreement can be in a number of states such as created, pending approval, and closed, which is captured in the statuses array. Applicants have omitted some attributes from the listing.

With the data model in FIG. 9, an average Hyperledger Fabric transaction size is about 7.5 KB. The size can be broken down to the input parameters and the read/write set. The input parameters include the agreement data object, which is an average of 2730 bytes, and user metadata, which is 402 bytes. The read/write set contains the agreement object again (2730 bytes), the client certificate (800 bytes), and the peer certificate (800 bytes). There are some additional fields that contribute a few 100 bytes.

In a production deployment, the agreement object is created by the user through the UI and inserted to the blockchain network through the application server and chaincode. For the testing deployment, the agreement object is pre-populated and pushed to the application server from JMeter. User access control, error handling, transaction creation, and tracing initialization is handled by the application server. The chaincode manages the lifecycle of an agreement through a state machine and supports CRUD operations for agreement objects. User authentication, field level data validation, data caching, error handling, and transaction tracing is also supported in the chaincode.

Applicants describe the tunable parameters that affect the performance of the system. Table 1 groups the parameters by system component and Applicants describe and analyze each component:

TABLE 1

Tunable Parameters and Configurations for Application Components

| Peer | CouchDB | Orderer | App Server |
|---|---|---|---|
| Validator Pool Size | B+ Tree Chunk Size | Block Size | Event Handling Strategy |
| Endorser | Monotonic ID | Block Cut Time | Event Hub & Listeners Cluster |
| Committer | Erlang VM Tuning | Consensus | Configuration |

Validator Pool Size & GOMAXPROCS. In Hyperledger Fabric, the peer components are written in Go and are executed in the Go runtime environment. The Go runtime contains its own scheduler, apart from a kernel scheduler, that uses m:n scheduling (i.e., m goroutines are scheduled on n OS threads) [49]. The GOMAXPROCS (GMP) parameter determines how many OS threads may be actively executing Go code simultaneously, which means GOMAXPROCS is the n in m:n scheduling [49].

The peer block validation routine is a computationally expensive task since all transactions in a block must be iterated through and transaction endorsements (e.g., digital signatures) are verified. To speed up block validation, the validator pool size (VPS) parameter sets an upper bound on the number of goroutines (lightweight runtime threads) that the peer will spawn during block validation for parallel processing. Validator pool size is implemented as a weighted semaphore and caps the number of concurrent validation goroutines and is the m in m:n scheduling. This means that there will be up to m validation goroutines mapped across n OS threads.

Since goroutines are cheaper (e.g., minimal/no context switching, variable stack size, go runtime scheduler) than OS threads, an ideal configuration is to use a low number of OS threads and a high number of goroutines. The exact number of OS threads and goroutines depends on the available CPU cores. By default, Hyperledger Fabric sets both VPS and GMP to the number of CPU cores available to the container. Based on the empirical results with 16 CPU cores, the optimized configuration of 100 VPS and 16 GMP provided a 10% throughput boost over the default configuration. As described herein, Applicants describe how using a buffered channel for validation goroutine results may improve block validation performance.

Endorser. Peers can be assigned the endorser role to endorse transactions for an organization. If a peer is selected to be an endorser, they are responsible for executing transactions (i.e., the chaincode transaction logic is executed) and endorsing transactions by digitally signing them. In terms of CPU usage, the endorsing peers consume the most CPU cores out of the Hyperledger Fabric components. Therefore it is important to consider how their resource consumption will affect the underlying infrastructure and how many endorsers should be deployed on the network.

Committer. All peers in a Hyperledger Fabric network commit transactions. However, peers that are not set as endorsers will only perform endorsement verification and transaction commits. This is an important distinction since purely committing peers will consume less resources because they do not need to execute chaincode and endorse transactions. Since committing peers perform less processing, having the client application wait for transaction commit confirmations from committing peers can typically reduce latency compared to waiting for commit confirmations from endorsing peers (this may not be the case if, for example, committing peers have less resources available than endorsing peers, message delays, geographical location, etc.).

B+ Tree Chunk Size. CouchDB uses an append-only B+ tree data structure to index documents and views, and to store the main database file [40]. Separate B-trees are used for the database and view index. For every document update, CouchDB will load the B-tree nodes from disk that point to the updated documents or, in the case of an insertion, the key range where the new document's ID would be located [41]. Typically, the B-tree nodes will be loaded from the filesystem cache, however, updates to documents in regions of the tree that have not been accessed in a while cause disk seeks. These disk seeks can block writing, which can affect other aspects of the system. Preventing these disk seeks can improve the overall performance of CouchDB [41].

The order of a tree is the maximum number of pointers to subtrees from one node (i.e., the maximum number of elements in a node). In CouchDB, the order of the B-tree is determined by a chunk size [48]. This chunk size can be modified through the btree chunk size parameter, which is used in the chunkif y routine [9]. Changing this parameter provides a memory vs. speed trade-off [61]; higher values will use more memory and improve the speed of updates to the B-tree, whereas lower values will use less memory at the cost of update speed. Since the chunk size determines how large the nodes are, it has a direct correlation with the number of disk seeks required on an update operation. A larger chunk size results in less tree re-structuring since nodes will be filled up at a lower rate.

The default B-tree chunk size is 1279. From the experiments, increasing the chunk size to 4096 gave a 20% TPS improvement. Higher values than 4096 did not improve performance (performance started to degrade with values over 6,000). Small chunk sizes, such as 256, also degrade performance.

Monotonic ID. Documents are indexed in the CouchDB B-tree by their IDs. Prior to compaction, the choice of ID has a significant impact on the layout of the B-tree [30]. Using monotonic IDs will minimize the number of intermediate tree nodes that need to be rewritten [2]. Alternatively, random IDs cause intermediate nodes to be frequently rewritten, which results in decreased throughput and wasted disk space (because of the append-only structure of the B-tree) [30]. The choice of ID also affects the caching behaviour since IDs clustered together will have more cache hits, which results in faster insertion time. Random IDs result in documents being inserted in arbitrary locations in the B-tree, which may result in many cache misses.

The document ID generation algorithm creates IDs based on the current timestamp when the document was created. Depending on the speed of request processing, timestamp-based IDs may result in ID conflicts if documents are generated at the same time. However, if two documents are inserted to CouchDB with the same ID, the system chaincode will handle this concurrency error by ensuring the key is first read before updating it (i.e., verifying read/write sets). To avoid ID collisions with high probability, the timestamps should be created with high precision. Additionally, IDs do not have to be consecutive, rather they just need to be ordered [2]. Therefore, the timestamp ID generation follows these requirements. Using timestamps as IDs guarantees monotonicity since timestamps T S1< . . . <T Sn are sequentially ordered. Using this timestamp based monotonic ID generation improved TPS by 5%.

Erlang VM Tuning. CouchDB is implemented in Erlang, which runs in an Erlang VM (BEAM). Runtime-specific parameters can be configured through VM arguments and may improve CouchDB's performance. Applicants evaluated a subset of parameters related to CouchDB performance.

By default, Hyperledger Fabric enables the +K (kernel polling) and +A (async thread pool) parameters, which can improve performance if there are many file descriptors in use and improve I/O operations, respectively. The default value of the async thread pool is the number of CPU cores and since there are more CPU bound operations than I/O bound, increasing this value had no positive effect. Changing the additional parameters from their default values degraded performance. These parameters included +spp (port parallelism), +stbt (scheduler binding), ts (bounds scheduler threads across hardware threads), ps (spreads schedulers across physical chips), db (schedulers spread over processors), +scl (scheduler load compaction), +sf wi (scheduler wakeup interval), and +zdbbl (distribution buffer busy limit).

Block Size. The block size determines how many transactions the orderer will collect before cutting a block. A larger block size will result in more transactions to be validated and longer commit times. However, larger blocks will result in less blocks, which means there are less blocks to commit. From the experiments, an ideal block size for a specific load has a block fill ratio of over 90%. However, the total number of blocks is also important to consider with the block fill ratio, as too many blocks will have a negative impact on the commit procedure, especially for high transaction arrival rates.

Due to the state database lock mechanisms and REST interface (CouchDB), block commits are a bottleneck in the transaction flow and minimizing the time spent performing this operation is ideal to maximizing performance. Therefore, an ideal block size configuration takes into account the number of blocks created and the fill ratio. Additionally, tuning CouchDB affects the commit times, so properly configuring the stateDB is also important.

Block Cut Time (Batch Timeout). The block cut time is a fallback mechanism if the block is not filled in a specific time. This value provides an upper bound for how long it takes for the block to be cut. Minimizing the delta between the time it takes to fill a block and the default cut time is important to reduce idle time for the orderer waiting for the cut timeout to occur. However, setting this value too low can potentially reduce the block fill ratio (since it could take longer than the timeout to fill the block).

Under high load tests, the block cut time has the most impact during the beginning and end of the test (i.e., when the test is ramping up or down, the transaction rate is not high enough to fill the block). An optimal value should take into account the flow of traffic (i.e., periods of low or high load) to balance idle time waiting for blocks to be cut during low load and batching enough transactions into a block during peak load.

Consensus. The consensus protocol is responsible for deterministic ordering of transactions in blocks. As an integral component of a blockchain network the choice of protocol has an impact on performance. Hyperledger Fabric currently supports Kafka [6] and Raft-based [64] consensus.

Raft is the recommended ordering service since it performs similar to Kafka while being easier to maintain [36]. Raft follows a leader-follower model, where the leader drives the ordering of transactions and replicates messages to the follower nodes. Leaders are chosen through an election campaign after followers have not received heartbeat messages in a set timeout.

Since the leader will only be changed if the current leader node crashes (Raft is crash fault tolerant, not byzantine fault tolerant), Applicants can directly connect the application to the leader Raft node. Assuming Raft nodes are collocated in a local network, connecting directly to the leader improves performance, whereas connecting to followers redirects connections to the leader.

In v1.4.1, Hyperledger Fabric selects the orderer Raft node to start an election campaign by checking which orderer ID equals hash (channell D)%clusterSize+1. On network startup, the same orderer Raft node will be elected the channel leader with high probability (assuming the same orderer nodes were present before).

Therefore, Applicants know which orderer will be elected the leader a priori, so Applicants can configure the application servers to directly connect to the leader. Of course, if the leader crashes, the application will have to be redirected to the new Raft leader.

Event Handling Strategy. The application server leverages an event handling strategy to determine how the client should wait for commit events emitted from peers after a transaction is committed to the ledger. The fabric-network SDK (v1.4.0 [12]) provides five strategies: MSP SCOPE ALLFORTX, MSP SCOPE ANYFORTX, NETWORK SCOPE ALLFORTX, NETWORK SCOPE ANYFORTX, and null.

The strategies differ in their scope (msp or network) and policy (all or any). The scope and policy refers to if the client needs to listen for transaction commit events from all or any peers on the network or organization level.

The null strategy means transaction invocations return immediately to the client after the endorsed transaction is successfully sent to the orderer (i.e., fire and forget) [23]. Transactions are still eventually committed on all peers, however the client does not wait for a commit confirmation. The choice of strategy has a great effect on the overall system performance, where in terms of decreasing performance: null>>NETWORK SCOPE ANYFORTX≥MSP SCOPE ANYFORTX>MSP SCOPE ALLFORTX>NETWORK SCOPE ALLFORTX.

The network scope strategies require either all peers (potentially slow based on the network size) or a single (any) peer to confirm the transaction commit. For small networks (e.g., two organizations) a single peer commit confirmation is fast, but may become slower with larger networks due to the number of network connections between the client and peers. The organization scopes' (MSP) performance is bounded by the network scopes since only a subset of peers are available in the MSP strategies.

The null strategy results in much greater performance than the previous strategies because the client does not need to wait for transactions to be committed before finishing the request. The transaction commit is the slowest operation in the transaction flow, so the bottleneck is removed by this strategy (requests are not bounded by the commit operation). However, this performance increase comes at the cost of acknowledging failed transaction commits, which is not acceptable in some use cases. The null strategy is beneficial to determine an upper bound in performance to compare with the other commit strategies and to help tune transaction commit related processes.

Compared to a null commit strategy, network any and all strategies give 40% and 50% throughput degradation, respectively (with a four peer network). The MSP based strategies have similar degradation of 40% to 45%. All peers in the network perform commit operations and process the same block, thus consume CPU cycles. Although all peers process blocks, only the all policy commit strategies will be negatively impacted by the number of peers in the network.

Event Hub & Listeners. In order to support an asynchronous design, applications should register a listener to be notified of events [22]. Committing peers provide an event stream to publish events to registered listeners [22]. Event hubs and listeners are related to the event handling strategy since they are the mechanisms in which the client is notified of events and how the strategy is satisfied.

An event hub resides on the application server (provided by the Fabric SDK) and manages the events emitted from peers. Listeners can be registered in the event hub to listen for blocks, transactions (which leverage block events), and chaincode events. An event hub needs to be registered and a listener established in order to begin the monitoring of events. The choice of event hub and listener can play a large role in performance.

Applicants began the testing with the peer level event hub, which was present in v1.1 to v1.2 of the Fabric Node.js SDK. A peer level event hub resulted in multiple timeouts due to being tied to the peer, which severely degraded performance.

The Node.js SDK v1.3 improved the event hub by tying it to the channel rather than the peer. Tying the event hub to the channel provided more stability and improved the performance compared to the peer event hub. Upgrading to the v1.4.0 SDK provided the best performance with the channel-based event hub and abstracting away all event hub and listener setup to a single SDK method call (transaction.submit method [37]).

Cluster. A Node.js application runs in a single thread and does not leverage multiple cores. In order to leverage multi-core systems, Node.js provides the option to launch a cluster of Node.js processes. When the cluster is enabled, there will be a master process that is responsible for distributing incoming connections in a round-robin fashion to the worker processes.

Typically, each worker process is bound to a CPU core (i.e., usually the optimal number of workers is the number of CPU cores available). More workers will allow for more concurrency and greatly improve throughput and latency compared to a single instance of a Node.js application with no clustering enabled. However, each worker will have duplicate block processing since every worker receives block events from the network (i.e., a worker notifies the client of a transaction commit by processing block events).

Fundamental to the Node.js architecture, the event loop may be blocked due to the computational complexity of JavaScript callbacks [10]. Since block event processing is completed through callbacks, the event loop is periodically blocked since there are multiple workers processing the block. Although this contributes to increasing latency, the benefit of leveraging clustering outweighs the impact of event loop blocking.

Client Configuration. The application layer of a Hyperledger Fabric network can specify the roles of the peers in the connection profile configuration [15]. Two important peer roles are endorsing peer and event source. If a peer is set to an endorsing peer then they will execute and endorse transactions.

Alternatively, non-endorsing peers will just commit transactions. Setting a peer as an event source means that the application will only accept events (such as commit confirmations) from peers listed as an event source. An optimal configuration is to separate the endorsing peers from the event source peers. If committing peers (i.e., not endorsing) are set as event sources, than they will typically respond back to the application with commit confirmation events faster than endorsing peers since they have less processing to do.

Tuning and Optimization Results

Applicants take the analysis of the platform components and apply them to the performance testing. Applicants begin with a description of the baseline performance test and provide a summary of the system health check activities for preliminary tuning to get the application to an acceptable testing state. Next, Applicants provide the detailed results and analysis of the testing organized by application server and peer scaling. Unless otherwise stated, all performance tests are with data insertion workloads.

Baseline. The initial blockchain application performance benchmarks reported 30 TPS and 6 s latency. This result was captured from 5 JMeter machines (with 30 threads and 100 loops each), Hyperledger Fabric v1.1 with a 150 block size, 3 Kafka-based orderers, and 4 peers (1 endorser), 2 Node.js application servers, and 4 CPU cores per VM (there were 5 VMs in the network). This is the baseline configuration from which Applicants apply the performance optimization methodology.

System Health Activity Summary. Applicants first reviewed the current state of the application, network topology, and baseline performance testing results in order to identify and address possible bottlenecks. By reviewing the application implementation, Applicants observed that client, channel, event hub, and user context objects were not being reused across requests and the configuration data was loaded and parsed for each request (i.e., expensive I/O operations).

Additionally, the transaction event hub disconnected after every request, which affected other request processing by the application server because of the repeated connection closing. The combination of these connection issues resulted in thousands of open gRPC connections recreated for each request. Modifying the application implementation to cache and reuse the client, channel, and event hub connections improved throughput by 100% to 60 TPS.

Applicants scaled the application servers from 2 to 4 servers and added an additional endorsing peer to divide the transaction workload to 2 individual peers. Detailed results and analysis of application and peer scaling is reported in the below sections. The combination of the client connection reuse, removal of event hub disconnection, reuse of gRPC connections, endorsement peer load balancing, and application server instance scaling resulted in 90 TPS.

Since the application leveraged an early version of Hyperledger Fabric (v1.1), the blockchain platform was upgraded to v1.3. Version 1.3 of Hyperledger Fabric significantly improved performance since some of the locks within Hyperledger Fabric were removed [19]. Most notably, the event hub model was redesigned to provide a more reliable and efficient block delivery service. This redesign was the main contributor to a 44% throughput improvement to 130 TPS.

Applicants began horizontally scaling the blockchain components across VMs (increasing the infrastructure footprint from 5 to 7 VMs) to avoid resource contention and vertically scaled the CPU cores on each VM to 8 cores. The better load distribution across the underlying infrastructure and the increased availability of resources increased the throughput to 310 TPS. The testing environment was composed of 6 JMeter machines (each with 350 threads), 3 Node.js application servers (each with 12 workers), 400 block size, and 3 endorsing peers.

Finally, Applicants upgraded Hyperledger Fabric to the latest version at the time of writing (v1.4.1) [20]. Fabric v1.4 provides an improved programming model that adds a layer of abstraction to the client SDK. The Kafka-based consensus protocol used in previous versions of Fabric was replaced with a Raft-based ordering service, which is easier to maintain and deploy as it is built in to the peer process.

The improved Fabric platform can process transactions at a higher rate, so Applicants applied preliminary block size, application server worker, and load tuning to increase throughput to 600 TPS. With the initial bottlenecks discovered and addressed, as well as preliminary performance test results, Applicants provide an indepth analysis in the subsequent sections.

Application Server Scaling. A blockchain-based application involves many CPU-bound operations that originate from the application servers and the Hyperledger Fabric components. For example, the application servers manage multiple open connections and transaction listeners while the Fabric components perform operations such as transaction endorsement, validation, and commit, which include computations such as digital signature creation and verification. In order to effectively accommodate these operations, Applicants vertically scaled the infrastructure to 16 CPU cores per virtual machine. Unless otherwise stated, the remainder of the test results are based on VMs with 16 CPU cores.

Table 2 shows the results of horizontally scaling the application servers. The test cases are grouped based on the level of concurrent requests coming in to the test environment (i.e., base, mid, high). The base class refers to a low number of threads submitting transactions from JMeter (e.g., 300 to 600 threads per JMeter). The mid and high classes spawn more threads to drive the transactions to the network (e.g., 600 to 900 and 1200 to 1600 threads per JMeter, respectively). Based on the test results, the optimal peer configuration is to map one endorsing peer to one Node server (see peer scaling below). Therefore, all of the following tests have a separate endorsing peer per Node server. In a production environment, it is necessary to take into account high availability, which means the application server needs a 1:n application server and peer mapping (a single peer still endorses transactions, but there are several additional peers for resilience). For the practicality of performance testing, Applicants deploy a strict 1:1 mapping.

To avoid CPU contention, the Node servers and endorsing peers run on VMs that reside on different LPARs. Since Applicants have two LPARs, Applicants must balance the peers and Node servers across VMs on these LPARs. For example, in the 2 Node test, there is one endorsing peer and Node server running on LPAR 1 and the same number of components running on LPAR 2. The Node servers have the highest CPU utilization followed by the endorsing peers, so evenly distributing these components across the underlying infrastructure is crucial.

Figure 10:
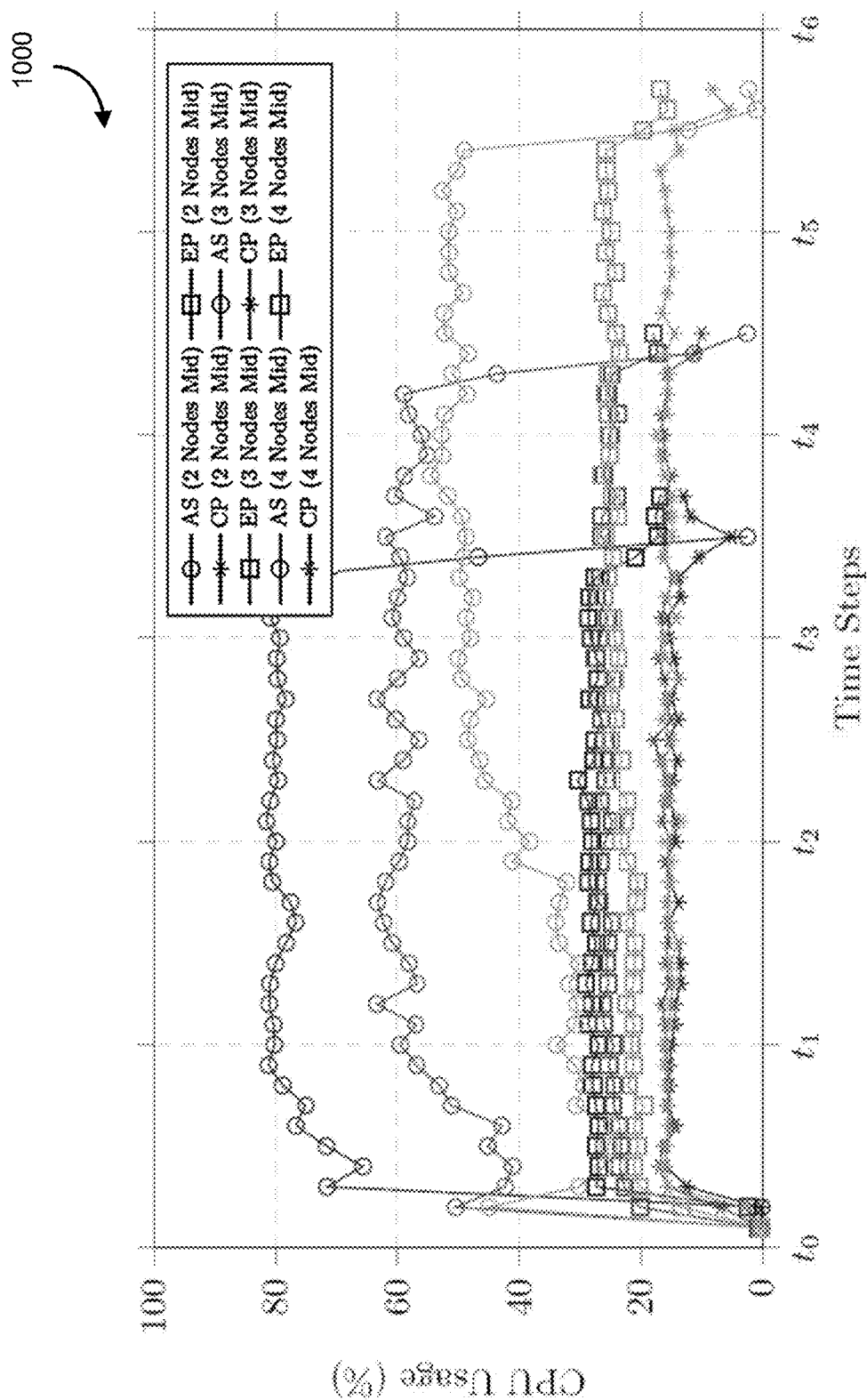
FIG. 10 is a graph that depicts the CPU usage for the Node.js application servers and endorsing and committing peers.

FIG. 10 is a graph 1000 that depicts the CPU usage for the Node.js application servers and endorsing and committing peers for the mid test classes in Table 2.

TABLE 2

Application Server Scaling Results. Table columns are organized by components and test results. For JMeter, Applicants report the number of instances (Clts), threads (Thr.), and loops (Lps). Applicants report the total number of Node.js application servers (Srvs) and worker threads (Wrks); threads are evenly distributed across servers. Hyperledger Fabric parameters are the block size (BS), block cut timeout (TO), and the number of endorser peers (End.). The results are reported as throughput (Thrpt), average latency (Ltcy), and the block fill ratio (BFR). Table rows are organized based on the test classification (base, mid, high).

| | JMeter | | | Node.js Server | | Hyperledger Fabric | | | Results | | |
|---|---|---|---|---|---|---|---|---|---|---|---|
| | Clts | Thr. | Lps | Srvs | Wrks | BS | TO (s) | End. | Thrpt | Ltcy (ms) | BFR |
| Base | 6 | 300 | 100 | 2 | 12 | 400 | 2 | 2 | 686 | 2557 | 97% |
| Base | 6 | 400 | 100 | 3 | 24 | 400 | 3 | 3 | 736 | 3243 | 98% |
| Base | 8 | 600 | 100 | 4 | 24 | 600 | 3 | 4 | 837 | 6066 | 98% |
| Base | 6 | 1600 | 25 | 6 | 24 | 800 | 3 | 6 | 855 | 11561 | 92% |
| Mid | 6 | 600 | 100 | 2 | 24 | 600 | 2 | 2 | 890 | 4221 | 97% |
| Mid | 6 | 900 | 100 | 3 | 30 | 800 | 3 | 3 | 892 | 6406 | 92% |
| Mid | 8 | 900 | 100 | 4 | 32 | 700 | 3 | 4 | 889 | 8701 | 96% |
| High | 6 | 1200 | 25 | 2 | 24 | 1200 | 4 | 2 | 801 | 8760 | 94% |
| High | 6 | 1600 | 25 | 3 | 24 | 1600 | 4 | 3 | 841 | 11201 | 93% |
| High | 8 | 1200 | 45 | 4 | 32 | 1200 | 3 | 4 | 871 | 11665 | 83% |

Although there are multiple servers and peers, FIG. 10 shows data from one instance of each component (CPU usage is approximately uniform for each component type). FIG. 10 shows CPU Usage for Application Servers (AS), Endorsing Peers (EP), and Commit Peers (CP) for Mid-level Application Server Scaling Tests.

Comparing the base case results for 2, 3, 4, and 6 application servers shows that applying horizontal scaling to the application servers improves throughput. Starting with 2 Node servers gave us a baseline of 686 TPS. With 6 worker threads per Node server, the CPU utilization of the Node servers was between 40% and 45%. This shows that there is enough resources to increase the number of worker threads per node, which will improve throughput and latency.

For the next test with 3 Node servers, Applicants increased the workers to 24 in order to utilize more CPU cores, which resulted in the Nodes' CPU usage increasing to 75%. Applicants also increased the number of JMeter threads to 400 since Applicants now have an additional application server to handle requests. These changes directly impacted the throughput, which increased to 736 TPS. The average transaction latency increased by 1 second since there are more concurrent transactions being executed and processed. The next two base cases resulted in 837 TPS and 855 TPS by scaling the application servers to 4 and 6, respectively.

The increase in application servers and the number of endorsing peers allowing for more concurrent transaction processing is the main contributing factor for the throughput increase. Six application servers resulted in high contention for CPU cores, so in order to get a comparable throughput as previous tests, the threads were increased to 1600 (i.e., there needs to be a large number of concurrent requests for the overall throughput to increase).

For the mid cases, Applicants increased the load to 600 threads per JMeter for the 2 application server configuration. With a previous block size of 400 transactions, the orderer was able to cut the block in an average of 0.56 seconds, which is well below the 2 second block cut timeout.

Since the block cut time was very low, the block fill ratio was 97%, which fits in an optimal range for the number of blocks propagating through the system. Increasing the block size while keeping the load constant will result in a lower block fill ratio, which means more blocks will reach the 2 second cut timeout and lower the overall throughput and latency (due to the timeout).

Matching the block size to the load is necessary to keep the optimal block fill ratio, which may be difficult in an enterprise setting where application volumes will fluctuate. Increasing the concurrent load caused the throughput to jump to 890 TPS. Since the number of incoming requests is increasing, the average response latency increases as well.

FIG. 10 shows that the committing and endorsing peers' CPU usage is constant at 15% and 25%, respectively. The application server CPU usage is much greater than the peers, where a topology with 2 application servers utilizes 80% of the CPU cores.

As the number of application servers increases, the average CPU usage for one server instance decreases because there is contention between servers for the shared physical cores of the underlying infrastructure. This also verifies that the application server is the most computationally intensive component in a Hyperledger Fabric network for data insertion loads. The remainder of the mid test cases show that the infrastructure resources are being exhausted since there is no improvement to throughput and latency is further increasing.

The high load test cases further verify that there are not enough resources to support over 1200 threads across 6 JMeters. With such a large number of concurrent users, the block size must also be large to prevent too many block commits (since committing the block is a slow operation).

However, the large block size also means that the time to fill the block will increase, which affects the latency. The combination of high concurrent requests increasing the application server CPU usage and the time it takes to cut and commit the block contributed to the throughput decreasing from the mid test case results. Peer Scaling.

Scaling the application servers allows more transactions to be concurrently sent to the Hyperledger Fabric network. However, without also properly scaling the number of peers endorsing transactions, the benefit of additional application servers is lost due to the bottleneck in the peer processing. The results of the endorsing peer scaling tests are in Table 3.

The first two test cases (TC1 and TC2) in Table 3 compare the mid-level 2 Node server results from Table 2 with the same configuration. Test case 1 reduces the number of endorsing peers to 1, whereas TC2 has 2 endorsing peers. As can be seen from the results of TC1 and TC2, there is a 29% increase in throughput when the number of endorsing peers matches the number of application servers (692 TPS vs. 890 TPS).

The endorsement of transactions by peers is a main step in the Hyperledger Fabric transaction flow. If there is only one peer given the endorser role, then all transactions sent to the network will funnel through this peer (there could be many peers in the network, but all non-endorser peers will be committers).

For example, in TC1 of Table 3, there are 2 Node.js application servers handling transactions. However, with only one peer endorsing transactions, that peer is a bottleneck in the system. By assigning a second peer as an endorser and mapping the endorsers to the application servers (i.e., 1:1 mapping), Applicants increase the parallelization of the system since each peer will handle their respective application server's transactions. Latency is also improved because of the distributed load across peers (i.e., one peer is not overloaded). The same pattern applies to test cases 3 to 6 (1:1 mapping of application servers to endorsing peers improves both throughput and latency).

TABLE 3

Endorsing Peer Scaling Results:

| | JMeter | | | Node.js Server | | Hyperledger Fabric | | | | Results | | |
| --- | --- | --- | --- | --- | --- | --- | --- | --- | --- | --- | --- | --- |
| | Clts | Thr. | Lps | Srvs | Wrks | BS | TO (s) | End. | # Peers | Thrpt | Ltcy (ms) | BFR |
| TC1 | 6 | 600 | 100 | 2 | 24 | 600 | 2 | 1 | 2 | 692 | 5137 | 98% |
| TC2 | 6 | 600 | 100 | 2 | 24 | 600 | 2 | 2 | 2 | 890 | 4221 | 97% |
| TC3 | 6 | 900 | 100 | 3 | 30 | 800 | 3 | 1 | 6 | 639 | 8347 | 98% |
| TC4 | 6 | 900 | 100 | 3 | 30 | 800 | 3 | 3 | 6 | 892 | 6406 | 92% |
| TC5 | 8 | 900 | 100 | 4 | 32 | 700 | 3 | 1 | 8 | 651 | 10957 | 98% |
| TC6 | 8 | 900 | 100 | 4 | 32 | 700 | 3 | 4 | 8 | 889 | 8701 | 96% |

Table 4 shows the transaction lifecycle breakdown for the 2 and 4 endorser peers in Table 3 (TC1, TC2, TC5, TC6). Comparing TC1 and TC2 (rows 1 and 2, respectively) shows that having 2 application servers with 1 endorsing peer each improves the block cut time by 13%, but slightly increases the block commit time by an average of 70 ms. With only 1 endorsing peer, all transactions sent from the application servers funnel through this single peer, which creates a bottleneck in the system and lowers the transaction rate to the orderer.

The lower transaction rate increases the time it takes for the block to be filled. An additional endorser allows transactions from each application server to be endorsed in parallel, which improves the rate of transactions being sent to the orderer and decreases the time to fill a block. This also affects the block commit rate since blocks are being generated quickly and the peers are committing blocks more often (which results in the increased block commit time). The higher block generation rate decreases latency since the application does not need to wait as long for the transactions to complete and is the main reason for the 29% throughput improvement.

time from the BatchUpdateDocs function (the time take for BatchUpdateDocs to complete the request to CouchDB; this function is called when updating the stateDB), and average time to commit a block (summation of previous 4 metrics).

The final columns are Raft data persist duration (time for a Raft node to store it's entries, state, and snapshot) and the average latency reported from JMeter (entire transaction lifecycle, including the application server processing). Apart from JMeter latency, this data was gathered through the Hyperledger Fabric metrics service.

Rows 3 and 4 report the transaction breakdown for 4 application servers with varying numbers of endorsers. Compared to the 2 Node.js server results, the difference in proposal execution between 1 and 4 endorsers is much greater with 4 servers. This is due to the further parallelization of endorsement with 2 more endorsing peers than in rows 1 and 2.

However, 4 servers with 4 endorsing peers has differing effects on block commits than 2 servers with 2 endorsers; the former decreases the commit time (1099 ms to 951 ms) whereas the latter increases the commit time (728 ms to 798 ms). The number of clients and the amount of requests

TABLE 4

Endorser Impact Results.

| | Endorse Avg time to complete proposal (ms) | Block creation | | | Validate & Commit | | | | | | | |
|---|---|---|---|---|---|---|---|---|---|---|---|---|
| | | Avg block cut time (ms) | Avg time to validate tx (ms) | Avg time to enqueue tx (ms) | Avg time to validate block (ms) | Avg time for ledger block processing (ms) | Avg time to commit block to storage (ms) | Avg time to commit block changes to statedb (ms) | CouchDB processing time BatchUpdate Docs (ms) | Avg time to commit block (ms) | Raft Raft data persist duration (ms) | JMeter Avg latency (ms) |
| TC1: 2N, 1E | 296 | 981 | 1 | 1.1 | 106 | 87 | 62 | 430 | 122 | 728 | 8.7 | 5100 |
| TC2: 2N, 2E | 294 | 870 | 1 | 1.2 | 115 | 92 | 68 | 473 | 139 | 798 | 9.5 | 4200 |
| TC5: 4N, 1E | 672 | 1084 | 0.7 | 1.7 | 135 | 110 | 83 | 707 | 168 | 1099 | 9.6 | 10900 |
| TC6: 4N, 4E | 274 | 1137 | 0.9 | 0.8 | 138 | 106 | 78 | 576 | 185 | 951 | 9.8 | 8700 |

The table is organized based on the three main phases of the Hyperledger Fabric transaction flow: transaction endorsement (peer), block creation (orderer), and transaction validation & block commit (peer).

For peer transaction endorsement, Applicants capture the average time the endorsing peers take to complete a proposed transaction from the client (includes chaincode execution).

On the orderer, Applicants capture the average time to cut a block (i.e., block generation), average time to validate a transaction (time spent receiving the transaction message from the client, unmarshaling message contents, validating the client's signature, and readying the message to be enqueued), and average time to enqueue a transaction (time spent enqueuing, i.e. ordering, a transaction through the Raft consensus protocol).

Committing peer block validation and commit includes the average time to validate a block (verifying endorsement signatures on all transactions in the block), average time for ledger block processing (validating the state and read/write sets for all transactions in the block), average time to commit the block to storage (adding a commit hash composed of block metadata to the block and committing the block to the local ledger file), average time for committing block changes to stateDB (updating the world state in the stateDB based on transactions in the block), CouchDB processing increased in TC5 and TC6 (8 clients and 900 threads per client), as well as a block size of 700 transactions, which caused the time to cut the block to increase (i.e., more transactions are required to fill the block).

This positively affects the average block commit time because the block fill ratio is lower than the 1 endorser test (98% for 1 endorser, 96% for 4 endorsers). With more blocks containing less than 700 transactions (96%), the average block commit time is faster because of the higher number of smaller blocks.

This illustrates the balance between how many blocks are created, the ratio of filled blocks, and the number of transactions in the block. A fill ratio difference of 2% saved an average of 150 ms to the block commit process. However, as the block fill ratio decreases, the throughput will be negatively affected since the block cut timeout will be reached too frequently (i.e., the application must wait for the block to be cut).

Null Commit Strategy. In order to determine if the selection of the commit strategy was a bottleneck in the system, Applicants removed the need for transaction commit waiting on the client side by specifying the null commit strategy. Table 5 shows the results of using the null commit strategy with 2 and 4 Nodes (all tests were run with 16 CPU cores). Test case 1 (TC1) provides a baseline test with the NETWORK_SCOPE_ANYFORTX strategy, which resulted in 600 TPS and 15.5 s latency.

Comparing TC1 to TC7 (the same configuration with null commit) shows a 73% throughput increase to 1039 TPS and a reduction in average latency by 7 seconds. Scaling the application servers in TC8 further improves the throughput to 1863 TPS with 5 s latency and demonstrates that transaction execution and endorsement on the peers can efficiently process large transaction loads (over 670,000 insertions) and the impact commit waiting has on the system.

Figure 11:
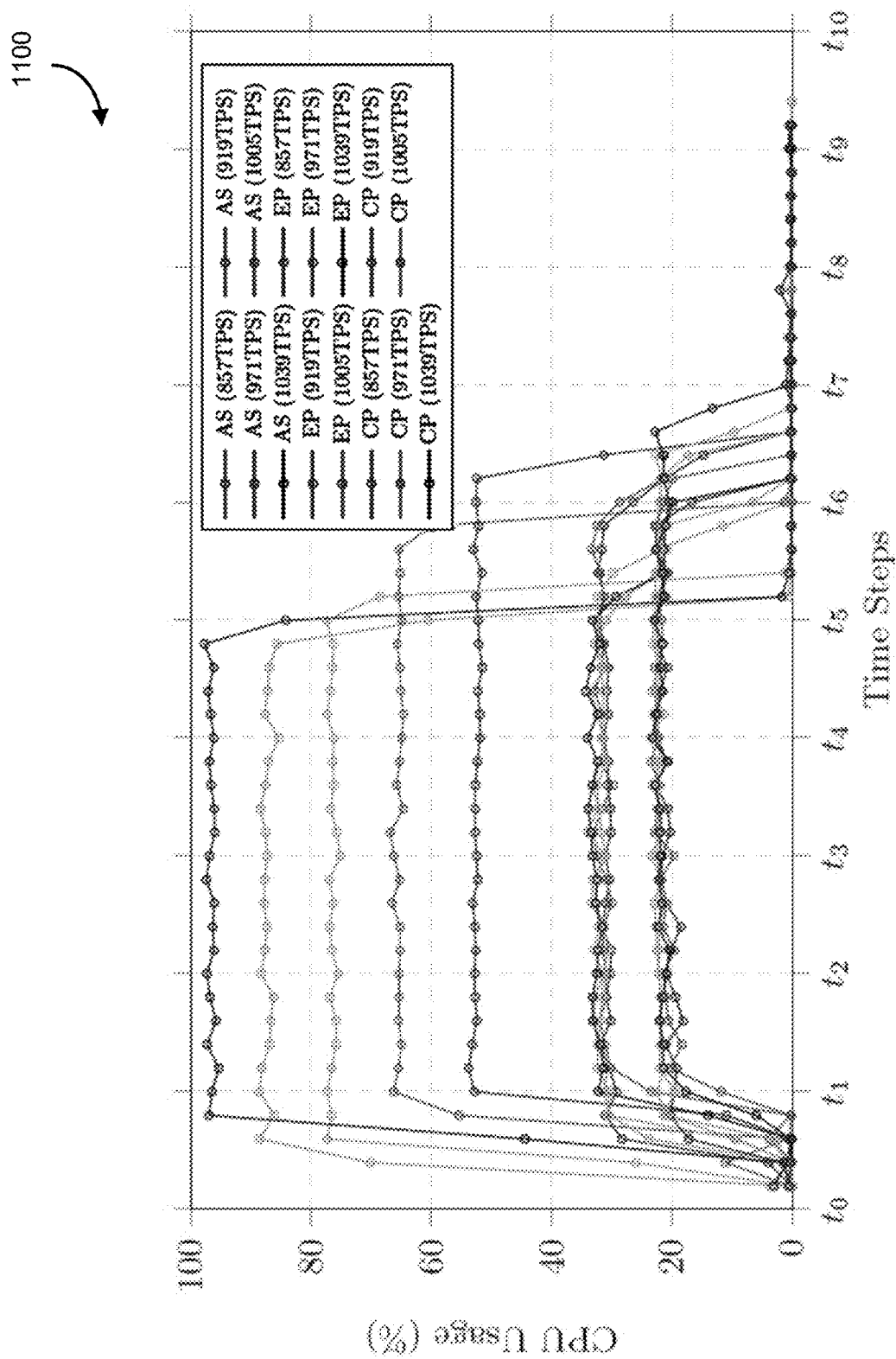
FIG. 11 is a chart showing CPU Usage for Application Servers (AS), Endorsing Peers (EP), and Commit Peers (CP) for Null Commit Strategy.

The removal of the client waiting for commits affects multiple aspects of the system (TC2 to TC8). Since the application servers "fire and forget" transactions, there is no need for event hubs and transaction listeners to monitor commit events. This frees up both CPU and memory that the application servers can leverage. The CPU usage of the Node application servers is shown in FIG. 11. FIG. 11 is a chart 1100 showing CPU Usage for Application Servers (AS), Endorsing Peers (EP), and Commit Peers (CP) for Null Commit Strategy.

The constraint that the listeners have on CPU resources is evident since, as Applicants increment the number of worker processes, the Node application servers' CPU usage increases from 50% to 100% utilization. Now that the application servers are not waiting for transaction commit confirmations, transaction processing in the application servers finishes quickly at maximum CPU utilization. The application servers can process more transactions, which fills the blocks faster and results in a 100% block fill ratio. Regardless of the transaction processing rate on the application servers, the peers maintain constant CPU utilization and finish processing (i.e., committing transactions) after the application servers complete their processing. The peers' constant CPU utilization can be attributed to the exclusive locking of the stateDB when committing transactions since this concurrency control limits the peers' transaction commit rate.

Figure 12:
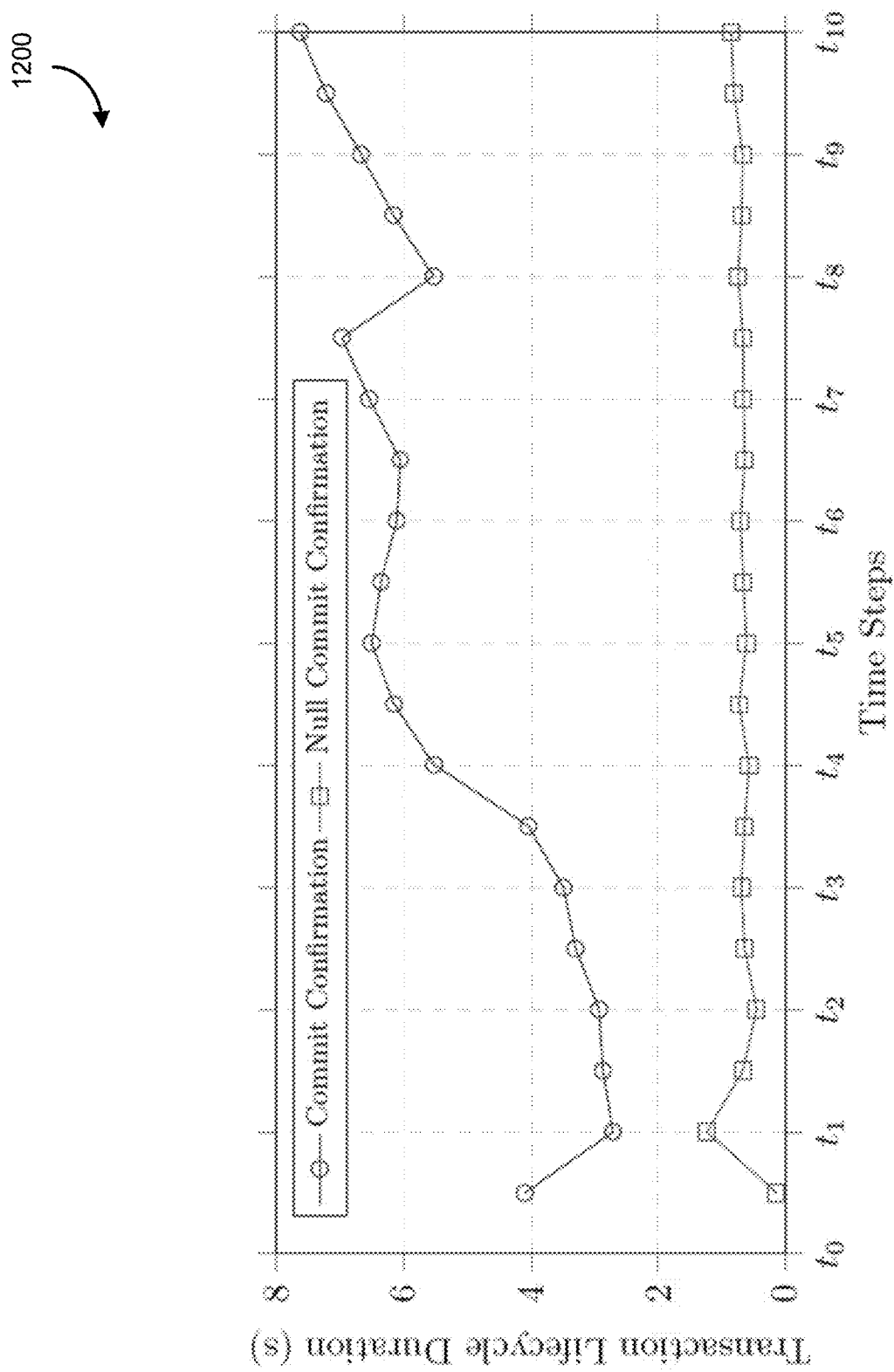
FIG. 12 is a chart showing transaction commit confirmation strategy impact.

FIG. 12 is a chart 1200 showing transaction commit confirmation strategy impact. FIG. 12 illustrates the commit strategy's effect on the end-to-end transaction lifecycle, including transaction creation in the application server and transaction processing in Hyperledger Fabric (the reported duration does not include additional application tier and client processing).

The data is reported from a 3 Node.js server test with 6 worker threads each, 800 block size, 1600 threads, 3 endorsers, and 16 CPU cores per VM. With a commit confirmation strategy, the duration of transaction processing linearly increases over time because of the transaction listeners consuming resources and the bottleneck of CouchDB interactions during block commits. Alternatively, the null commit strategy results in constant transaction processing duration because the bottleneck of block commits and transaction listener resource consumption are eliminated.

Omitting transaction commit confirmations is not practical for most applications since Applicants want to make sure a transaction is committed before responding to the client. However, performing this test gives insight into how transaction listeners and transaction commits affect the overall system. This provides an upper bound on the system and a scale unit for the application servers. As described herein, Applicants describe how an asynchronous request handling design can bridge the gap between a null commit strategy and full commit confirmation.

TABLE 5

Null Commit Strategy with 2 and 4 Node Results

| | JMeter | | | Node.js Server | | | Hyperledger Fabric | | | Results | | |
|---|---|---|---|---|---|---|---|---|---|---|---|---|
| | Clts | Thr. | Lps | Srvs | Wrks | Tx Wait | BS | TO (s) | End. | Thrpt | Ltcy (ms) | BFR |
| TC1 | 6 | 1600 | 25 | 2 | 32 | ✓ | 1600 | 4 | 2 | 600 | 15539 | 93% |
| TC2 | 6 | 1600 | 25 | 2 | 12 | x | 1600 | 4 | 2 | 723 | 12844 | 100% |
| TC3 | 6 | 1600 | 25 | 2 | 16 | x | 1600 | 4 | 2 | 857 | 10734 | 100% |
| TC4 | 6 | 1600 | 25 | 2 | 20 | x | 1600 | 4 | 2 | 919 | 10024 | 100% |
| TC5 | 6 | 1600 | 25 | 2 | 24 | x | 1600 | 4 | 2 | 971 | 9472 | 100% |
| TC6 | 6 | 1600 | 25 | 2 | 28 | x | 1600 | 4 | 2 | 1005 | 9082 | 100% |
| TC7 | 6 | 1600 | 25 | 2 | 32 | x | 1600 | 4 | 2 | 1039 | 8807 | 100% |
| TC8 | 8 | 1200 | 70 | 4 | 64 | x | 1200 | 3 | 4 | 1863 | 5031 | 100% |

CouchDB Document ID & B-tree Chunk Size. For the following tests Applicants stabilized on a configuration and experimented with document ID generation strategies and CouchDB's B-tree chunk size.

The configuration included 8 JMeter clients each inserting 54,000 agreement objects, mapped to 4 application servers with 12 workers each. On the Hyperledger Fabric layer, Applicants have a block size of 1200, 3 second block cut timeout, and 4 endorser peers (1 per application server) out of 6 total peers.

When an agreement object is generated, the agreement ID is populated with a unique ID (i.e., line 2 in the Agreement Data Object). The agreement ID is used to index the agreement JSON object in CouchDB.

Table 6 shows the results of using random and monotonic agreement document IDs. The random ID test uses the uuid Node.js library to generate the document IDs. Since the IDs are random, inserting and indexing the data object in CouchDB may not leverage the caching behaviour of the underlying B-tree. A random ID data object resulted in 841 TPS, 12.6 s latency, and a block fill ratio of 92%.

Alternatively, Applicants leveraged timestamps, which are inherently sequential, as a monotonic document ID. Upon agreement creation, an ID is generated using process.hrtime [16]. In order to avoid collisions in document IDs (since multiple agreements could be created nearly simultaneously), the generated timestamp ID is granular (i.e., microseconds). Since monotonic IDs leverage the caching behaviour of the CouchDB B-tree and there are less intermediate tree nodes rewritten, the throughput improved by 5% to 878 TPS. Average latency is also reduced by 600 ms and more blocks were able to be filled (since overall transaction processing improved).

TABLE 6

CouchDB Document ID Results

| | JMeter | | | Node.js Server | | Hyperledger Fabric | | | Results | | |
|---|---|---|---|---|---|---|---|---|---|---|---|
| | Clts | Thr. | Lps | Srvs | Wrks | BS | TO (s) | End. | ID | Thrpt | Ltcy (ms) | BFR |
| TC1 | 8 | 1200 | 45 | 4 | 48 | 1200 | 3 | 4 | Rand | 841 | 12650 | 92% |
| TC2 | 8 | 1200 | 45 | 4 | 48 | 1200 | 3 | 4 | Mono | 878 | 12063 | 94% |

Table 7 reports the results of the chunk size modifications (including monotonic ID). The default B-tree chunk size is 1279, so Applicants experimented with values lower and higher than the default. Test case 1 (TC1) begins with a chunk size of 256, which resulted in 765 TPS. As Applicants increase the chunk size beyond the default value, the throughput improves to 921 TPS with a chunk size of 4096.

TABLE 7

B-tree Chunk Size Results

| | JMeter | | | Node.js Server | | Hyperledger Fabric | | | Results | | |
|---|---|---|---|---|---|---|---|---|---|---|---|
| | Clts | Thr. | Lps | Srvs | Wrks | BS | TO (s) | End. | ChkSz | Thrpt | Ltcy (ms) | BFR |
| TC1 | 8 | 1200 | 45 | 4 | 48 | 1200 | 3 | 4 | 256 | 765 | 13468 | 93% |
| TC2 | 8 | 1200 | 45 | 4 | 48 | 1200 | 3 | 4 | 1279 | 769 | 12983 | 81% |
| TC3 | 8 | 1200 | 45 | 4 | 48 | 1200 | 3 | 4 | 2048 | 881 | 11789 | 91% |
| TC4 | 8 | 1200 | 45 | 4 | 48 | 1200 | 3 | 4 | 4096 | 921 | 11525 | 92% |
| TC5 | 8 | 1200 | 45 | 4 | 48 | 1200 | 3 | 4 | 6203 | 891 | 11605 | 94% |
| TC6 | 8 | 1200 | 45 | 4 | 48 | 1200 | 3 | 4 | 8192 | 892 | 11610 | 93% |
| TC7 | 8 | 1200 | 45 | 4 | 48 | 1200 | 3 | 4 | 16384 | 886 | 11882 | 95% |

This is a 20% throughput increase from the default 1279 value. Latency is also reduced by 1 second with the large chunk size. Applicants observed that chunk size values greater than 4096 start to degrade performance (although the throughput and latency results are still an improvement over the default value results). For this load and configuration, a chunk size of 4096 optimizes the memory vs. speed trade-off provided by tuning the chunk size. This chunk size is large enough that the number of elements in a leaf node is not too large to hamper insertions, but large enough to avoid unnecessary intermediate node creations (which will slow down insertions).

Table 8 shows the transaction lifecycle breakdown for the key CouchDB configuration tests in Tables 6 and 7.

TABLE 8

CouchDB Configuration Impact Results

| | Endorse | Block Creation | | | Validate & Commit | | | | | | |
|---|---|---|---|---|---|---|---|---|---|---|---|
| | Avg time to complete proposal (ms) | Avg block cut time (ms) | Avg time to validate tx (ms) | Avg time to enqueue tx (ms) | Avg time to validate block (ms) | Avg time for ledger block processing (ms) | Avg time to commit block to storage (ms) | Avg time to commit block changes to statedb (ms) | CouchDB processing time BatchUpdate-Docs (ms) | Avg time to commit block (ms) | Raft data persist duration (ms) | JMeter Avg latency (ms) |
| T6TC1: base | 630 | 2097 | 0.87 | 1 | 242 | 149 | 108 | 818 | 220 | 1450 | 4 | 12600 |
| T6TC2: monol D | 561 | 1938 | 0.93 | 2.2 | 275 | 167 | 125 | 813 | 151 | 1462 | 10.9 | 12100 |
| T7TC4: monol D, Chunk Size | 515 | 1968 | 0.71 | 1.1 | 259 | 161 | 119 | 710 | 136 | 1331 | 9.9 | 11500 |

Tuning the CouchDB configuration should have a direct impact on processes that interact with the stateDB. Compared to the base case (row 1 of Table 8), the average processing time in CouchDB dropped by 46% with monotonic IDs (row 2) and a further 11% with chunk size tuning (row 3).

The CouchDB processing time metric measures the entire API call (BatchUpdateDocs) to CouchDB, which includes the resulting batch update. Therefore, the processing is directly improved by the monotonic ID (i.e., more cache hits) and B-tree chunk size (i.e., less B-tree node rewrites).

Since the average time to commit block changes to the stateDB includes the BatchUpdateDocs processing time, this metric also improved. The ledger block processing and block commit to storage times increase after monotonic document IDs are introduced because of the increased throughput. With blocks being generated faster, the average time to validate the read/write sets of transactions in the blocks and the time to commit the block to the local ledger file increases.

This test also illustrates the importance of monitoring the causal relationships between components and protocol steps. Although only the stateDB was tuned, the endorsement phase of the transaction was directly affected by the changes. Compared to the base case, the monotonic IDs and increased chunk size reduced the time spent executing transaction proposals by 22% (630 s to 515 s).

The reduced CouchDB processing time means the peers will spend less time waiting for CouchDB requests to complete. Since these requests are executing faster, the peers consume less CPU cores interacting with CouchDB. By reducing the CPU consumption in the validate and commit phase, there are more resources for the peers during the endorsement phase. Transaction proposal execution involves CPU intensive operations such as computing signatures (peer endorsement) and chaincode execution, so freeing up resources improves the endorsement phase.

State Database. As of Hyperledger Fabric v1.4.1, the peer state database options are GolevelDB or CouchDB. GolevelDB is a key-value database embedded in the peers and is enabled by default. CouchDB is an alternative database that runs externally to the peer (e.g., in a separate Docker container).

The benefit of using CouchDB is when the chaincode assets (i.e., the agreement data object) are modeled as JSON data [7]. Since the application leverages JSON data, Applicants can use rich queries against the chaincode data. However, the benefit of using rich queries comes at a cost of performance. Table 9 depicts the CouchDB (TC1) and GolevelDB (TC2) state database results.

TABLE 9

| State Database Choice Results |||||||||||||
|---|---|---|---|---|---|---|---|---|---|---|---|---|
| | JMeter ||| Node.js Srv || Hyperledger Fabric ||||| Results |||
| | Clts | Thr. | Lps | Srvs | Wrks | BS | TO (s) | End. | ChkSz | DB | Thrpt | Ltcy (ms) | BFR |
| TC1 | 6 | 600 | 100 | 2 | 24 | 600 | 2 | 2 | 4096 | CouchDB | 890 | 4221 | 97% |
| TC2 | 6 | 600 | 100 | 2 | 24 | 600 | 2 | 2 | — | GoLevelDB | 1189 | 2950 | 100% |

Both tests use the same configuration with 16 CPU cores per VM. The CouchDB test resulted in 890 TPS and 4.2 s latency, whereas GolevelDB provides a throughput boost of 35% to 1189 TPS and 2.9 s latency.

A major contributor to the CouchDB performance degradation is the HTTP API (MochiWeb [31]) through which interactions with the database occur (another contributor is the database locking mechanism).

The reported CouchDB results use batch operations, which write a group of documents to CouchDB through the MochiWeb request handler. However, the use of the MochiWeb API is a performance bottleneck in Hyperledger Fabric, especially with high transactions loads. Since GolevelDB is embedded in the peer, there is no need to interact with the database through an HTTP API, which significantly improves performance. However, there is a functionality and robustness (CouchDB) vs. performance (GolevelDB) trade-off to consider when choosing a state database.

Block Size Impact. This test reports the impact that the block size (BS) has on each phase of the transaction lifecycle. Tables 10 and 11 show the test configurations and the transaction lifecylce breakdown for 250, 500, and 1000 block sizes, respectively. FIGS. 9 and 10 depict the execution times for peer block validation and commit, and orderer block cut time, respectively.

Based on table 10, these tests were run on VMs with 8 CPU cores, where the 2 application servers with 6 workers each interacted with a Hyperledger Fabric network composed of 4 peers, where 2 of the peers are endorsing transactions. The results show that a block size of 500 provides the optimal throughput of 511 TPS and 6.9 s latency, whereas a block size of 1000 begins to degrade performance (decrease in throughput, latency, and block fill ratio).

TABLE 10

Block Size Impact Test Configurations

| | JMeter | | | Node.js Server | | Hyperledger Fabric | | Infra. | | Results | | |
|---|---|---|---|---|---|---|---|---|---|---|---|---|
| Block Size | Clts | Thr. | Lps | Srvs | Wrks | TO (s) | End. | Cores | Mem (GB) | Thrpt | Ltcy (ms) | BFR |
| 250 | 6 | 600 | 100 | 2 | 12 | 2 | 2 | 8 | 8 | 478 | 7451 | 99% |
| 500 | 6 | 600 | 100 | 2 | 12 | 2 | 2 | 8 | 8 | 511 | 6954 | 97% |
| 1000 | 6 | 600 | 100 | 2 | 12 | 4 | 2 | 8 | 8 | 506 | 6925 | 96% |

Table 11 helps to determine the source of this degradation.

The time a committing peer takes to validate and commit a block, and for the orderer to cut a block all increase by 90-100% per 250 block size increase. However, the magnitude increases by approximately 100 ms for validation, 440 ms for block commit, and 500 ms for block cut per 250 block size. Therefore, these aspects share the same rate of increase (90-100%), but the magnitude of increase is different. This shows that the block validation is least affected by the size of the block. The validation process can be run in parallel (validator pool size), which means the time to loop through the transactions in a block marginally increases as the number of transactions in a block increases since there are parallel threads validating transactions. Block committing and block cutting do not run in parallel (since only one block can be cut and committed at a time to avoid concurrency issues and chain forking), which results in a much larger time increase (440 ms and 500 ms, respectively) with bigger block sizes.

This also shows that performance optimization should be focused on block commit and block cut since they contribute an order of magnitude more to the overall latency (1000 ms combined block commit and cut vs 100 ms block validation). For example, selecting the optimal block size for the transaction rate will reduce the average block cut time and tuning the stateDB can reduce the commit processing on the database.

TABLE 11

Block Size Impact On Transaction Lifecycle Results.

| | Endorse | Block Creation | | | Validate & Commit | | | | | | |
|---|---|---|---|---|---|---|---|---|---|---|---|
| | | | | | | | | | | Raft | |
| | | | | | | | Avg time to | CouchDB | | | |
| | Avg time to complete proposal | Avg block cut time | Avg time to validate tx | Avg time to enqueue tx | Avg time to validate block | Avg time for ledger block processing | Avg time to commit block to storag | commit block changes to statedb | processing time BatchUpdate-Docs | Avg time to commit block | Raft data persist duration | JMeter Avg latency |
| Block Size | (ms) | (ms) | (ms) | (ms) | (ms) | (ms) | (ms) | (ms) | (ms) | (ms) | (ms) | (ms) |
| 250 | 180 | 500 | 1.1 | 1.5 | 107 | 45 | 33 | 285 | 120 | 497 | 5.7 | 7451 |
| 500 | 378 | 980 | 1 | 2.1 | 205 | 81 | 62 | 537 | 226 | 936 | 9.3 | 6954 |
| 1000 | 680 | 1986 | 1.1 | 3 | 412 | 152 | 120 | 1039 | 434 | 1814 | 9.8 | 6925 |

Figure 13:
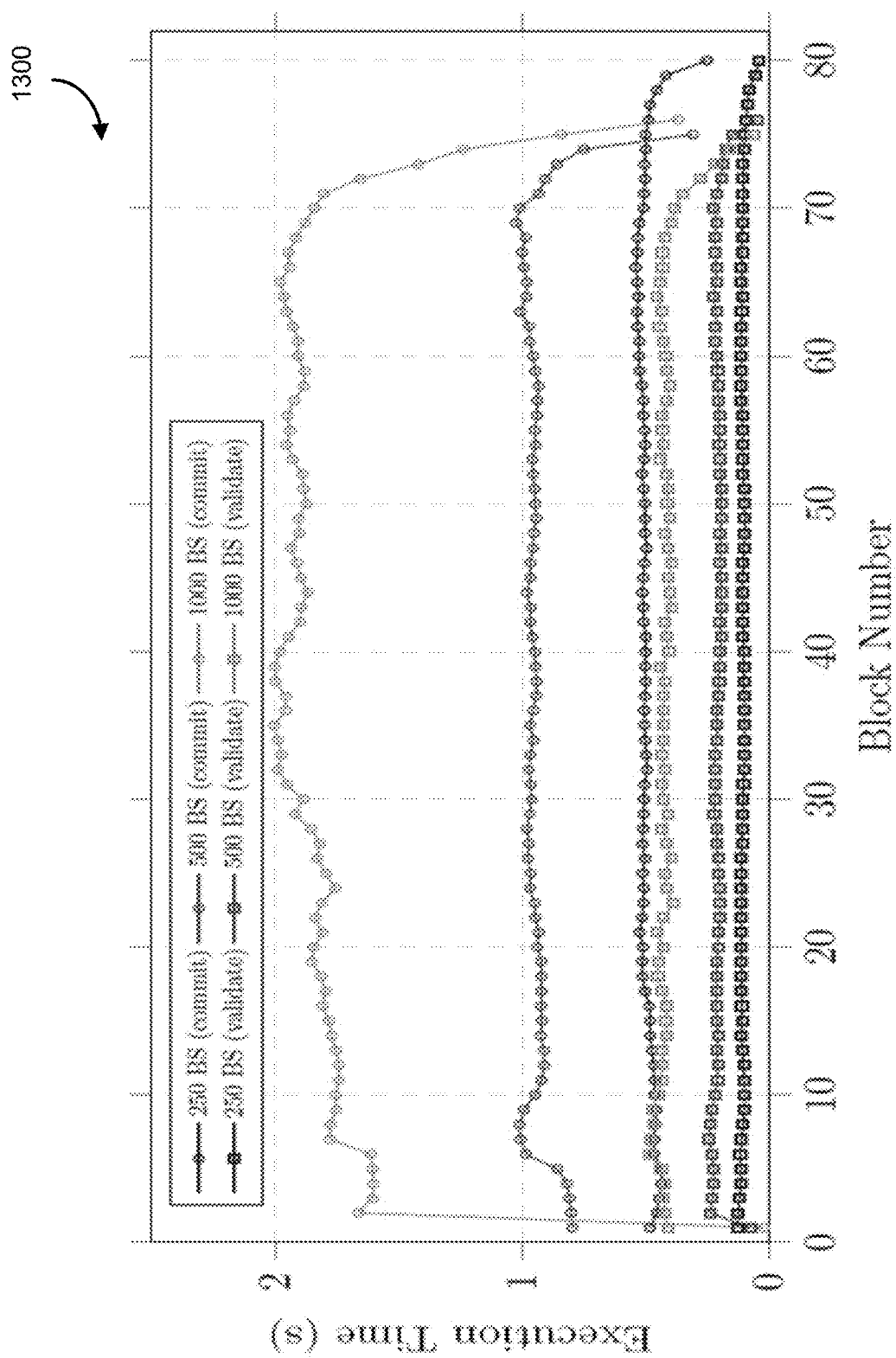
FIG. 13 is a chart showing impact of block size on peer block validation and commit.

Comparing the 250 block size with the 1000 block size validate and commit results in FIG. 13 confirms this conclusion. FIG. 13 is a chart 1300 showing impact of block size on peer block validation and commit. With 250 transactions in a block, the average block commit and validation times (blue line) are relatively close together. However, as the number of transactions in the block grows, the block commit and validations times become farther apart (green line). This shows the importance of tuning the block size since the time to commit the block increases at a higher rate (440 ms per 250 block size) than block validation (100 ms per 250 block size).

Figure 14:
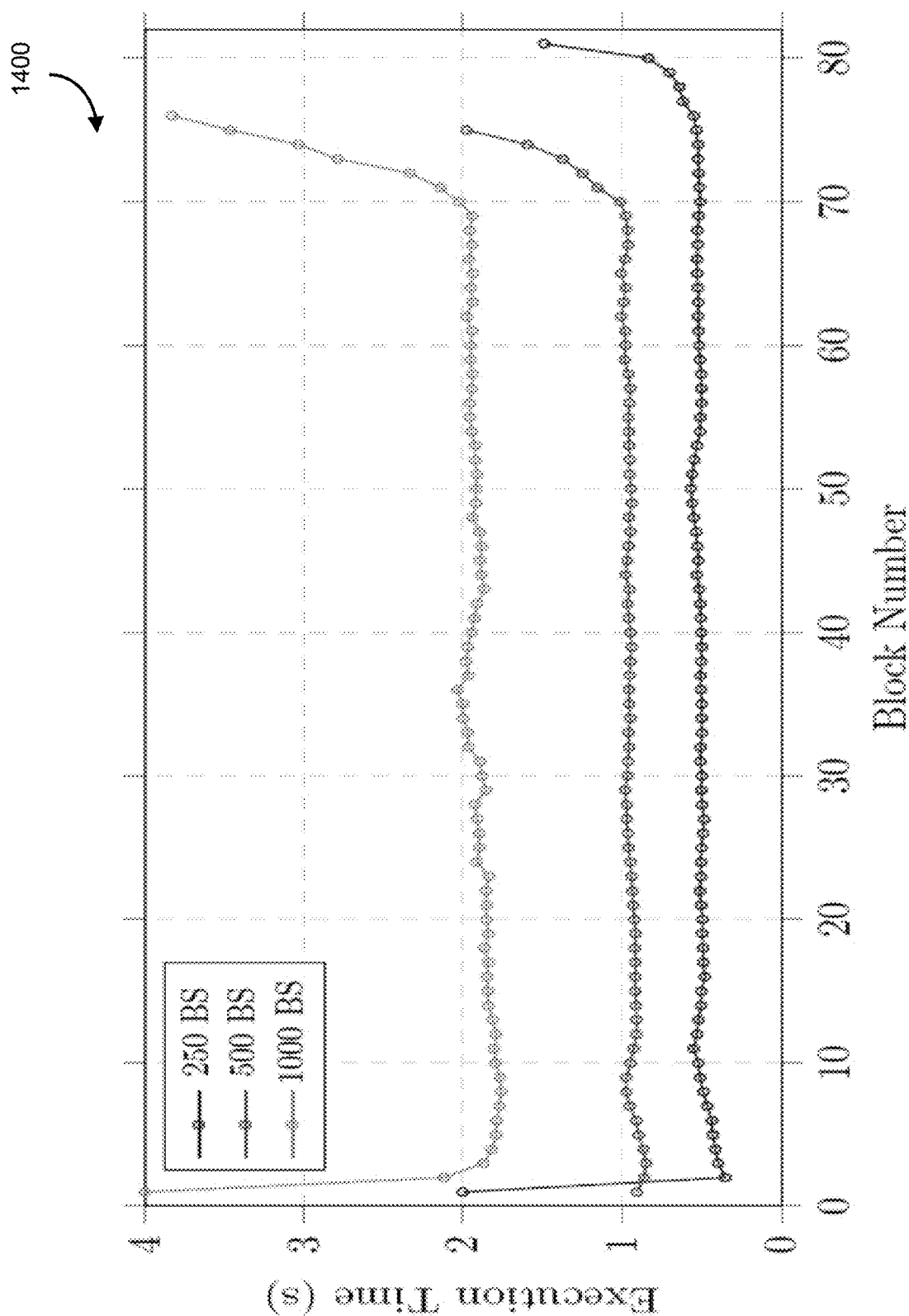
FIG. 14 is a graph showing impact of block size on orderer block cut time.

FIG. 14 is a graph 1400 showing impact of block size on orderer block cut time.

Query Workload Performance Results

The previous test results were based on data insertion workloads. This section provides the results of data query based tests. Query tests fall into two categories based on how many documents are returned in the result set: (i) 1 document is returned; and (ii) 100 documents are returned. The transaction flow for queries differs from insertions as the transactions are not sent to the orderer.

The results of the query tests are shown in Table 12. The table rows are organized based on the number of documents returned (i.e., 1 or 100). Initially, agreement objects are inserted to the blockchain network and stored in CouchDB. The state database documents are comprised of cached objects for static data (around 500 documents) and agreement objects (1 to 200). For the tests that return 1 result, the database size is just over 500 documents (about 500 cached objects and 1 agreement). Therefore, the test returns the single agreement document from the state database. Tests that return 100 results are run against a database of size 700 (about 500 cached objects and 200 agreements). The test returns 100 out of 200 agreement objects. Applicants also run tests with increasing database sizes of 10,000, 50,000, and 100,000. During all query tests, document types and indexing are enabled.

Rows 1 to 6 and 10 to 15 of Table 12 show the results of increasing application server workers and client request concurrency (i.e, JMeter load). As expected, returning 1 document is faster than returning 100. Increasing the worker threads on the application server improves the query throughput since more requests can be handled concurrently. As the number of JMeter threads increases (i.e., the amount of query requests), the throughput of the 1 result tests (rows 1-9) increases from 349 TPS to 423 TPS. However, as the number of JMeter threads exceeds 200, the throughput degrades to 392 TPS with 1000 JMeter threads.

Interestingly, the 100 query results have very little throughput degradation with increased request load (starting at 56 TPS and only dropping to 50 TPS). This behaviour can be attributed to the CPU usage of the application server and peer. For the 100 result tests, the peer consumed 60% of the CPU, whereas the Node.js application consumed 10%. This means that the application server was underutilized because the peer was busy searching for the 100 documents in CouchDB.

Since the application server is slowed down by the peer processing, the throughput is essentially throttled at about 50 TPS. For the 1 result test, the peer cpu usage is at 10% and the application server is at 50%. This has the opposite effect from the 100 result tests, where the application server in the 1 result test is able to process transactions at a much faster rate (since the peer is only querying CouchDB for 1 document) and produce a higher throughput.

The database size can also play a role in performance since the queried document must be searched for in the document space. However, indexing the documents can mitigate the effect that database size has on query performance. Rows 7-9 and 16-18 show the results of large database sizes for 1 and 100 result tests, respectively. Since the documents are indexed, the effect that the database size has on throughput and latency is minimal.

The 1 result tests remain around 390 TPS with 300 ms latency for database sizes up to 100,000, and the 100 result tests are constant at 42 TPS and 3.5 s latency.

TABLE 12

Query Workload Performance Results

| | JMeter | | | Node.js Server | | Hyperledger Fabric | | Infra. | | Results | |
|---|---|---|---|---|---|---|---|---|---|---|---|
| | Clts | Thr. | Lps | Srvs | Wrks | DB size | ChkSz | Cores | Mem (GB) | Thrpt | Ltcy (ms) |
| 1 | 1 | 50 | 100 | 1 | 10 | 507 | 4096 | 16 | 16 | 349 | 122 |
| 1 | 1 | 100 | 100 | 1 | 16 | 507 | 4096 | 16 | 16 | 386 | 213 |
| 1 | 1 | 150 | 100 | 1 | 16 | 507 | 4096 | 16 | 16 | 410 | 285 |
| 1 | 1 | 200 | 100 | 1 | 16 | 507 | 4096 | 16 | 16 | 423 | 411 |

TABLE 12-continued

Query Workload Performance Results

| JMeter | | | Node.js Server | | Hyperledger Fabric | | | Infra. | | Results | |
|---|---|---|---|---|---|---|---|---|---|---|---|
| Clts | Thr. | Lps | Srvs | Wrks | DB size | ChkSz | Cores | Mem (GB) | | Thrpt | Ltcy (ms) |
| 1 | 1 | 500 | 100 | 1 | 16 | 507 | 4096 | 16 | 16 | 406 | 902 |
| 1 | 1 | 1000 | 100 | 1 | 16 | 507 | 4096 | 16 | 16 | 392 | 1865 |
| 1 | 1 | 150 | 100 | 1 | 16 | 10507 | 4096 | 16 | 16 | 390 | 303 |
| 1 | 1 | 150 | 100 | 1 | 16 | 50507 | 4096 | 16 | 16 | 389 | 335 |
| 1 | 1 | 150 | 100 | 1 | 16 | 100507 | 4096 | 16 | 16 | 399 | 325 |
| 100 | 1 | 50 | 100 | 1 | 10 | 707 | 4096 | 16 | 16 | 56 | 870 |
| 100 | 1 | 100 | 100 | 1 | 16 | 707 | 4096 | 16 | 16 | 56 | 1782 |
| 100 | 1 | 150 | 100 | 1 | 16 | 707 | 4096 | 16 | 16 | 54 | 2736 |
| 100 | 1 | 200 | 100 | 1 | 16 | 707 | 4096 | 16 | 16 | 52 | 3787 |
| 100 | 1 | 500 | 100 | 1 | 16 | 707 | 4096 | 16 | 16 | 52 | 9353 |
| 100 | 1 | 1000 | 100 | 1 | 16 | 707 | 4096 | 16 | 16 | 50 | 20079 |
| 100 | 1 | 150 | 100 | 1 | 16 | 10707 | 4096 | 16 | 16 | 43 | 3452 |
| 100 | 1 | 150 | 100 | 1 | 16 | 50707 | 4096 | 16 | 16 | 42 | 3547 |
| 100 | 1 | 150 | 100 | 1 | 16 | 100707 | 4096 | 16 | 16 | 43 | 3474 |

Cloud Deployment Performance Results

In addition to an on-premise application deployment, Applicants performed initial performance testing with cloud hosted infrastructure. Applicants provide high-level results as the performance optimization methodology applies to a cloud environment and the analysis demonstrated in the previous sections is similar.

Infrastructure. The cloud infrastructure for running the performance tests used the IBM Kubernetes Service [27] that runs on x86 compute. From a cloud perspective, relying on Kubernetes allows for quick provisioning of various cluster topologies, and varying the number of worker nodes, vCPUs, and memory. Kubernetes is a container orchestration platform that follows an architectural pattern of master/worker nodes and manages and automates the deployment of containerized workloads.

Through deployment strategies, the cluster ensures adequate distribution of resources across all worker nodes. A worker node is similar to a VM and contains services to run pods and is managed by a master node [32]. A pod models a logical host and is a group of tightly-coupled containers with specifications on how to run the containers [34]. The test results below relied on up to 26 worker nodes, each with a single pod (i.e., 10 peers, 3 orderers, 4 Node.js servers, 8 JMeters, TLS certificates), configured with 16 vCPUs, followed by 24 vCPUs.

Test Environment. The Hyperledger Fabric Regression Driver (HFRD) performance test tool [21] was responsible for deploying the blockchain components, including the certificate authorities, peers, and orderers. HFRD is an integration of the Hyperledger Cello Project [18] with a deployment pipeline controlled by a Jenkins container. The solution provides an administration console to control the environment deployment and the execution of the tests.

Although HFRD controls the execution of the overall tests, test scripts (e.g., invocation commands) are executed on the Kubernetes cluster hosting the blockchain network. Due to the limitations of HFRD, the resource allocation of each pod's container is governed by a universal limit. For example, with 16 vCPUs per worker node and the HFRD limit set to 8, the peer and CouchDB containers are deployed in the same pod with 8 vCPUs each (i.e., all containers follow this limit). However, pods running one container (e.g., orderer) are only allocated 8 out of 16 vCPUs. For 24 vCPUs, the limit is set to 12 vCPUs per container. The Node.js application servers and JMeter containers are not deployed with HFRD and are allocated all 16 or 24 vCPUs. The deployed application components were the same as the on-premise deployment.

Results. Table 13 reports the results of 4 performance test cases against an IBM Cloud deployed blockchain application. Test cases 1 (TC1) and 2 (TC2) show throughput reaching over 1000 TPS with full commit confirmations enabled (Tx Wait). Even with minimal application server scaling (i.e., 2 Node servers) and 16 CPU cores the transaction latency remains reasonable (6.2 s) with high throughput (1114 TPS). Scaling the JMeter load, application servers, worker threads, and endorsing peers in TC2 provides an 11% throughput improvement from TC1, but increases the latency by 3 s. The increased latency can be attributed to the processing of over 430,000 transactions in the network. To reduce the latency, Applicants vertically scaled the CPU cores of each worker node to 24 cores in TC3. This improved throughput by 15% and reduced latency by 1 s.

TABLE 13

Cloud Deployment Performance Results

| | JMeter | | | Node.js Server | | | Hyperledger Fabric | | | Infra. | Results | | |
|---|---|---|---|---|---|---|---|---|---|---|---|---|---|
| | Clts | Thr. | Lps | Srvs | Wrks | Tx Wait | BS | TO (s) | End. | Cores | Thrpt | Ltcy (ms) | BFR |
| TC1 | 6 | 1200 | 25 | 2 | 28 | ✓ | 1200 | 4 | 2 | 16 | 1114 | 6206 | 98% |
| TC2 | 8 | 1200 | 45 | 4 | 56 | ✓ | 1200 | 3 | 4 | 16 | 1239 | 9113 | 98% |
| TC3 | 8 | 1200 | 45 | 4 | 64 | ✓ | 1400 | 3 | 4 | 24 | 1423 | 8101 | 98% |
| TC4 | 8 | 1200 | 70 | 4 | 64 | x | 1200 | 3 | 4 | 16 | 3120 | 2865 | 100% |

As a final test, TC4 disables the transaction commit confirmation with the null commit strategy. This is the same configuration as the on-premise test in Table 5 (TC8). In contrast to the on-premise results, the cloud deployment provided a 68% increase in throughput (1863 vs. 3120 TPS) with a 2 s decrease in latency.

Comparing the on-premise results to the cloud results yields a subtle difference in testing environments. Based on the dynamic mapping of physical, logical, and virtual CPUs, the on-premise virtualized environment is optimal for average workloads (i.e., not running at full capacity). The cloud infrastructure can be configured in a way that allows the worker nodes to run at full capacity (i.e., high load tests) and optimally utilize the CPU cores with minimal contention between worker nodes. This is especially the case with the null commit strategy test where all Node servers can run at full capacity and provide the large throughput boost.

Performance Improvement Recommendations

Applicants present proposals to the application, architecture, and platform (Hyperledger Fabric) layers for performance improvement.

State Database Choice. The peer state database is currently limited to GolevelDB and CouchDB (v1.4.1). Since many applications rely on JSON data objects, CouchDB is the recommended state database because of rich query support. However, the interface in which the peers interact with CouchDB and the database locking mechanism are bottlenecks in the system. All interactions between the peer and CouchDB are through a REST API, which significantly impacts performance compared to the peer internal GolevelDB. In order to reduce the impact of the REST API, the number of calls to CouchDB should be minimized. Hyperledger Fabric currently uses batch functions to reduce the number of CouchDB calls, however for high transaction rates, the overall number of API calls is still significant. Comparing the use of the REST API for CouchDB with traditional databases is worth investigating.

Database locking mechanisms are necessary for concurrency control, however updating the world state of transactions in CouchDB acquires an exclusive lock on the whole database. Since each transaction execution updates the world state in the stateDB, acquiring a lock on the entire database is a costly operation in terms of lock overhead (the resources used for acquiring and releasing locks) and the lock contention (attempting to acquire a lock held by another process).

The granularity of the locking mechanism should be increased in order to reduce the amount of data that the lock is covering. This provides an overhead vs. contention trade-off, where more fine-grained locks consume more resources but reduce lock contention. Integrating PostgreSQL into Hyperledger Fabric has been proposed [3]. PostgreSQL's snapshot isolation levels would allow transaction executions to run in parallel without read and write lock contention [3]. This would significantly improve performance and remove the exclusive lock on the whole database.

As of Hyperledger Fabric v1.4, the query mechanism for CouchDB does not leverage views and map-reduce. Allowing Hyperledger Fabric to utilize CouchDB's views and map-reduce features will improve query performance due to efficient indexing and parallel processing. Future versions may incorporate this feature into Hyperledger Fabric's core APIs.

Split Peer Roles. All peers in a Hyperledger Fabric network commit transactions, but there are a subset of peers that also endorse transactions. It is well known that endorsement and commitment are expensive operations [53,68]. Endorsing involves 3 steps: (i) checking and validating the proposal; (ii) simulating the proposal; and (iii) endorsing the proposal.

First, the transaction proposal headers are validated (i.e, transaction type and signature correctness), the signature is validated (i.e., creator certificate syntax and signature verification), and proposal message verification (i.e., correct chaincode header extensions and payload visibility).

The uniqueness of the proposal is confirmed through the transaction ID and the chaincode access control list is checked to see if the proposal complies with the authorized writers. The second step acquires a shared read lock on the stateDB and the proposal is simulated.

The proposal simulation calls the chaincode (i.e., executes the transaction), assembles the read/write set, and releases the shared stateDB lock. The last step endorses the proposal (calls the endorsement system chaincode that enforces the endorsement policy and signs the proposed transaction).

Commitment involves 4 steps: (i) validating the block; (ii) ledger block processing; (iii) committing the block to storage; and (iv) updating the stateDB. First, the block is decoded and all transactions endorsements are validated (signature verification) through the validation system chaincode (VSCC). Then, the state and read/write sets for all transactions are validated through the multiversion concurrency control (MVCC) checks. Third, metadata is added to the block and the block is committed to the peer's local ledger file. Lastly, the world state based on all transactions is updated in the stateDB.

Endorsing and committing each involve computationally intensive operations, such as signature generations and verifications, marshaling and unmarshaling blocks and transactions, as well as chaincode invocations and stateDB API calls. Single peers can act as both endorser and committer, which causes increased resource contention on these peers since they must perform transaction endorsement and block commits.

However, committing to the stateDB acquires an exclusive lock on the database, which prevents the peers from endorsing transactions since it must read from the stateDB. Splitting the peers to separate endorser and committer peer clusters will alleviate the resource contention with the single peer setup. To avoid the database lock contention, endorsement should be fully separated from commitment as suggested in [53].

Threshold Signatures. Consensus protocols such as HotStuff [73], Tendermint [57], and Casper [44] leverage threshold signatures to improve performance. A (k, n)-threshold signature scheme requires k partial signatures from peers out of n total peers to produce a digital signature (the partial signatures are combined).

There is a single public key that is held by all peers and each of the n peers has a unique private key. When a digital signature is produced, any peer can verify the signature by using the single public key.

Since a subset of peers in Hyperledger Fabric endorse transactions with digital signatures, the resulting endorsement will be composed of a signature per peer. Threshold signatures can be leveraged in peers to reduce storage space (i.e., endorsed transactions will have one combined threshold signature) and improve the performance of block validation (i.e., each transaction will only require validation of the threshold signature rather than a distinct signature from each peer). Threshold signatures have been recommended for peer transaction endorsements and proposed for Hyperledger Fabric [4].

Asynchronous Request Design. The null commit strategy test shows the significant performance improvement when omitting transaction commit confirmations. In order to bridge the gap between the full commit wait strategy and the null commit strategy, Applicants propose that an asynchronous request handling design be integrated in the application tier. This would free up the application server to process more transactions (instead of also consuming resources waiting for commit responses) by having a separate service that handles the commit confirmation for the client. For example, transactions from clients could be stored in a queue, which a "consumer" service (e.g., Node.js application) connects to. This service would interact with the Hyperledger Fabric network, but hand off the handling of transaction commit confirmation events to a "listener" service (e.g., Node.js application).

The listener service notifies the client upon receipt of the transaction confirmation. This design asynchronously handles requests since once the consumer service completes the transaction proposal, it can start processing the next transaction without having transaction and block listeners waiting for commit events. These event listeners are handled in the separate listener service (hosted in a different process).

Buffered Channel for Block Validation. The block validation routine uses an unbuffered channel for communication between goroutines. An unbuffered channel operates synchronously, which means if a goroutine sends its result over the channel, the goroutine will block until a receiving goroutine gets the result from the channel. If many goroutines complete their validation process at the same time then there will be contention between the goroutines to send their results through the channel.

Alternatively, a buffered channel allows a capacity to be specified that enables goroutines to "fire and forget" their validation results. Goroutines will not be blocked when sending and receiving values on the channel as long as the channel is not at full capacity. Leveraging a buffered channel with capacity set to the block size instead of an unbuffered channel may avoid contention between block validation goroutines (Hyperledger Fabric v1.4 does not currently use a buffered results channel).

Component Distribution. Based on the experimental results, the proper distribution of application components is crucial for system performance, especially in a virtualized environment. For non-Kubernetes deployments (e.g., FIG. 4), an ideal virtualized setup is to have a separate VM for each component to avoid resource and infrastructure limitations. However, for a constrained environment, multiple components can run on a single VM.

Assuming all Hyperledger Fabric components run in containers, a peer should run on the same VM as its CouchDB and chaincode instances. The application servers (e.g., Node.js) should run on VMs separate from the peers since the application servers and peers use the most CPU cores. Orderers consume little CPU, so their deployment is not as crucial as other components. For example, they can be placed on VMs that run peers or application servers. Kubernetes-based deployments should have an anti-affinity rule (i.e., dynamic allocation of worker nodes) that ensures components are properly distributed across resources. Resources can then be constrained to limit CPU and memory allocations to the worker nodes.

As noted above, a production-grade distributed blockchain application is described in various embodiments. Experiments included horizontally scaling application servers and peers, specialty tests (e.g., commit strategies, stateDB, block size), queries, and on-premise and cloud deployments.

Based on the experimental results, Applicants proposed a number of different approaches for further performance improvement.

From the transaction phase data collected during the stateDB experiments, the interactions with CouchDB are a bottleneck in the system. Altering the current lock strategy or extending Fabric's stateDB pluggability to allow for databases with a more efficient interface (e.g., PostgreSQL) can alleviate this bottleneck.

Splitting peer roles to individual endorsers and committers will reduce the resource contention for dual-role peers. There are many CPU intensive operations, such as digital signature generation and verification, performed by peers during transaction endorsement and validation so leveraging threshold signature schemes can reduce the number of signature verification operations. Experimenting with transaction commit strategies allowed us to determine how an asynchronous request handling design would reduce the idle time waiting for transaction commit confirmations in the current synchronous commit handling model.

Analyzing the block verification procedure revealed the use of unbuffered channels for validation goroutines. Buffered channels based on the block size can reduce blocked goroutines from sending their results to the channel. Lastly, the proper distribution of application components across the underlying infrastructure is crucial for system performance.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

1. Basic concepts and fundamental ideas of z/VM [PowerPoint slides]. IBM Corpora-tion. http://comet.lehman.cu-ny.edu/cocchi/CMP464Mainframe/3.0VMLectures/ 3.10IntroductionSlides.ppt (2004), accessed: October 2019
2. Why Sequential Document IDs? GrokBase CouchDB Messages. https://grokbase.com/t/couchdb/user/

092t4e7qyd/why-sequential-document-ids-was-re-whats-the-speed-performance-of-couchdb (2009), accessed: October 2019
3. PostgreSQL as Fabric's State Database. Hyperledger Fabric JIRA. https://jira.hyperledger.org/browse/FAB-8031 (2018), accessed: October 2019
4. Threshold Signatures. Hyperledger Fabric JIRA. https://jira.hyperledger.org/browse/FAB-2860 (2018), accessed: October 2019
5. Apache JMeter. The Apache Software Foundation. https://jmeter.apache.org/ (2019), accessed: October 2019
6. Apache Kafka: A distributed streaming platform. https://kafka.apache.org/ (2019), accessed: October 2019
7. Couchdb as the state database. Hyperledger Fabric Documentation. https://hyperledger-fabric.readthedocs.io/en/release-1.4/couchdb as state database.html (2019), accessed: October 2019
8. CouchDB find API. CouchDB Documentation. https://docs.couchdb.org/en/2.2.0/api/database/find.html (2019), accessed: October 2019
9. CouchDB GitHub Repository. https://github.com/apache/couchdb/blob/16e6af4cf8ec268f7f7eef0f78b3cf0ec3b6f3bd/src/couch/src/couch btree.erl (2019), accessed: October 2019
10. Don't Block the Event Loop (or the Worker Pool). Nodejs Documentation. https://nodejs.org/en/docs/guides/dont-block-the-event-loop/ (2019), accessed: October 2019
11. Endorsement policies. Hyperledger Fabric Documentation. https://hyperledger-fabric.readthedocs.io/en/release-1.4/developapps/endorsementpolicies.html (2019), accessed: October 2019
12. Fabric-network module. Hyperledger Fabric SDK for Node.js. https://fabric-sdk-node.github.io/release-1.4/module-fabric-network.html (2019), accessed: October 2019
13. Flexible I/O Tester Documentation. https://fio.readthedocs.io/en/latest/fio doc.html (2019), accessed: October 2019
14. Grafana. Grafana Labs. https://grafana.com/ (2019), accessed: October 2019
15. How to use a common connection profile. Hyperledger Fabric SDK for Node.js. https://fabric-sdk-node.github.io/release-1.4/tutorial-network-config.html (2019), accessed: October 2019
16. Hrtime Documentation. https://nodejs.org/api/process.html#process process hrtime time (2019), accessed: October 2019
17. Hyperledger Caliper. GitHub Repository. https://github.com/hyperledger/caliper (2019), accessed: October 2019
18. Hyperledger Cello. The Linux Foundation. https://www.hyperledger.org/projects/cello (2019), accessed: October 2019
19. Hyperledger Fabric 1.3 Release Changes. GitHub Repository. https://github.com/hyperledger/fabric/blob/master/CHANGELOG.md#v130-rc1 (2019), accessed: October 2019
20. Hyperledger Fabric 1.4 Updates. Hyperledger Fabric Documentation. https://hyperledger-fabric.readthedocs.io/en/release-1.4/whatsnew.html (2019), accessed: October 2019
21. Hyperledger Fabric Regression Test Tool. GitHub Repository. https://github.com/litong01/hfrd/ (2019), accessed: October 2019
22. Hyperledger Fabric SDK for Node.js. EventHub Documentation. https://fabric-sdk-node.github.io/EventHub.html (2019), accessed: October 2019
23. Hyperledger Fabric SDK for Node.js. Fabric Network Module Documentation. https://fabric-sdk-node.github.io/release-1.4/module-fabric-network.html (2019), accessed: October 2019
24. Hyperledger Fabric Transaction Flow. https://hyperledger-fabric.readthedocs.io/en/release-1.4/arch-deep-dive.html#swimlane (2019), accessed: October 2019
25. Hyperledger Images. Docker Hub Repository. https://hub.docker.com/u/hyperledger (2019), accessed: October 2019
26. Hyperledger. The Linux Foundation. https://www.hyperledger.org/ (2019), ac-cessed: October 2019
27. IBM Cloud Kubernetes Service. https://cloud.ibm.com/docs/containers (2019), accessed: October 2019
28. iPerf Documentation. https://iperf.fr/ (2019), accessed: October 2019
29. Jaeger: open source, end-to-end distributed tracing. https://www.jaegertracing.io/ (2019), accessed: October 2019
30. Miscellaneous Parameters. Apache CouchDB Documentation. https://docs.couchdb.org/en/stable/config/misc.html (2019), accessed: October 2019
31. MochiWeb GitHub Repository. https://github.com/mochi/mochiweb (2019), ac-cessed: October 2019
32. Nodes. Kubernetes Documentation. https://kubernetes.io/docs/concepts/architecture/nodes/ (2019), accessed: October 2019
33. OpenTracing. The OpenTracing Project. https://opentracing.io/ (2019), accessed: October 2019
34. Pods. Kubernetes Documentation. https://kubernetes.io/docs/concepts/workloads/pods/pod/ (2019), accessed: October 2019
35. Prometheus. https://prometheus.io/ (2019), accessed: October 2019
36. The Ordering Service. Hyperledger Fabric Documentation. https://hyperledger-fabric.readthedocs.io/en/release-1.4/orderer/ordering service.html (2019), accessed: October 2019
37. Tx.Submit Documentation. Hyperledger Fabric SDK for Node.js. https://fabric-sdk-node.github.io/release-1.4/module-fabric-network.Transaction.html#submit anchor (2019), accessed: October 2019
38. Uuid NPM Package. NPM Repository. https://www.npmjs.com/package/uuid (2019), accessed: October 2019
39. Abraham, I., Malkhi, D., et al.: The blockchain consensus layer and bft. Bulletin of EATCS 3 (123) (2017)
40. Anderson, J. C., Lehnardt, J., Slater, N.: CouchDB: The Definitive Guide. Appendix F. The Power of B-trees. https://www.oreilly.com/library/view/couchdb-the-definitive/9780596158156/apf.html (2010), accessed: October 2019
41. Anderson, J. C., Lehnardt, J., Slater, N.: CouchDB: The Definitive Guide. High Performance. https://www.oreilly.com/library/view/couchdb-the-definitive/9780596158156/ch23.html (2010), accessed: October 2019
42. Androulaki, E., Barger, A., Bortnikov, V., Cachin, C., Christidis, K., De Caro, A., Enyeart, D., Ferris, C., Laventman, G., Manevich, Y., et al.: Hyperledger fabric: a distributed operating system for permissioned blockchains. In: Proceedings of the Thirteenth EuroSys Conference. p. 30. ACM (2018)
43. Baliga, A., Solanki, N., Verekar, S., Pednekar, A., Kamat, P., Chatterjee, S.: Per-formance characterization of hyperledger fabric. In: 2018 Crypto Valley Conference on Blockchain Technology (CVCBT). pp. 65-74. IEEE (2018)
44. Buterin, V., Griffith, V.: Casper the friendly finality gadget. arXiv preprint arXiv: 1710.09437 (2017)
45. Buterin, V., et al.: Ethereum white paper: a next generation smart contract & decentralized application platform. First version (2014)
46. Croman, K., Decker, C., Eyal, I., Gencer, A. E., Juels, A., Kosba, A., Miller, A., Saxena, P., Shi, E., Sirer, E. G., et al.: On scaling decentralized blockchains. In: International Conference on Financial Cryptography and Data Security. pp. 106-125. Springer (2016)
47. Dinh, T. T. A., Wang, J., Chen, G., Liu, R., Ooi, B. C., Tan, K. L.: Blockbench: A framework for analyzing private blockchains. In: Proceedings of the 2017 ACM International Conference on Management of Data. pp. 1085-1100. ACM (2017)
48. Dionne, B.: Fundamental Question on CouchDBs Append Only B-tree. https://grokbase.com/t/couchdb/dev/123daf8433/fundamentals-question-on-couchedbs-append-only-b-tree (2012), accessed: October 2019
49. Donovan, A. A., Kernighan, B. W.: The Go programming language. Addison-Wesley Professional (2015)
50. Ferris, C.: Answering your questions on hyperledger fabric performance and scale. https://www.ibm.com/blogs/blockchain/2019/01/answering-your-questions-on-hyperledger-fabric-performance-and-scale/ (2019), accessed: October 2019
51. Ferris, C.: Does Hyperledger Fabric Perform at Scale? Blockchain Pulse: IBM
Blockchain Blog. https://www.ibm.com/blogs/blockchain/2019/04/does-hyperledger-fabric-perform-at-scale/ (2019), accessed: October 2019
52. Gorenflo, C., Golab, L., Keshav, S.: Xox fabric: A hybrid approach to transaction execution. arXiv preprint arXiv: 1906.11229 (2019)
53. Gorenflo, C., Lee, S., Golab, L., Keshav, S.: Fastfabric: Scaling hyperledger fabric to 20,000 transactions per second. arXiv preprint arXiv: 1901.00910 (2019)
54. Jain, R.: The art of computer systems performance analysis. john wiley & sons. Inc. New York (1991)
55. Javaid, H., Hu, C., Brebner, G.: Optimizing validation phase of hyperledger fabric. arXiv preprint arXiv: 1907.08367 (2019)
56. Kocsis, I., Pataricza, A., Telek, M., Klenik, A., De'e, F., Cseh, D.: Towards per-formance modeling of hyperledger fabric. In: International IBM Cloud Academy Conference (ICACON) (2017)
57. Kwon, J.: Tendermint: Consensus without mining. Draft v. 0.6, fall 1, 11 (2014)
58. Lee, T. B.: The wannacry ransomware attack was temporarily halted. but it's not over yet. https://www.vox.com/new-money/2017/5/15/15641196/wannacry-ransomware-windows-xp (2017), accessed: October 2019
59. Nakamoto, S., et al.: Bitcoin: A peer-to-peer electronic cash system (2008)
60. Nasir, Q., Qasse, I. A., Abu Talib, M., Nassif, A. B.: Performance analysis of hyper-ledger fabric platforms. Security and Communication Networks 2018 (2018)
61. Newson, R.: Merge BigCouchDB. https://www.mail-archive.com/dev@couchdb. apache.org/msg25522.html (2013), accessed: October 2019
62. Nguyen, M. Q., Loghin, D., Dinh, T. T. A.: Understanding the scalability of hyper-ledger fabric
63. Nyström, F.: Network Performance in Hyperledger Fabric-Investigating the net-work resource consumption of transactions in a Distributed Ledger Technology system. Master's thesis (2019)
64. Ongaro, D., Ousterhout, J.: In search of an understandable consensus algorithm. In: 2014 USENIX Annual Technical Conference (USENIX ATC 14). pp. 305-319 (2014)
65. Pongnumkul, S., Siripanpornchana, C., Thajchayapong, S.: Performance analysis of private blockchain platforms in varying workloads. In: 2017 26th International Conference on Computer Communication and Networks (ICCCN). pp. 1-6. IEEE (2017)
66. Stathakopoulous, C., Cachin, C.: Threshold signatures for blockchain systems. Swiss Federal Institute of Technology (2017)
67. Sukhwani, H.: Performance modeling & analysis of hyperledger fabric (permis-sioned blockchain network). Duke University: Duke, UK (2018)
68. Thakkar, P., Nathan, S., Viswanathan, B.: Performance benchmarking and optimizing hyperledger fabric blockchain platform. In: 2018 IEEE 26th International Symposium on Modeling, Analysis, and Simulation of Computer and Telecommu-nication Systems (MASCOTS). pp. 264-276. IEEE (2018)
69. Wattenhofer, R.: Blockchain Science: Distributed Ledger Technology. Inverted Forest Publishing (2019)
70. Westermann, D., Happe, J.: Towards performance prediction of large enterprise applications based on systematic measurements. In: Proc. of the Fifteenth Inter-national Workshop on Component-Oriented Programming (WCOP). vol. 2010, pp. 71-78 (2010)
71. Westermann, D., Happe, J., Hauck, M., Heupel, C.: The performance cockpit approach: A framework for systematic performance evaluations. In: 2010 36th EU-ROMI-CRO Conference on Software Engineering and Advanced Applications. pp. 31-38. IEEE (2010)
72. Woodside, M., Franks, G., Petriu, D. C.: The future of software performance engineering. In: 2007 Future of Software Engineering. pp. 171-187. IEEE Computer Society (2007)
73. Yin, M., Malkhi, D., Reiter, M. K., Gueta, G. G., Abraham, I.: Hotstuff: BFT con-sensus in the lens of blockchain. arXiv preprint arXiv: 1803.05069 (2018)

What is claimed is:

1. A computer system for maintaining a synchronized distributed ledger data structure storing a blockchain data structure across a plurality of computing nodes each configured to enforce a synchronization protocol for coordinating updates of the synchronized distributed ledger data structure, the system comprising:
a processor configured to:
receive an input set of data fields representing parameters of an agreement between a plurality of parties;
instantiate an agreement object incorporating at least the input set of data fields, a series of one or more required approval signals, each required approval signal corresponding to a hidden unique primary key, wherein the agreement object is represented as a state machine object that is transformed across a plurality of states based on transactions recorded on the blockchain data structure, wherein the plurality of states are transitioned from one to another responsive to events being represented in the transactions recorded on the blockchain data structure, and wherein the agreement object represents an agreement to share costs of a shared resource between two geographically disparate business units, each business unit operating at least one corresponding computing node of the plurality of computing nodes;

insert the agreement object onto the blockchain data structure on the distributed ledger data structure of a first node of the plurality of computing nodes, the first node associated with a first party of the plurality of parties;

synchronize the agreement object and the blockchain data structure across all of the distributed ledger data structures of the plurality of computing nodes; and responsive to receiving, at a second computing node of the plurality of computing nodes, an approval signal signed using a private key corresponding to a second party of the plurality of parties, provide an additional block for appending to the blockchain data structure representative of a state transition indicative of an approval by the second party of the agreement represented by the hidden unique primary key, wherein the additional block comprises data representing the hidden unique primary key corresponding to the approval signal signed using the private key corresponding to the second party;

wherein the blockchain data structure is configured to accept the additional block representative of the state transition if and only if there exists at least one outstanding required approval of the series of the one or more required approval signals.

2. The system of claim 1, the processor configured to: responsive to receiving, at the second computing node of the plurality of computing nodes, a disapproval signal signed using the private key corresponding to a second party of the plurality of parties and including a new set of input data fields, (i) establish a new agreement object on the blockchain data structure with a new underlying hidden unique primary key incorporating the new set of input data fields, and (ii) render the new agreement object on the blockchain data structure immutable.

3. The system of claim 1, wherein the synchronized distributed ledger data structure maintains one or more cryptographically immutable records of transactions established between business entities associated with a corresponding node of the plurality of computing nodes;

wherein each node of the plurality of computing nodes includes at least two trusted computing devices: a first computing device configured for actively conducting operations on the distributed ledger data structure, and a second computing device configured to store a redundant copy of the distributed ledger data structure and to switch over to conducting the operations on the distributed ledger data structure responsive to an event of systems failure of the first computing device.

4. The system of claim 1, wherein the synchronized distributed ledger data structure is based at least on a Hyperledger Fabric infrastructure.

5. The system of claim 1, wherein the events include a subset of internal events and a subset of semi-internal events.

6. The system of claim 1, wherein the events include attaching supporting documents to the agreement object, the supporting documents uploaded as transactions recorded on the blockchain data structure.

7. The system of claim 1, wherein the events include one or more parties providing approvals or disapprovals represented in the transactions recorded on the blockchain data structure.

8. A computer implemented method for maintaining a synchronized distributed ledger data structure storing a blockchain data structure across a plurality of computing nodes each configured to enforce a synchronization protocol for coordinating updates of the synchronized distributed ledger data structure, the method comprising:

receiving an input set of data fields representing parameters of an agreement between a plurality of parties;

instantiating an agreement object incorporating at least the input set of data fields, a series of one or more required approval signals, each required approval signal corresponding to a hidden unique primary key, wherein the agreement object is represented as a state machine object that is transformed across a plurality of states based on transactions recorded on the blockchain data structure, wherein the plurality of states are transitioned from one to another responsive to events being represented in the transactions recorded on the blockchain data structure, and wherein the agreement object represents an agreement to share costs of a shared resource between two geographically disparate business units, each business unit operating at least one corresponding computing node of the plurality of computing nodes;

inserting the agreement object onto the blockchain data structure on the distributed ledger data structure of a first node of the plurality of computing nodes, the first node associated with a first party of the plurality of parties;

synchronizing the agreement object and the blockchain data structure across all of the distributed ledger data structures of the plurality of computing nodes; and responsive to receiving, at a second computing node of the plurality of computing nodes, an approval signal signed using a private key corresponding to a second party of the plurality of parties, providing an additional block for appending to the blockchain data structure representative of a state transition indicative of an approval by the second party of the agreement represented by the hidden unique primary key, wherein the additional block comprises data representing the hidden unique primary key corresponding to the approval signal signed using the private key corresponding to the second party;

wherein the blockchain data structure is configured to accept the additional block representative of the state transition if and only if there exists at least one outstanding required approval of the series of the one or more required approval signals.

9. The method of claim 8, comprising:

responsive to receiving, at the second computing node of the plurality of computing nodes, a disapproval signal signed using the private key corresponding to a second party of the plurality of parties and including a new set of input data fields, (i) establishing a new agreement object on the blockchain data structure with a new underlying hidden unique primary key incorporating the new set of input data fields, and (ii) rendering the new agreement object on the blockchain data structure immutable.

10. The method of claim 8, wherein the synchronized distributed ledger data structure maintains one or more cryptographically immutable records of transactions established between business entities associated with a corresponding node of the plurality of computing nodes;

wherein each node of the plurality of computing nodes includes at least two trusted computing devices: a first computing device configured for actively conducting operations on the distributed ledger data structure, and a second computing device configured to store a redundant copy of the distributed ledger data structure and to switch over to conducting the operations on the distributed ledger data structure responsive to an event of systems failure of the first computing device.

11. The method of claim 8, wherein the synchronized distributed ledger data structure is based at least on Hyperledger Fabric infrastructure.

12. The method of claim 8, wherein the events include a subset of internal events and a subset of semi-internal events.

13. The method of claim 8, wherein the events include attaching supporting documents to the agreement object, the supporting documents uploaded as transactions recorded on the blockchain data structure.

14. The method of claim 8, wherein the events include one or more parties providing approvals or disapprovals represented in the transactions recorded on the blockchain data structure.

15. A non-transitory computer readable medium storing machine interpretable instructions, which when executed by a processor, cause the executor to performs a method for maintaining a synchronized distributed ledger data structure storing a blockchain data structure across a plurality of computing nodes each configured to enforce a synchronization protocol for coordinating updates of the synchronized distributed ledger data structure, the method comprising:

receiving an input set of data fields representing parameters of an agreement between a plurality of parties;

instantiating an agreement object incorporating at least the input set of data fields, a series of one or more required approval signals, each required approval signal corresponding to a hidden unique primary key, wherein the agreement object is represented as a state machine object that is transformed across a plurality of states based on transactions recorded on the blockchain data structure, wherein the plurality of states are transitioned from one to another responsive to events being represented in the transactions recorded on the blockchain data structure, and wherein the agreement object represents an agreement to share costs of a shared resource between two geographically disparate business units, each business unit operating at least one corresponding computing node of the plurality of computing nodes;

inserting the agreement object onto the blockchain data structure on the distributed ledger data structure of a first node of the plurality of computing nodes, the first node associated with a first party of the plurality of parties;

synchronizing the agreement object and the blockchain data structure across all of the distributed ledger data structures of the plurality of computing nodes; and responsive to receiving, at a second computing node of the plurality of computing nodes, an approval signal signed using a private key corresponding to a second party of the plurality of parties, providing an additional block for appending to the blockchain data structure representative of a state transition indicative of an approval by the second party of the agreement represented by the hidden unique primary key, wherein the additional block comprises data representing the hidden unique primary key corresponding to the approval signal signed using the private key corresponding to the second party;

wherein the blockchain data structure is configured to accept the additional block representative of the state transition if and only if there exists at least one outstanding required approval of the series of the one or more required approval signals.

* * * * *